US012619116B2

(12) United States Patent
Christiansen et al.

(10) Patent No.: US 12,619,116 B2
(45) Date of Patent: May 5, 2026

(54) ELECTROCHROMIC DEVICES INCLUDING POLYMERS HAVING RESIDUES OF ((METH)ACRYLATE-AMINE CATION BIS(SUBSTITUTED-SULFONYL)IMIDE ANION)) MONOMER

(71) Applicant: Vitro Flat Glass LLC, Cheswick, PA (US)

(72) Inventors: Dylan Thomas Christiansen, Pittsburgh, PA (US); Ivan Alexandrovich Sokol, Pittsburgh, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 423 days.

(21) Appl. No.: 18/133,045

(22) Filed: Apr. 11, 2023

(65) Prior Publication Data

US 2023/0341738 A1 Oct. 26, 2023

Related U.S. Application Data

(60) Provisional application No. 63/333,255, filed on Apr. 21, 2022.

(51) Int. Cl.
*G02F 1/1516* (2019.01)
*C09K 9/02* (2006.01)
(Continued)

(52) U.S. Cl.
CPC ............ *G02F 1/15165* (2019.01); *C09K 9/02* (2013.01); *G02F 1/1525* (2013.01); *G02F 1/155* (2013.01); *G02F 2001/15145* (2019.01)

(58) Field of Classification Search
CPC .... G02F 1/15165; G02F 1/1525; G02F 1/155; G02F 2001/15145; C09K 9/02
See application file for complete search history.

(56) References Cited

U.S. PATENT DOCUMENTS 6,372,159 B1 4/2002 Berneth et al.
6,545,793 B2 4/2003 Berneth et al.
(Continued)

FOREIGN PATENT DOCUMENTS

JP 2011119053 A 6/2011
WO 2015016243 A1 2/2015
(Continued)

OTHER PUBLICATIONS

Shaplov, Alexander S., et al. "Bis (trifluoromethylsulfonyl) amide based "polymeric ionic liquids": Synthesis, purification and peculiarities of structure-properties relationships." Electrochimica acta 57 (2011): 74-90. DOI: 10.1016/j.electacta.2011.06.041 (Year: 2011).*
(Continued)

*Primary Examiner* — John D Freeman
(74) *Attorney, Agent, or Firm* — The Webb Law Firm

(57) ABSTRACT

The present invention relates to electrochromic devices and compositions that include a polymer that includes residues of, or a polymerizable composition that includes, ((meth) acrylate-amine cation bis(substituted-sulfonyl)imide anion)) monomer represented by the following Formula (I), (I)

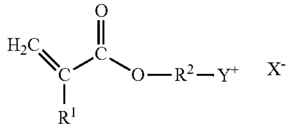

With reference to Formula (I): $R^1$ is in each case independently hydrogen or methyl; $R^2$ is in each case independently a single bond, a divalent linear or branched alkane, or
(Continued)

divalent linear or branched cycloalkane; $Y^+$ is in each case independently an amine cation, such as for example $—N(R^3)(R^4)(R^5)^+$; and $X^-$ is a bis(substituted-sulfonyl) imide anion represented by the following Formula (II), (II)

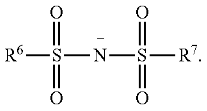

24 Claims, 3 Drawing Sheets

(51) Int. Cl.

| | |
|---|---|
| ***G02F 1/1514*** | (2019.01) |
| ***G02F 1/1523*** | (2019.01) |
| ***G02F 1/155*** | (2006.01) |

(56) References Cited

U.S. PATENT DOCUMENTS

| | | | | |
|---|---|---|---|---|
| 6,602,603 B2 | 8/2003 | Welch et al. | | |
| 7,595,011 B2 | 9/2009 | Kanouni et al. | | |
| 7,718,096 B2 | 5/2010 | Yale et al. | | |
| 8,867,116 B1 | 10/2014 | Kloeppner et al. | | |
| 2002/0145790 A1 | 10/2002 | Berneth et al. | | |
| 2012/0107726 A1 * | 5/2012 | Ogata | H01M 10/0525 | 257/E51.026 |
| 2015/0076390 A1 * | 3/2015 | Kloeppner | G02B 5/23 | 525/326.4 |
| 2015/0346573 A1 * | 12/2015 | Theiste | H01G 11/04 | 429/188 |
| 2017/0305869 A1 | 10/2017 | Moganty et al. | | |
| 2020/0280095 A1 | 9/2020 | Chiefari et al. | | |

FOREIGN PATENT DOCUMENTS

| | | | | |
|---|---|---|---|---|
| WO | WO-2017087019 A1 * | 5/2017 | C09K 11/06 | |
| WO | WO-2018208022 A1 * | 11/2018 | C09K 9/00 | |
| WO | 2019084623 A1 | 5/2019 | | |

OTHER PUBLICATIONS

Du, Qiuliang, et al. "The effect of ionic liquid fragment on the performance of polymer electrolytes." Polymer international 61.2 (2012): 222-227. DOI: 10.1002/pi.3172 (Year: 2012).*

Shaplov, Alexander S., et al. "A first truly all-solid state organic electrochromic device based on polymeric ionic liquids." Chemical Communications 50.24 (2014): 3191-3193. DOI: 10.1039/C3CC49876J (Year: 2014).*

Mecerreyes,"Polymeric ionic liquids: Broadening the properties and applications of polyelectrolytes", Progress in Polymer Science, 2011, pp. 1629-1648, vol. 36, No. 12, Abstract only.

Wang et al., "Preparation and characterization of gel polymer electrolytes using poly(ionic liquids) and high lithium salt concentration ionic liquids", Journal of Materials Chemistry A, 2017, Abstract, vol. 5, No. 45.

* cited by examiner

ELECTROCHROMIC DEVICES INCLUDING POLYMERS HAVING RESIDUES OF ((METH)ACRYLATE-AMINE CATION BIS(SUBSTITUTED-SULFONYL)IMIDE ANION)) MONOMER

CROSS-REFERENCE TO RELATED APPLICATION

This application is entitled to and claims priority to U.S. Provisional Patent Application No. 63/333,255, which was filed on Apr. 21, 2022, the disclosure of which is incorporated herein by reference in its entirety.

FIELD

The present invention relates to electrochromic devices and compositions that include a polymer that includes residues of, or a polymerizable composition that includes, ((meth)acrylate-amine cation bis(substituted-sulfonyl)imide anion)) monomer.

BACKGROUND

Electrochromism involves a reversible change in a material's visible color and/or transmittance of visible light with the application of an electrical potential. The change in color and/or transmittance typically involves alternately cycled oxidized and reduced charge states. Generally, a material that generates a color while undergoing reduction is referred to as a cathodically-coloring electrochromic material; and a material that generates color while undergoing oxidation is referred to as an anodically-coloring electrochromic material.

Electrochromic devices typically include an electrochromic layer that is interposed between the separate and opposed transparent electrode layers of separate and opposed substrates. The electrochromic layer typically includes a polymer matrix through which cathodic and anodic components thereof are transported towards their respective cathode and anode where reduction and oxidation reactions correspondingly occur, at least one of which results in a change in color of and/or transmittance of visible light through the electrochromic device.

The kinetics of electrochromic devices is typically governed primarily by mass transport of cathodic components and anodic components across and through the electrochromic layer. For purposes of charge conversion, the electrical currents of both electrodes (cathode and anode) are necessarily equal. If one of the components (cathodic or anodic component) moves or is transported more slowly through or across the electrochromic layer, typically a higher concentration of that component is required, and more particularly, a higher concentration gradient of the slower moving/transported component at the electrode interface (a higher interfacial concentration) is required to equalize the diffusion flux and maintain a given current. Adjusting and/or maintaining a higher concentration of the component having reduced mass transport can require additional preparation and/or manufacturing steps, and can result in inadvertent formulation errors. Mass transport imbalances can, in some instances, result in reduced durability of the electrochromic device, in particular if the slower mass transported active component is subject to over-oxidization or over-reduction at a particular electrode.

The polymer matrix of the electrochromic layer typically includes a polymer. The polymer of the polymer matrix can have a significant influence on the transport properties of the cathodic and anodic components there-through. In addition, the polymer of the polymer matrix can affect the adhesive properties of the electrochromic layer. Poor adhesive properties can result in undesirable separation and/or delamination of the transparent electrode layers and related substrates from the electrochromic layer. The polymer of the electrochromic layer can also affect the transparency of the electrochromic device. In some instances, poor solubility of components within the polymer of the electrochromic layer can result in an undesirable increase in haze, which correspondingly and adversely affects the transparency of the electrochromic device. The polymer can affect the durability and high-temperature performance of the electrochromic layer. For example, degradation of the polymer over time can result in an undesirable reduction in the durability and high-temperature performance of the electrochromic layer and correspondingly the electrochromic device.

It would be desirable to develop new polymers for use in forming the polymer matrix of the electrochromic layer of electrochromic devices. It would be further desirable that such newly developed polymers provide properties that are at least as good as and preferably better than those of existing polymers, such as, but not limited to, balanced mass transport properties, reduced haze, reduced or low current densities, improved high temperature performance, and/or improved adhesive properties.

SUMMARY

In accordance with the present invention, there is provided an electrochromic device comprising: (a) a first substrate having a surface comprising a first transparent electrode layer; (b) a second substrate having a surface comprising a second transparent conductive electrode layer, wherein the first transparent electrode layer and the second transparent electrode layer are in opposing spaced opposition; and (c) an electrochromic layer interposed between the first transparent electrically conductive electrode layer and the second transparent electrically conductive electrode layer. The electrochromic layer comprises: (i) a cathodic component; (ii) an anodic component; (iii) an optional electrolyte; and (iv) a polymer matrix. The polymer matrix comprises a polymer, wherein the polymer comprises residues of a monomer represented by the following Formula (I), (I)

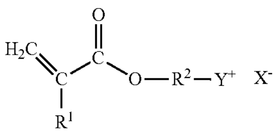

With reference to Formula (I): $R^1$ is in each case independently hydrogen or methyl; $R^2$ is in each case independently a single bond, a divalent linear or branched alkane, or divalent linear or branched cycloalkane; and $Y^+$ is in each case independently represented by one of the following Formulas (A), (B), (C), (D), (E), (F), and (G), (A)

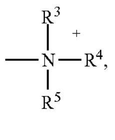

-continued (B)

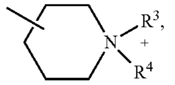

(C)

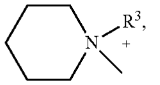

(D)

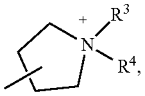

(E)

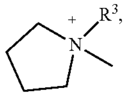

(F)

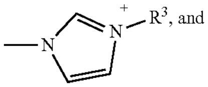

and (G)

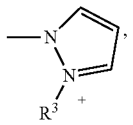

Independently for each of Formulas (A), (B), (C), (D), (E), (F), and (G), $R^3$, $R^4$, and $R^5$ are in each case independently selected from linear or branched alkyl or cycloalkyl. With further reference to Formula (I), $X^-$ is in each case independently represented by the following Formula (II), (II)

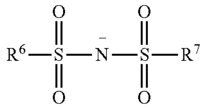

With reference to Formula (II), $R^6$ and $R^7$ are each independently selected from fluorine, linear or branched fluorinated alkyl, or linear or branched perfluorinated alkyl.

In accordance with the present invention, there is further provided an electrochromic device comprising: (a) a first substrate having a surface comprising a first transparent electrode layer; (b) a second substrate having a surface comprising a second transparent conductive electrode layer, wherein the first transparent electrode layer and the second transparent electrode layer are in opposing spaced opposition; and (c) an electrochromic layer interposed between the first transparent electrically conductive electrode layer and the second transparent electrically conductive electrode layer. The electrochromic layer comprises: (i) an electrochromic material comprising a cathodic component having cationic charge, wherein the cathodic component further comprises counter-anions, wherein each counter-anion of the cathodic component is an anodic component having an anion covalently bonded thereto; (ii) an optional electrolyte; and (iii) a polymer matrix, wherein the polymer matrix comprises a polymer, wherein the polymer comprises residues of a monomer represented by Formula (I) as described above.

In accordance with the present invention, there is additionally provided an electrochromic device comprising: (a) a first substrate having a surface comprising a first transparent electrode layer; (b) a second substrate having a surface comprising a second transparent conductive electrode layer, wherein the first transparent electrode layer and the second transparent electrode layer are in opposing spaced opposition; and (c) an electrochromic layer interposed between the first transparent electrically conductive electrode layer and the second transparent electrically conductive electrode layer. The electrochromic layer comprises: (i) a cathodic component; (ii) an anodic component; (iii) an optional electrolyte; and (iv) a polymer matrix, wherein the polymer comprises residues of a monomer represented by Formula (I) as described above. The cathodic component (i), of the electrochromic layer, comprises a cathodic component having cationic charge selected from at least one of a 1,1'-disubstituted-4,4'-dipyridinium cation represented by the following Formula (V), or a 1,1-(alkane-alpha, omega-diyl)-bis-(1'-substituted-4,4'-dipyridinium) cation represented by the following Formula (VI), Formula (V)

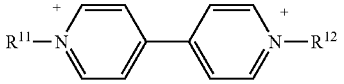

Formula (VI)

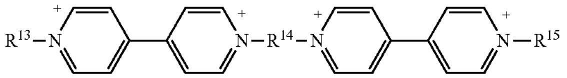

With reference to Formula (V) and Formula (VI), $R^{11}$, $R^{12}$, $R^{13}$, and $R^{15}$ are in each case independently selected from linear or branched alkyl, unsubstituted cycloalkyl, substituted cycloalkyl, unsubstituted aryl, substituted aryl, a group represented by the following Formula (VII), (VIII)

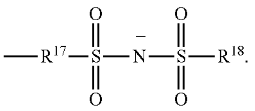

a group represented by the following Formula (VIII), (VIII)

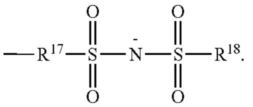

With reference to Formula (VII) and Formula (VIII), $R^{16}$ and $R^{17}$ are in each case independently selected from divalent linear or branched alkane linking group, and for Formula (VIII), $R^{18}$ is selected from fluorine, linear or branched fluorinated alkyl, or linear or branched perfluorinated alkyl. With reference to Formula (V), $R^{14}$ is selected from divalent linear or branched alkane linking group. There is provided for Formula (V), that at least one of $R^{11}$ and $R^{12}$ is independently selected from the group represented by Formula (VII) or the group represented by Formula (VIII). There is also provided for Formula (VI), that at least one of $R^{13}$ and $R^{15}$ is independently selected from the group represented by Formula (VII) or the group represented by Formula (VIII).

In further accordance with the present invention, there is provided an electrochromic composition comprising: (i) a cathodic component; (ii) an anodic component; (iii) an optional electrolyte; (iv) at least one of, (a) a polymeric thickener, or (b) a polymerizable monomer composition; and (v) a solvent. The polymeric thickener comprises a polymer, wherein the polymer comprises residues of a monomer represented by Formula (I) as described above, and the polymerizable monomer composition independently comprises the monomer represented by Formula (I) as described above.

In accordance with the present invention, there is additionally provided an electrochromic composition comprising: (i) an electrochromic material comprising a cathodic component having cationic charge, wherein the cathodic component further comprises counter-anions, wherein each counter-anion of the cathodic component is an anodic component having an anion covalently bonded thereto; (ii) an optional electrolyte; (iii) at least one of, (a) a polymeric thickener, or (b) a polymerizable monomer composition; and (iv) a solvent. The polymeric thickener comprises a polymer, wherein the polymer comprises residues of a monomer represented by Formula (I) as described above, and the polymerizable monomer composition independently comprises the monomer represented by Formula (I) as described above.

In accordance with the present invention, there is further provided an electrochromic composition comprising: (i) a cathodic component; (ii) an anodic component; (iii) an optional electrolyte; (iv) at least one of, (a) a polymeric thickener, or (b) a polymerizable monomer composition; and (v) a solvent. The polymeric thickener comprises a polymer, wherein the polymer comprises residues of a monomer represented by Formula (I) as described above, and the polymerizable monomer composition independently comprises the monomer represented by Formula (I) as described above. The cathodic component (i) comprises a cathodic component having cationic charge selected from at least one of a 1,1'-disubstituted-4,4'-dipyridinium cation represented by Formula (V) as described above, or a 1,1-(alkane-alpha, omega-diyl)-bis-(1'-substituted-4,4'-dipyridinium) cation represented by Formula (VI) as described above. There is provided for Formula (V), that at least one of $R^{11}$ and $R^{12}$ is independently selected from the group represented by Formula (VII) as described above, or the group represented by Formula (VIII) as described above. There is also provided that for Formula (VI), at least one of $R^{13}$ and $R^{15}$ is independently selected from the group represented by Formula (VII) as described above, or the group represented by Formula (VIII) as described above.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1-3 like characters refer to the same components and/or elements, as the case may be, unless otherwise stated.

DETAILED DESCRIPTION

Figure 1:
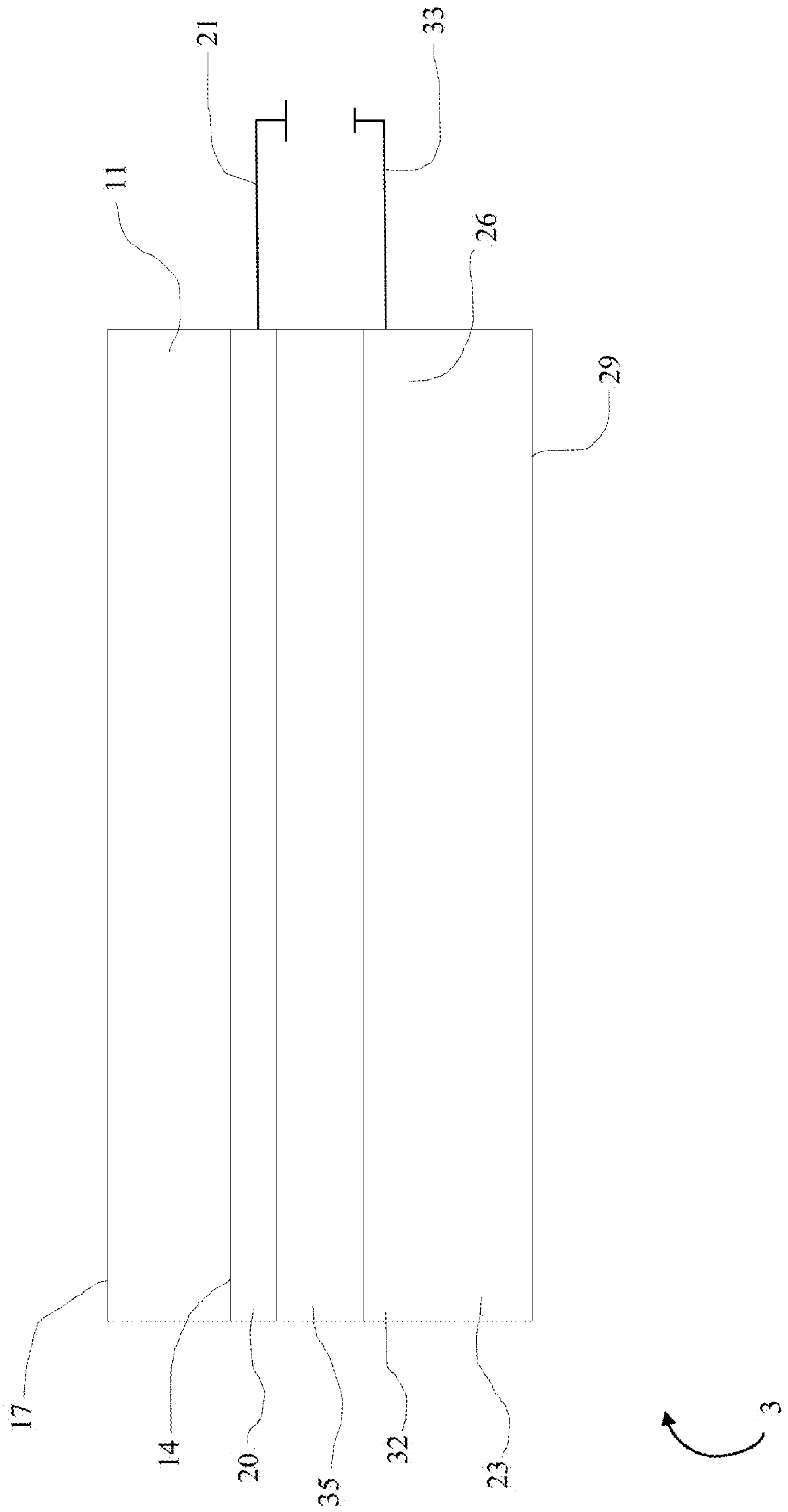
FIG. 1 is a representative side elevational sectional view of an electrochromic device according to the present invention.

As used herein, the articles "a," "an," and "the" include plural referents unless otherwise expressly and unequivocally limited to one referent.

Unless otherwise indicated, all ranges or ratios disclosed herein are to be understood to encompass any and all values, and subranges or subratios subsumed therein. For example, a stated range or ratio of "1 to 10" should be considered to include any and all values there-between (such as, 1, 2, 3, 4, 5, 6, 7, 8, 9, and 10), and subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

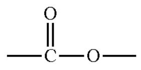

or equivalently-C(O)O—, is inclusive of the right-to-left representation thereof,

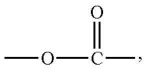

or equivalently-O(O)C— or —OC(O)—.

Other than in the operating examples, or where otherwise indicated, all numbers expressing quantities of ingredients, reaction conditions, and so forth used in the specification and claims are to be understood as modified in all instances by the term "about."

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth) acrylic acid" means methacrylic acid and/or acrylic acid.

As used herein, the term "electrochromic" and similar terms, such as "electrochromic compound" means having an absorption spectrum for at least visible radiation that varies in response to the application of an electric potential. Further, as used herein the term "electrochromic material" means any substance that is adapted to display electrochromic properties (such as, adapted to have an absorption spectrum for at least visible radiation that varies in response to an applied electric potential) and which includes at least one electrochromic compound.

As used herein, the term "electric potential" and related terms such as "electrical potential" means an electric potential that is capable of causing a response in a material, such as, but not limited to, transforming an electrochromic material from one form or state to another, as will be discussed in further detail herein.

As used herein to modify the term "state," the terms "first" and "second" are not intended to refer to any particular order or chronology, but instead refer to two different conditions or properties. For purposes of non-limiting illustration, the first state and the second state of an electrochromic compound, such as an anodically-coloring electrochromic compound, can differ with respect to at least one optical property, such as but not limited to the absorption of visible and/or UV radiation. Thus, according to various non-limiting embodiments disclosed herein, the anodically-coloring electrochromic compounds of the present invention can have a different absorption spectrum in each of the first and second state. For example, while not limiting herein, an anodically-coloring electrochromic compound can be clear in the first state and colored in the second state. Alternatively, an anodically-coloring electrochromic compound can have a first color in the first state and a second color in the second state.

As used herein the term "display" means the visible or machine-readable representation of information in words, numbers, symbols, designs or drawings. Non-limiting examples of display elements include screens, monitors, and security elements, such as security marks.

As used herein the term "window" means an aperture adapted to permit the transmission of radiation therethrough. Non-limiting examples of windows include automotive and aircraft transparencies, windshields, filters, shutters, and optical switches.

As used herein the term "mirror" means a surface that specularly reflects a large fraction of incident light.

As used herein, spatial or directional terms, such as "left", "right", "inner", "outer", "above", "below", and the like, relate to the invention as it is depicted in the drawing figures. It is to be understood, however, that the invention can assume various alternative orientations and, accordingly, such terms are not to be considered as limiting.

As used herein, the terms "formed over," "deposited over," "provided over," "applied over," residing over," or "positioned over," mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

As used herein, the terms "interposed" and "interposed between," mean residing or positioned between, but not necessarily in direct (or abutting) contact with overlying and/or underlying elements, or surfaces thereof. For example, a layer "interposed between" a first substrate and a second substrate does not preclude the presence of one or more other layers, coatings, or films of the same or different composition located between the interposed layer and the first and/or second substrates.

All documents, such as but not limited to issued patents and patent applications, referred to herein, and unless otherwise indicated, are to be considered to be "incorporated by reference" in their entirety.

As used herein, recitations of "linear or branched" groups, such as linear or branched alkyl, are herein understood to include: a methylene group or a methyl group; groups that are linear, such as linear $C_2$-$C_{20}$ alkyl groups; and groups that are appropriately branched, such as branched $C_3$-$C_{20}$ alkyl groups.

The term "alkyl" as used herein means linear or branched, cyclic or acyclic $C_1$-$C_{25}$ alkyl. Linear or branched alkyl can include $C_1$-$C_{25}$ alkyl, such as $C_1$-$C_{20}$ alkyl, such as $C_2$-$C_{10}$ alkyl, such as $C_1$-$C_{12}$ alkyl, such as $C_1$-$C_6$ alkyl. Examples of alkyl groups from which the various alkyl groups of the present invention can be selected from, include, but are not limited to, those recited further herein. Alkyl groups can include "cycloalkyl" groups. The term "cycloalkyl" as used herein means groups that are appropriately cyclic, such as, but not limited to, $C_3$-$C_{12}$ cycloalkyl (including, but not limited to, cyclic $C_3$-$C_{10}$ alkyl, or cyclic $C_5$-$C_7$ alkyl) groups. Examples of cycloalkyl groups include, but are not limited to, those recited further herein. The term "cycloalkyl" as used herein also includes: bridged ring polycycloalkyl groups (or bridged ring polycyclic alkyl groups), such as, but not limited to, bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

The term "heterocycloalkyl" as used herein means groups that are appropriately cyclic, such as, but not limited to, $C_2$-$C_{12}$ heterocycloalkyl groups, such as $C_2$-$C_{10}$ heterocycloalkyl groups, such as $C_5$-$C_7$ heterocycloalkyl groups, and which have at least one hetero atom in the cyclic ring, such as, but not limited to, O, S, N, P, and combinations thereof. Examples of heterocycloalkyl groups include, but are not limited to, imidazolyl, tetrahydrofuranyl, tetrahydropyranyl and piperidinyl. The term "heterocycloalkyl" as used herein also includes: bridged ring polycyclic heterocycloalkyl groups, such as, but not limited to, 7-oxabicyclo[2.2.1]heptanyl; and fused ring polycyclic heterocycloalkyl groups, such as, but not limited to, octahydrocyclopenta[b]pyranyl, and octahydro-1H-isochromenyl.

The descriptions, classes, and examples provided herein with regard to alkyl groups, cycloalkyl groups, heterocycloalkyl groups, haloalkyl groups, and the like, are also applicable to alkane groups, cycloalkane groups, heterocycloalkane groups, haloalkane groups, etc., such as, but not limited to, polyvalent alkane groups, such as polyvalent alkane linking groups, such as divalent alkane linking groups.

As used herein, the term "aryl" and related terms, such as "aryl group", means an aromatic cyclic monovalent hydrocarbon radical. As used herein, the term "aromatic" and related terms, such as "aromatic group," means a cyclic conjugated hydrocarbon having stability (due to delocalization of pi-electrons) that is significantly greater than that of a hypothetical localized structure. Examples of aryl groups include $C_6$-$C_{14}$ aryl groups, such as, but not limited to, phenyl, naphthyl, phenanthryl, and anthracenyl.

The term "heteroaryl", as used herein, includes, but is not limited to, $C_3$-$C_{18}$ heteroaryl, such as, but not limited to, $C_3$-$C_{10}$ heteroaryl (including fused ring polycyclic heteroaryl groups) and means an aryl group having at least one hetero atom in the aromatic ring, or in at least one aromatic ring in the case of a fused ring polycyclic heteroaryl group. Examples of heteroaryl groups include, but are not limited to, furanyl, pyranyl, pyridinyl, quinolinyl, isoquinolinyl, and pyrimidinyl.

Representative alkyl groups include, but are not limited to, methyl, ethyl, propyl, isopropyl, butyl, isobutyl, sec-butyl, tert-butyl, pentyl, neopentyl, hexyl, heptyl, octyl, nonyl and decyl. Representative alkenyl groups include, but are not limited to, vinyl, allyl, and propenyl. Representative alkynyl groups include, but are not limited to, ethynyl, 1-propynyl, 2-propynyl, 1-butynyl, and 2-butynyl. Representative cycloalkyl groups include, but are not limited to, cyclopropyl, cyclobutyl, cyclopentyl, cyclohexyl, and cyclooctyl.

The term "nitrogen-containing heterocycle," such as "nitrogen-containing hererocycle group" or nitrogen-containing heterocycle substituent," as used herein, includes, but is not limited to, a nitrogen-containing ring in which the nitrogen-containing ring is bonded through a ring nitrogen. Examples of nitrogen-containing heterocycles include, but are not limited to, aliphatic cyclic aminos (or cycloaliphatic aminos), such as morpholino, piperidino, pyrrolidino, and decahydroisoquinolino; and heteroaromatics, such as imidazole, pyrrole, indole, and carbazole.

As used herein, recitations of "substituted" group, means a group including, but not limited to, alkyl group, cycloalkyl group, heterocycloalkyl group, aryl group, and/or heteroaryl group, in which at least one hydrogen thereof has been replaced or substituted with a group or "substituent" that is other than hydrogen, such as, but not limited to: alkoxy groups; halo groups (e.g., F, $C_1$, I, and Br); hydroxyl groups; thiol groups; alkylthio groups; arylthio groups; ketone groups; aldehyde groups; carboxylic ester groups; carboxylic acid groups; phosphoric acid groups; phosphoric acid ester groups; sulfonic acid groups; sulfonic acid ester groups; nitro groups; cyano groups; alkyl groups; alkenyl groups; alkynyl groups; haloalkyl groups; perhaloalkyl groups; heterocycloalkyl groups; aryl groups (including alkaryl groups, including hydroxyl substituted aryl, such as phenol, and including poly-fused-ring aryl); aralkyl groups; heteroaryl groups (including poly-fused-ring heteroaryl groups); amino groups, such as —$N(R^{11'})(R^{12'})$ where $R^{11'}$ and $R^{12'}$ are each independently selected from, for example, hydrogen, alkyl, heterocycloalkyl, aryl, or heteroaryl; carboxylate groups; siloxane groups; alkoxysilane groups; polysiloxane groups; amide groups; carbamate groups; carbonate groups; urea groups; trialkylsilyl groups; nitrogen-containing heterocycles; or combinations thereof, including those classes and examples as described further herein. In accordance with some embodiments of the present invention, the substituents of a substituted group are more particularly recited.

As used herein, the term "halo" and related terms, such as "halo group," "halo substituent," "halogen group," and "halogen substituent," means a single bonded halogen group, such as —F, —Cl, —Br, and —I.

As used herein, recitations of "halo substituted" and related terms (such as, but not limited to, haloalkyl groups, haloalkenyl groups, haloalkynyl groups, haloaryl groups, and halo-heteroaryl groups) means a group in which at least one, and up to and including all of the available hydrogen groups thereof is substituted with a halo group, such as, but not limited to F, Cl or Br. The term "halo-substituted" is inclusive of "perhalo-substituted." As used herein, the term perhalo-substituted group and related terms (such as, but not limited to, perhaloalkyl groups, perhaloalkenyl groups, perhaloalkynyl groups, perhaloaryl groups or perhalo-heteroaryl groups) means a group in which all of the available hydrogen groups thereof are substituted with a halo group. For purposes of non-limiting illustration: perhalomethyl is —$CX_3$; and perhalophenyl is —$C_6x_5$, where X represents one or more halo groups, such as, but not limited to F, Cl, Br, or I.

As used herein, "at least one of" is synonymous with "one or more of," whether the elements are listed conjunctively or disjunctively. For example, the phrases "at least one of A, B, and C" and "at least one of A, B, or C" each mean any one of A, B, or C, or any combination of any two or more of A, B, or C. For example, A alone; or B alone; or C alone; or A and B; or A and C; or B and C; or all of A, B, and C.

As used herein, "selected from" is synonymous with "chosen from" whether the elements are listed conjunctively or disjunctively. Further, the phrases "selected from A, B, and C" and "selected from A, B, or C" each mean any one of A, B, or C, or any combination of any two or more of A, B, or C. For example, A alone; or B alone; or C alone; or A and B; or A and C; or B and C; or all of A, B, and C.

The discussion of the present invention herein may describe certain features as being "particularly" or "preferably" within certain limitations (e.g., "preferably," "more preferably," or "even more preferably," within certain limitations). It is to be understood that the invention is not limited to or by such particular or preferred limitations, but encompasses the entire scope of the disclosure.

As used herein, and in accordance with some embodiments, the term "ketone" such as with regard to groups, and substituents of various groups, of the compounds and components of the present invention, and related terms, such as "ketone group" and "ketone substituent," includes a material represented by —C(O)R, where R is selected from those groups as described below, other than hydrogen.

As used herein, and in accordance with some embodiments, the term "carboxylic acid" such as with regard to groups, and substituents of various groups, of the compounds and components of the present invention, and related terms, such as "carboxylic acid group" and "carboxylic acid substituent" includes a material represented by —C(O)OH.

As used herein, and in accordance with some embodiments, the term "ester" such as with regard to groups, and substituents of various groups, of the compounds and components of the present invention, and related terms, such as "ester group" and "ester substituent" means a carboxylic acid ester group represented by —C(O)OR, where R is selected from those groups as described below, other than hydrogen.

As used herein, and in accordance with some embodiments, the term "carboxylate" such as with regard to groups, and substituents of various groups, of the compounds and components of the present invention, and related terms, such as "carboxylate group" and "carboxylate substituent," includes a material represented by —OC(O)R, where R is selected from those groups as described below.

As used herein, and in accordance with some embodiments, the term "amide" such as with regard to groups, and substituents of various groups, of the compounds and components of the present invention, and related terms, such as "amide group" and "amide substituent" includes a material represented by —C(O)N(R)(R) or —N(R)C(O)R, where each R is independently selected from those groups as described below.

As used herein, and in accordance with some embodiments, the term "carbonate" such as with regard to groups, and substituents of various groups, of the compounds and components of the present invention, and related terms, such as "carbonate group" and "carbonate substituent" includes a material represented by —OC(O)OR, where R is selected from those groups as described below, other than hydrogen.

As used herein, and in accordance with some embodiments, the term "carbamate" such as with regard to groups, and substituents of various groups, of the compounds and components of the present invention, and related terms, such as "carbamate group" and "carbamate substituent" includes a material represented by —OC(O)N(R)(H) or —N(H)C(O)OR, where R in each case is independently selected from those groups as described below, other than hydrogen.

As used herein, and in accordance with some embodiments, the term "urea" such as with regard to groups, and substituents of various groups, of the compounds and components of the present invention, and related terms, such as "urea group" and "urea substituent" includes a material represented by —N(R)C(O)N(R)(R), where each R is independently selected from those groups as described below.

As used herein, and in accordance with some embodiments, the term "siloxy" such as with regard to groups, and substituents of various groups, of the compounds and components of the present invention, and related terms, such as "siloxy group" and "siloxy substituent" includes a material represented by —O—Si$(R)_3$ where each R is independently selected from those groups as described below, other than hydrogen.

As used herein, and in accordance with some embodiments, the term "alkoxysilane" such as with regard to groups, and substituents of various groups, of the compounds and components of the present invention, and related terms, such as "alkoxysilane group" and alkoxysilane substituent" includes a material represented by —Si$(OR')_w(R)_t$, where w is 1 to 3 and t is 0 to 2, provided the sum of w and t is 3; R' for each w is independently selected from alkyl; and R for each t is independently selected from those groups as described below, other than hydrogen.

As used herein, and in accordance with some embodiments, the term "polysiloxane" such as with regard to groups, and substituents of various groups, of the compounds and components of the present invention, and related terms, such as "polysiloxane group" and "polysiloxane substituent", includes a material represented by the following Formula (J):

(J)

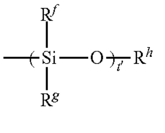

With reference to Formula (J): t' is greater than or equal to 2, such as from 2 to 200; Rf and $R^9$ for each t' are each independently selected from a group R as described below, other than hydrogen; and $R^h$ is independently a group R as described below.

Unless otherwise stated, each R group of each of the above described ketone, ester (carboxylic acid ester), carboxylate, amide, carbonate, carbamate, urea, siloxane, alkoxysilane groups, and polysiloxane groups, is in each case independently selected from hydrogen, alkyl, haloalkyl, perhaloalkyl, cycloalkyl, heterocycloalkyl, aryl, heteroaryl, and combinations thereof (including those classes and examples thereof as recited previously herein).

In accordance with the present invention, the electrochromic material (of the electrochromic layer of the electrochromic device) includes a polymer matrix, where the polymer matrix includes a polymer that comprises residues of a monomer represented by Formula (I), as shown previously herein. The $X^-$ anion of monomer represented by Formula (I) is represented by Formula (II) as shown previously herein, where $R^6$ and $R^7$ are each independently selected from fluorine, linear or branched fluorinated alkyl, or linear or branched perfluorinated alkyl. As used herein the term "linear or branched fluorinated alkyl" means an alkyl group in which at least one, and less than all, available hydrogens have been replaced with a fluoro group (F). As used herein, the term "linear or branched perfluorinated alkyl" means an alkyl group in which each available hydrogen has been replaced with a fluoro group (F).

With reference to Formula (I), and in accordance with some embodiments: $R^2$ is independently in each case a single bond, a divalent linear or branched $C_1$-$C_{10}$ alkane, or divalent linear or branched $C_3$-$C_7$ cycloalkane; independently for each of Formulas (A), (B), (C), (D), (E), (F), and (G), $R^3$, $R^4$, and $R^5$ are in each case independently selected from linear or branched $C_1$-$C_{10}$ alkyl or $C_3$-$C_7$ cycloalkyl; and for Formula (II), $R^6$ and $R^7$ are each independently selected from fluorine, linear or branched $C_1$-$C_{10}$ fluorinated alkyl, or linear or branched $C_1$-$C_{10}$ perfluorinated alkyl.

With further reference to Formula (I), and in accordance with some embodiments: $R^2$ is independently in each case a single bond or a divalent linear or branched $C_1$-$C_6$ alkane; independently for each of Formulas (A), (B), (C), (D), (E), (F), and (G), $R^3$, $R^4$, and $R^5$ are in each case independently selected from linear or branched $C_1$-$C_6$ alkyl; and for Formula (II), $R^6$ and $R^7$ are each independently selected from linear or branched $C_1$-$C_6$ perfluorinated alkyl.

With some embodiments, the N,N-disubstituted piperidinium cation represented by Formula (B), is selected from a N,N-disubstituted piperidinium cation represented by the following Formula (B-1), (B-1)

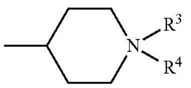

With reference to Formula (B-1), $R^3$ and $R^4$ are each independently as described previously herein with reference to Formulas (A) through (G).

The N,N-disubstituted pyrrolidinium cation represented by Formula (D), with some embodiments, is selected from a N,N-disubstituted pyrrolidinium cation represented by the following Formula (D-1), (D-1)

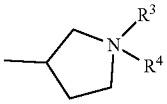

With reference to Formula (D-1), $R^3$ and $R^4$ are each independently as described previously herein with reference to Formulas (A) through (G).

With some embodiments, with the piperidinium cation represented by Formula (C), the pyrrolidinium cation represented by Formula (E), the imidazolium cation represented by Formula (F), and the pyrazolium cation represented by Formula (G), $R^2$ of Formula (I), in each case, is independently a divalent linear or branched alkane, or a divalent linear or branched cycloalkane.

The polymer of the polymer matrix, with some embodiments, further includes residues of a comonomer that does not include an amine cation covalently bonded thereto. With some embodiments, the comonomer includes at least one of linear or branched alkyl (meth)acrylate, cycloalkyl (meth) acrylate, or polyfunctional monomer including at least two (meth)acrylate groups. The linear or branched alkyl (meth) acrylate comonomer is selected from, with some embodiments, one or more unsubstituted linear or branched $C_1$-$C_{10}$ alkyl (meth)acrylate monomers and substituted linear or branched $C_1$-$C_{10}$ alkyl (meth)acrylate monomers, where the substituents are each independently selected from one or more substituents as described previously herein. Examples of linear or branched alkyl (meth)acrylate monomers, from which the comonomer can be selected include, but are not limited to: methyl (meth)acrylate; ethyl (meth)acrylate; n-propyl (meth)acrylate; i-propyl (meth)acrylate; linear or branched butly (meth)acrylate; linear or branched pentyl (meth)acrylate; linear or branched hexyl (meth)acrylate; linear or branched heptyl (meth)acrylate; and linear or branched octyl (meth)acrylate, such as 2-ethylhexyl (meth) acrylate.

The cycloalkyl (meth)acrylate comonomer is selected from, with some embodiments, one or more unsubstituted $C_3$-$C_{10}$ cycloalkyl (meth)acrylate monomers and substituted $C_3$-$C_{10}$ cycloalkyl (meth)acrylate monomers, where the substituents are each independently selected from one or more substituents as described previously herein. Examples of cycloalkyl (meth)acrylate monomers from which the comonomer can be selected include, but are not limited to: cyclopentyl (meth)acrylate; cyclohexyl (meth)acrylate; and 2-norbornyl (meth)acrylate.

Classes of polyfunctional monomer including at least two (meth)acrylate groups, from which comonomer residues can be selected include, but are not limited to, polyfunctional monomer represented by the following Formula (K):

(K)

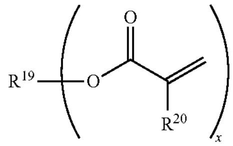

With reference to Formula (K), x is at least 2, such as from 2 to 10, or from 2 to 8, or from 2 to 6, from 2 to 4, or 2 or 3. With further reference to Formula (K), $R^{20}$ is selected from hydrogen or methyl. With additional reference to Formula (K), $R^{19}$ comprises at least one of a polyvalent aliphatic hydrocarbon residue, or a polyvalent aliphatic ether residue, in each case having a valency of x. As used herein, the term aliphatic hydrocarbon means a non-aromatic hydrocarbon, which can be linear or branched, and/or cyclic, and which can: be free of carbon-carbon unsaturated bonds; or include one or more carbon-carbon unsaturated bonds selected from double bonds and/or triple bonds. With some embodiments, the polyvalent aliphatic hydrocarbon is selected from optionally substituted linear or branched alkyl, such as optionally substituted linear or branched $C_1$-$C_{10}$ alkyl, or optionally substituted cycloalkyl, such as optionally substituted $C_3$-$C_{10}$ cycloalkyl, where the substituents are in each case selected from the classes and examples of substituents described previously herein.

With reference to Formula (K), as used herein the term aliphatic ether means a non-aromatic ether including at least one ether linkage (—O—), which can be linear or branched, and/or cyclic, and which can: be free of carbon-carbon unsaturated bonds; or include one or more carbon-carbon unsaturated bonds selected from double bonds and/or triple bonds. With some embodiments, the polyvalent aliphatic ether is selected from optionally substituted linear or branched ethers, such as optionally substituted linear or branched $C_1$-$C_{10}$ alkyl ethers, or optionally substituted cycloalkyl ethers, such as optionally substituted $C_3$-$C_{10}$ cycloalkyl ethers, where the substituents are in each case selected from the classes and examples of substituents described previously herein.

Examples of polyfunctional monomer including at least two (meth)acrylate groups, include, but are not limited to: ethylene glycol di(meth)acrylate; 1,2-propylene glycol di(meth)acrylate; 1,3-propylene glycol di(meth)acrylate; 1,2-butylene glycol di(meth)acrylate; 1,3-butylene glycol di(meth)acrylate; 1,4-butylene glycol di(meth)acrylate; diethylene glycol di(meth)acrylate; triethylene glycol di(meth)acrylate; trimethylolpropane tri(meth)acrylate; pentaerythritol tetra(meth)acrylate; dipentaerythritol penta(meth)acrylate; and dipentaerythritol hexa(meth)acrylate.

With some embodiments, the polymer, of the polymer matrix, which includes residues of a monomer represented by Formula (I), and also includes residues of polyfunctional comonomers, typically is crosslinked (or gelled) and as such, the molecular weight thereof cannot be readily determined.

In accordance with some embodiments, the polymer, of the polymer matrix, is formed by polymerizing a monomer composition including the monomer represented by Formula (I) between the first transparent electrically conductive electrode layer and the second transparent electrically conductive electrode layer (and correspondingly, the electrochromic layer is concurrently formed between the first transparent electrically conductive electrode layer and the second transparent electrically conductive electrode layer). The monomer composition can be polymerized in the presence of a suitable initiator, such as, but not limited to, a thermally activated free radical polymerization initiator. By "thermally activated" means the free radical initiator becomes active at elevated temperature, such as at temperatures greater than ambient room temperature, such as greater than 25° C., such as from 25° C. to 200° C., or from 50° C. to 110° C. Classes of thermally activated free radical initiators include, but are not limited to, organic peroxy compounds, azobis(organonitrile) compounds, N-acyloxyamine compounds, 0-imino-isourea compounds, and combinations of two or more thereof. With some embodiments, the themally activated free radical polymerization initiator is present in an amount of from 0.01 percent by weight to 5 percent by weight, based on the weight of polymerizable monomers.

Examples of organic peroxy compounds, that can be used as thermal polymerization initiators include, but are not limited to: peroxymonocarbonate esters, such as tertiary-butylperoxy 2-ethylhexyl carbonate and tertiarybutylperoxy isopropyl carbonate; peroxyketals, such as 1,1-di-(t-butyl peroxy)-3,3,5-trimethylcyclohexane; peroxydicarbonate esters, such as di(2-ethylhexyl) peroxydicarbonate, di(secondary butyl) peroxydicarbonate and diisopropylperoxydicarbonate; diacyperoxides, such as 2,4-dichlorobenzoyl peroxide, isobutyryl peroxide, decanoyl peroxide, lauryl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, and acetylcyclohexane sulfonyl peroxide. With some embodiments, further examples of peroxy compounds from which the free radical initiator can be selected include, but are not limited to, 2,5-dimethyl-2,5-di(2-ethylhexylperoxy)hexane, and/or 1,1-bis(tert-butylperoxy)-3,3,5-trimethylcyclohexane.

Examples of azobis(organonitrile) compounds, that can be used as thermal polymerization initiators in the lens molding composition, include, but are not limited to, azobis (isobutyronitrile), 2,2'-azobis(2-methyl-butanenitrile), and/or azobis(2,4-dimethylvaleronitrile).

Further non-limiting examples thermal polymerization initiators include 1-acetoxy-2,2,6,6-tetramethylpiperidine, and/or 1,3-dicyclohexyl-O—(N-cyclohexylideneamino)-isourea.

In accordance with some embodiments, the monomer composition including the monomer represented by Formula (I) is polymerized by exposure to actinic radiation, such as UV light and/or visible light, in the presence of a suitable actinic light activated polymerization catalyst or initiator, which are generally referred to a photoinitiators. Classes of photoinitiators that can be used with the monomer composition of the present invention include, but are not limited to, cleavage-type photoinitiators and abstraction-type photoinitiators. Non-limiting examples of cleavage-type photoinitiators include acetophenones, a-aminoalkylphenones, benzoin ethers, benzoyl oximes, acylphosphine oxides and bisacylphosphine oxides or mixtures of such initiators. Non-limiting examples of abstraction-type photoinitiators include benzophenone, Michler's ketone, thioxanthone, anthraquinone, camphorquinone, fluorone, ketocoumarin or mixtures of such initiators.

Another non-limiting example of a photoinitiator that can be used with the monomer composition of the present invention of the present invention, is a visible light photoinitiator. Non-limiting examples of suitable visible light photoinitiators are set forth at column 12, line 11 to column 13, line 21 of U.S. Pat. No. 6,602,603, which is specifically incorporated by reference herein.

In accordance with some embodiments, examples of photoinitiators used with the monomer composition of the present invention include, but are not limited to, 2,2-dimethoxy-2-phenylacetophenone and 1-hydroxycyclohexyl phenyl ketone.

In accordance with some embodiments, the polymer, of the polymer matrix, and correspondingly the electrochromic layer, is formed separately from the first and second electrically conductive electrodes and associated first and second substrates. After formation of the polymer, of the polymer matrix (and correspondingly the electrochromic layer) the electrochromic layer is positioned and interposed between the first and second electrically conductive electrodes. The polymer of the polymer matrix, can be separately formed from a polymerizable monomer composition as described above. The separately formed electrochromic layer can be interposed between the first and second electrically conductive electrodes in accordance with art-recognized methods, such as, but not limited to, vacuum lamination at elevated temperature.

The polymer matrix, with some embodiments, is present in the electrochromic layer in an amount of from 5 percent by weight to 80 percent by weight, or from 10 percent by weight to 60 percent by weight, or from 15 percent by weight to 50 percent by weight, the percent weights in each case being based on the total weight of the electrochromic layer.

The anodic component of the electrochromic layer, with some embodiments, includes an anodic component anion selected from at least one anodic component anion represented by the following Formula (III) or Formula (IV), (III)

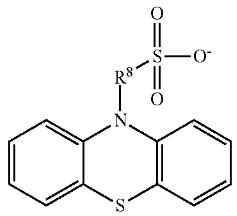

(IV)

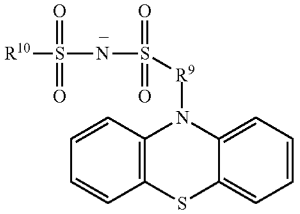

With reference to Formula (III), $R^8$ is selected from divalent linear or branched alkane linking group. With reference to Formula (IV), $R^9$ is selected from divalent linear or branched alkane linking group, and $R^{10}$ is selected from fluorine, linear or branched fluorinated alkyl, or linear or branched perfluorinated alkyl.

The anodic component anion can be described, with some embodiments, as including an anodic portion (group or moiety), such as a (10H-phenothiazin-10-yl) moiety, and an anion that is covalently bonded to the anodic moiety, such as a sulfonate anion or a triflimide anion (such as a (trifluoromethyl)sulfonyl)sulfonamide). With some further embodiments, the anion of the anodic component anion is covalently bonded to the anodic group or moiety by a divalent linear or branched alkane linking group. With some further embodiments, the anodic component anion is an anodically-coloring electrochromic compound or group having an anion covalently bonded thereto.

With further reference to Formula (III), $R^8$ is selected from divalent linear or branched $C_1$-$C_{10}$ alkane linking group. With additional reference to Formula (IV), $R^9$ is selected from divalent linear or branched $C_1$-$C_{10}$ alkane linking group, and $R^{10}$ is selected from fluorine, linear or branched $C_1$-$C_{10}$ fluorinated alkyl, or linear or branched $C_1$-$C_{10}$ perfluorinated alkyl.

With additional reference to Formulas (III) and (IV), and in accordance with some embodiments, $R^8$ and $R^9$ are each independently selected from divalent linear or branched $C_1$-$C_5$ alkane linking group. With reference to Formula (IV), $R^{10}$ is selected from linear or branched $C_1$-$C_5$ perfluorinated alkyl, with some embodiments.

With some embodiments, $R^8$ and $R^9$, of Formulas (III) and (IV) are each independently selected from divalent methane, divalent ethane, divalent linear or branched propane, divalent linear or branched butane, and divalent linear or branched pentane. With some further embodiments, $R^{10}$, of Formula (IV), is selected from fluorinated or perfluorinated versions or derivatives of methyl, ethyl, linear or branched propyl, linear or branched butyl, and linear or branched pentyl.

In accordance with some further embodiments, the anodic component, which includes the anodic component anion, further includes a counter-cation. Classes and examples of cations from which each counter-cation can be independently selected from include, but are not limited to: alkali metal cations, such as lithium cation ($Li^+$), sodium cation ($Na^+$), and potassium cation ($K^+$); alkaline earth metal cations, such as $Mg^{2+}$, $Ca^{2+}$ and $Ba^{2+}$; optionally substituted nitrogen-containing aliphatic heterocycle ammonium cations, such as, optionally substituted N,N-disubstituted pyrrolidinium cations, optionally substituted N,N-disubstituted piperidinium cations, and optionally substituted N,N-disubstituted morpholinium cations; optionally substituted nitrogen-containing aromatic heterocycle ammonium cations such as, optionally substituted N-substituted pyridinium cations, optionally substituted N-substituted quinolinium cations, and optionally substituted N-substituted isoquinolinium cations; and tetrasubstituted ammonium cations, described in further detail below. The optional substituents of the classes and examples of ammonium cations can be selected from those classes and examples of substituents recited previously herein, such as, but not limited to, linear or branched alkyl groups, cycloalkyl groups, and aryl groups. The N-substituted and N,N-disubstituted groups of the ammonium cations can be selected from those classes and examples of substituents recited previously herein, such as, but not limited to, linear or branched alkyl groups, cycloalkyl groups, and aryl groups.

With some embodiments, the counter-cation of the anodic component is a mono-cation. In accordance with some further embodiments, the counter-cation of the anodic component is selected from tetrasubstituted ammonium cations represented by the following Formula (H), Formula (H)

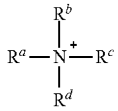

With reference to Formula (H), $R^a$, $R^b$, $R^c$, and $R^d$ are each independently selected from linear or branched alkyl, unsubstituted cycloalkyl, substituted cycloalkyl, unsubstituted aryl, and substituted aryl. With further reference to Formula (H), $R^a$, $R^b$, $R^c$, and $R^d$ are each independently selected from linear or branched $C_1$-$C_{10}$ alkyl, unsubstituted $C_3$-$C_7$ cycloalkyl, substituted $C_3$-$C_7$ cycloalkyl, unsubstituted phenyl, and substituted phenyl. The substituents of the substituted cycloalkyl and substituted phenyl groups can in each case be independently selected from those substituents as recited previously herein, such as, but not limited to linear or branched alkyl groups, cycloalkyl groups, and aryl groups.

With some embodiments, and with reference to Formula (H), each of $R^a$, $R^b$, $R^c$, and $R^d$ is independently selected from linear or branched alkyl. With some further embodiments, each of $R^a$, $R^b$, $R^c$, and $R^d$ of Formula (H) is independently selected from linear or branched $C_1$-$C_{10}$ alkyl.

Each counter-cation, of the anodic component, is independently selected from tetra(linear or branched alkyl) ammonium cation, with some embodiments. Each counter-cation, of the anodic component, is independently selected from tetra(linear or branched $C_1$-$C_{10}$ alkyl) ammonium cation, with some further embodiments.

The anodic component, with some embodiments, is composed of, or otherwise consists of: an anodic component anion selected from at least one anodic component anion represented by Formula (I) or Formula (II); and a counter-cation, where the anodic component has an equal number of anions and counter-cations, and correspondingly a neutral charge.

In accordance with some embodiments, in addition to, or alternatively to, an anodic component anion having an anion covalently bonded thereto, such as represented by Formula (III) and/or Formula (IV), the anodic component of the electrochromic layer includes one or more further anodic electrochromic compounds, such as, but not limited to: ferrocene and/or ferrocene derivatives (in which at least one cyclopentadienyl ring thereof is substituted with at least one substituent, including those substituents recited previously herein); 5,10-dihydro-5,10-di(linear or branched $C_1$-$C_{10}$ alkyl)phenazine, such as 5,10-dihydro-5,10-dimethylphenazine; N-substitutedphenoxazine, such as N-phenylphenoxazine; and combinations thereof. In accordance with some embodiments, when a further anodic component in present (in addition to the anodic component anion having an anion covalently bonded thereto) a further cathodic component (or further appropriate amount of cathodic component) can also be present. The further cathodic component, with some embodiments, comprises one or more cathodic components represented by Formulas (V) and/or (VI), as described in further detail below.

The anodic component, such as but not limited to the anodic component having an anion covalently bonded thereto, with some embodiments, is present in the electrochromic layer in an amount of from 0.25 percent by weight to 6.25 percent by weight, or from 0.5 percent by weight to 5 percent by weight, or from 1 percent by weight to 3 percent by weight, the percent weights in each case being based on the total weight of the electrochromic layer.

The cathodic component of the electrochromic layer of the electrochromic device, with some embodiments, includes at least one of a a 1,1'-disubstituted-4,4'-dipyridinium cation represented by the following Formula (V), or a 1,1-(alkane-alpha, omega-diyl)-bis-(1'-substituted-4,4'-dipyridinium) cation represented by the following Formula (VI), Formula (V)

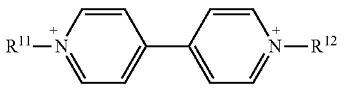

Formula (VI)

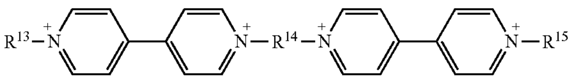

With reference to Formula (V), $R^{11}$ and $R^{12}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl.

With reference to Formula (VI), $R^{13}$ and $R^{15}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and $R^{14}$ is selected from divalent linear or branched $C_1$-$C_{10}$ alkane linking group.

The aryl groups of the unsubstituted aryl groups and substituted aryl groups, from which $R^{11}$ and $R^{12}$ of Formula (V), and $R^{13}$ and $R^{15}$ of Formula (VI), can each be independently selected, include those aryl groups as recited previously herein, such as, but not limited to, phenyl, naphthyl, phenanthryl, and anthracenyl. The cycloalkyl groups of the unsubstituted cycloalkyl groups and substituted cycloalkyl groups, from which $R^{11}$ and $R^{12}$ of Formula (V), and $R^{13}$ and $R^{15}$ of Formula (VI), can each be independently selected, include those include those cycloalkyl groups as recited previously herein, such as, but not limited to, cyclopentyl, cyclohexyl, and cycloheptyl.

The substituents of the substituted cycloalkyl and substituted aryl groups, from which $R^{11}$ and $R^{12}$ of Formula (V), and $R^{13}$ and $R^{15}$ of Formula (VI), can each be independently selected, include those substituents as recited previously herein. With some embodiments, each substituent of the substituted cycloalkyl and substituted aryl groups, from which $R^{11}$ and $R^{12}$ of Formula (V), and $R^{13}$ and $R^{15}$ of Formula (VI), can each be independently selected, are each independently selected from: alkoxy groups; halo groups (e.g., F, $C_1$, I, and Br); hydroxyl groups; thiol groups; alkylthio groups; arylthio groups; ketone groups; aldehyde groups; haloalkyl groups; perhaloalkyl groups; heterocycloalkyl groups; aryl groups; aralkyl groups (such as, benzyl groups); heteroaryl groups; and amino groups.

The linear or branched alkyl groups from which $R^{11}$ and $R^{12}$ of Formula (V), and $R^{13}$ and $R^{15}$ of Formula (VI), can each be independently selected, include those classes and examples of alkyl groups as recited previously herein, such as, but not limited to, methyl, ethyl, linear or branched propyl, linear or branched butyl, linear or branched pentyl, linear or branched hexyl, and linear or branched heptyl.

With further reference to Formula (V), and in accordance with some embodiments of the present invention, $R^{11}$ and $R^{12}$ are each independently selected from linear or branched $C_1$-$C_4$ alkyl, unsubstituted phenyl, and substituted phenyl.

With further reference to Formula (VI), and in accordance with some embodiments of the present invention, $R^{13}$ and $R^{15}$ are each independently selected from linear or branched $C_1$-$C_4$ alkyl, unsubstituted phenyl, and substituted phenyl, and $R^{14}$ is selected from divalent linear or branched $C_1$-$C_5$ alkane linking group. With some further embodiments, $R^{14}$ of Formula (VI) is a divalent linear or branched $C_1$-$C_5$ alkane linking group, such as a divalent linear or branched $C_3$-$C_5$ alkane linking group.

In accordance with some embodiments of the present invention, the cathodic component further includes counter-anions. With some further embodiments, the cathodic component includes an equal number of cations and counter-anions (or anions), and correspondingly the cathodic component has a net neutral charge. Each counter-anion of the cathodic component, with some embodiments, is independently selected from the group consisting of $BF_4^-$, $PF_6^-$, $ClO_4^-$, $CF_3SO_3^-$, $(CF_3SO_2)_2N^-$, $(CF_3SO_2)_3C^-$, or $B(phenyl)_4^-$. With some embodiments, the counter-anions of the cathodic component do not include and are not selected from anodic component anions, such as represented by Formulas (III) and (IV).

In accordance with some embodiments of the present invention, the cathodic component having cationic charge is present in the electrochromic layer in an amount of from 0.25 percent by weight to 6.25 percent by weight, or from 0.5 percent by weight to 5 percent by weight, or from 1 percent by weight to 3 percent by weight, the percent weights in each case being based on the total weight of the electrochromic layer.

With some embodiments of the present invention, the electrochromic layer of the electrochromic device of the present invention, includes an electrolyte. The electrolyte includes, with some embodiments, at least one electrolyte anion and at least one electrolyte cation. The electrolyte of the electrochromic layer includes, with some embodiments, an equal number of electrolyte anions and electrolyte cations, and correspondingly has a net neutral charge.

With some embodiments, the electrolyte of the electrochromic layer includes at least one electrolyte anion, where each electrolyte anion is independently selected from chloride, hexafluorophosphate, and bis(perfluoro(linear or branched $C_1$-$C_6$ alkysulfonyl)imide. With some further embodiments, the electrolyte of the electrochromic layer includes at least one electrolyte cation, where each electrolyte cation is independently selected from: sodium; potassium; lithium; ammonium cations, such as, tetra(linear or branched $C_1$-$C_6$)ammonium, and tri($C_5$-$C_8$ cycloalkyl)-(linear or branched $C_1$-$C_6$ alkyl)ammonium; 1-(linear or branched $C_1$-$C_6$ alkyl)-3-(linear or branched $C_1$-$C_6$ alkyl) imidazolium; 1-(linear or branched $C_1$-$C_6$ alkyl)-1-(linear or branched $C_1$-$C_6$ alkyl)pyrrolidinium; 1-(linear or branched $C_1$-$C_6$ alkyl)-1-(linear or branched $C_1$-$C_6$ alkyl)piperidinium; or phosphonium cations, such as, but not limited to tetra(linear or branched $C_1$-$C_6$ alkyl)phosphonium, or tri($C_5$-$C_8$ cycloalkyl)-(linear or branched $C_1$-$C_6$ alkyl)phosphonium.

The electrolyte of the electrochromic layer, with some embodiments includes: at least one electrolyte anion, where each electrolyte anion is independently selected from bis (perfluoro(linear or branched $C_1$-$C_6$ alkysulfonyl)imide; and at least one electrolyte cation, wherein each electrolyte cation is independently selected from 1-(linear or branched $C_1$-$C_6$ alkyl)-3-(linear or branched $C_1$-$C_6$ alkyl)imidazolium, 1-(linear or branched $C_1$-$C_6$ alkyl)-1-(linear or branched $C_1$-$C_6$ alkyl)pyrrolidinium, or 1-(linear or branched $C_1$-$C_6$ alkyl)-1-(linear or branched $C_1$-$C_6$ alkyl) piperidinium.

The electrolyte of the electrochromic layer, with some further embodiments includes: at least one electrolyte anion, where each electrolyte anion is bis(trifluromethylsulfonyl) imide; and at least one electrolyte cation, where each electrolyte cation is independently selected from 1-ethyl-3-methylimidazolium, 1-butyl-3-methylimidazolium, 1-methyl-1-butylpyrrolidinium, and 1-methyl-1-propylpiperidinium.

The electrolyte, with some embodiments, is present in the electrochromic layer in an amount of from 1 percent by weight to 75 percent by weight, or from 5 percent by weight to 50 percent by weight, or from 10 percent by weight to 30 percent by weight, the percent weights in each case being based on the total weight of the electrochromic layer.

In accordance with some further embodiments, the electrochromic layer of the present invention includes a solvent. With some additional embodiments, the solvent is present, in the electrochromic layer, alternatively to or in addition to the electrolyte. The solvent can, with some embodiments, include at least one of ethylene carbonate, propylene carbonate, gamma-butyrolactone, gamma-valerolactone, N-methylpyrrolidone, polyethylene glycol, carboxylic acid esters of polyethylene glycol, sulfolane, alpha, omega-($C_2$-$C_8$)dinitriles, or di(linear or branched $C_1$-$C_8$)acetamides. While not intending to be bound by any theory, and in accordance with some embodiments, it is believed that the solvent acts, at least in part, as a plasticizer within (or plasticizes) the electrochromic layer. The solvent, with some embodiments, is present in the electrochromic layer in an amount of from 10 to 75 percent by weight, or from 20 to 60 percent by weight, the percent weights in each case being based on the total weight of the electrochromic layer and the solvent.

With some embodiments of the present invention, in addition to the polymer including residues of ((meth)acrylate-amine cation bis(substituted-sulfonyl)imide anion)) monomer as described previously herein, the polymer matrix includes a further polymer, where the further polymer includes at least one of poly((meth)acrylonitrile), poly(vinylidene fluoride), poly(vinylidene fluoride-co-perfluoro (linear or branched $C_1$-$C_6$ alkylene)), or poly((linear or branched $C_1$-$C_5$ alkyl)(meth)acrylate).

The electrochromic layer of the electrochromic devices of the present invention can, with some embodiments, further include one or more art-recognized optional additives, such as, but not limited to, thermal stabilizers, UV stabilizers, rheology modifiers, static coloring agents (such as static tints and/or static dyes), kinetic additives (that accelerate electrode reaction) and combinations thereof. A non-limiting class of art-recognized thermal stabilizers are phenols, such as 2,6-ditertiarybutylphenol and compounds including 2,6-ditertiarybutylphenol groups or moieties. A non-limiting class of art-recognized UV stabilizers are hindered amine light stabilizers (HALS), such as 2,2,6,6-tetramethylpiperidine and compounds including 2,2,6,6-tetramehtylpiperidine groups or moieties. Static coloring agents include coloring agents for which the absorption spectrum thereof does not change in response to actinic radiation (such as UV and/or visible light) or the application of an electric potential, and do not include photochromic compounds and electrochromic compounds. A non-limiting class of kinetic additives includes salts, such as: alkali and alkaline earth metal salts of perchlorates, tetrafluoroborates, and hexafluorophosphates; and tetralkylammonium salts. Non-limiting examples of rheology modifies include: dialkoxyacetophenones, such as 3',4'dimethoxyacetophenone; and optionally substituted cycloalkylarylketones, such as 1-hydroxycyclohexyl phenyl ketone. Each optional additive can be present in any suitable active amount, such as from 0.05 percent by weight to 5 percent by weight, based on the total solids weight of the electrochromic layer (including the weight of the optional additive(s)).

The electrochromic layer of the electrochromic devices of the present invention can have any suitable thickness. With some embodiments, the electrochromic layer has a thickness of from 50 micrometers to 800 micrometers.

In accordance with some embodiments of the present invention, the electrochromic device includes: (a) a first substrate having a surface comprising a first transparent electrode layer; (b) a second substrate having a surface comprising a second transparent conductive electrode layer, where the first transparent electrode layer and the second transparent electrode layer are in opposing spaced opposition; and (c) an electrochromic layer interposed between the first transparent electrically conductive electrode layer and the second transparent electrically conductive electrode layer. The electrochromic layer, with this embodiment, includes: (i) an electrochromic material comprising a cathodic component having cationic charge, where there cathodic component further includes counter-anions, where each counter-anion of the cathodic component is an anodic component having an anion covalently bonded thereto; (ii) an optional electrolyte; and (iii) a polymer matrix, where the polymer matrix includes a polymer, where the polymer includes residues of a monomer represented by Formula (I) as described previously herein in conjunction with Formulas (A) through (G) and Formula (II).

The anodic component having an anion covalently bonded thereto, with some embodiments, is as described previously herein with reference to Formula (III) and Formula (IV).

The cathodic component having cationic charge, of the electrochromic material, with some embodiments, is as described previously herein with reference to Formula (V) and Formula (VI).

Reference herein to counter-ions (such as counter-cations and/or counter-anions) of a component, with some embodiments, means the counter-ions of the component when it is prepared separately from and/or prior to combining with the electrochromic layer and/or electrochromic composition of the present invention.

With some embodiments, the cathodic component having cationic charge and the anodic component having an anion covalently bonded thereto, together have a net neutral charge. As used herein, the term "net neutral charge" with regard to the cathodic component having cationic charge and the anodic component having an anion covalently bonded thereto, means that the sum of the cationic charge (+) of the cathodic component, and the sum of the anionic charge (−) of the anodic component having an anion covalently bonded thereto, are equal to each other (or have the same absolute value). In accordance with some embodiments, the cathodic component having cationic charge is free of any other or further counter-anions, other than the anodic component having an anion covalently bonded thereto. Correspondingly, and with some embodiments, the anodic component having an anion covalently bonded thereto is free of any other or further counter-cations, other than the cathodic component having cationic charge.

With some embodiments of the present invention, and for purposes of non-limiting illustration, the cathodic component having cationic charge, such as represented by Formula (V), and the anodic component having an anion covalently bonded thereto, can be represented by the following Formula (IX), Formula (IX)

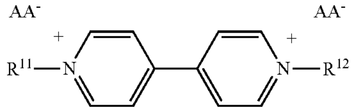

With reference to Formula (IX), $R^{11}$ and $R^{12}$ are each independently as described previously herein with reference to Formula (V), and each AA-(anodic anion) is independently selected from an anodic component having an anion covalently bonded thereto represented by Formula (III) or Formula (IV), as described previously herein.

With some embodiments of the present invention, and for purposes of non-limiting illustration, the cathodic component having cationic charge, such as represented by Formula (VI), and the anodic component having an anion covalently bonded thereto, can be represented by the following Formula (X), Formula (X)

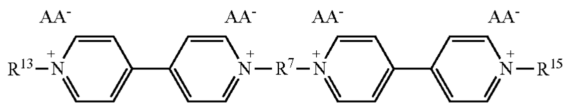

With reference to Formula (X), $R^{13}$, $R^{14}$, and $R^{15}$ are each independently as described previously herein with reference to Formula (VI), and each $AA^-$ (anodic anion) is independently selected from an anodic component having an anion covalently bonded thereto represented by Formula (III) or Formula (IV), as described previously herein.

The neutral charge combination of the cathodic component having cationic charge and the anodic component having an anion covalently bonded thereto, can be prepared in accordance with the non-limiting preparatory description provided in the examples further herein.

With the electrochromic devices of the present invention, where the electrochromic material includes a cathodic component having cationic charge, where the cathodic component further includes counter-anions, where each counter-anion of the cathodic component is an anodic component having an anion covalently bonded thereto: the optional electrolyte is as described previously herein; and the polymer matrix including a polymer having residues of ((meth) acrylate-amine cation bis(substituted-sulfonyl)imide anion)) monomer, is as described previously herein, such as with reference to Formula (I), Formulas (A) through (G), and Formula (II).

With some embodiments of the present invention, in addition to the polymer including residues of ((meth)acrylate-amine cation bis(substituted-sulfonyl)imide anion)) monomer as described previously herein, the polymer matrix includes a further polymer, where the further polymer includes at least one of poly((meth)acrylonitrile), poly(vinylidene fluoride), poly(vinylidene fluoride-co-perfluoro (linear or branched $C_1$-$C_6$ alkylene)), or poly((linear or branched $C_1$-$C_8$ alkyl)(meth)acrylate).

The electrochromic layer of the electrochromic devices of the present invention can, with some embodiments, further include one or more art-recognized optional additives, as described previously herein.

In accordance with some further embodiments of the present invention, the electrochromic device includes: (a) a first substrate having a surface comprising a first transparent electrode layer; (b) a second substrate having a surface comprising a second transparent conductive electrode layer, where the first transparent electrode layer and the second transparent electrode layer are in opposing spaced opposition; and (c) an electrochromic layer interposed between the first transparent electrically conductive electrode layer and the second transparent electrically conductive electrode layer. The electrochromic layer includes: (i) a cathodic component; (ii) an anodic component; (iii) an optional electrolyte; and (iv) a polymer matrix, where the polymer includes residues of a monomer represented by Formula (I) as described above. The cathodic component (i), of the electrochromic layer, includes a cathodic component having cationic charge selected from at least one of a 1,1'-disubstituted-4,4'-dipyridinium cation represented by Formula (V) as described previously herein, or a 1,1-(alkane-alpha, omega-diyl)-bis-(1'-substituted-4,4'-dipyridinium) cation represented by Formula (VI) as described previously herein.

With reference to Formula (V) and Formula (VI), and in accordance with this embodiment, $R^{11}$, $R^{12}$, $R^{13}$, and $R^{15}$ are in each case independently selected from linear or branched alkyl, unsubstituted cycloalkyl, substituted cycloalkyl, unsubstituted aryl, substituted aryl, a group represented by Formula (VII) as described previously herein, and a group represented by Formula (VIII) as described previously herein.

In accordance with this embodiment, there is provided for Formula (V), that at least one of $R^{11}$ and $R^{12}$ is independently selected from the group represented by Formula (VII) or the group represented by Formula (VIII). There is also provided for Formula (VI), in accordance with this embodiment, that at least one of $R^{13}$ and $R^{15}$ is independently selected from the group represented by Formula (VII) or the group represented by Formula (VIII). In accordance with this embodiment, the cathodic component represented by Formula (V) and Formula (VI), in conjunction with the covalently bonded anions represented by Formula (VII) and/or (VIII), can in each case be referred to herein as cathodic zwitterionic components, and/or similar terms, such as cathodic zwitterion components.

With reference to Formula (VII) and Formula (VIII), and in accordance with some embodiments, $R^{16}$ and $R^{17}$ are in each case independently selected from divalent linear or branched $C_1$-$C_{10}$ alkane linking group (or divalent linear or branched $C_1$-$C_8$ alkane linking group, or divalent linear or branched $C_1$-$C_4$ alkane linking group). With reference to Formula (VIII), and with some embodiments, $R^{18}$ is selected from fluorine, linear or branched fluorinated $C_1$-$C_{10}$ alkyl (or linear or branched fluorinated $C_1$-$C_8$alkyl, or linear or branched fluorinated $C_1$-$C_4$ alkyl), or linear or branched perfluorinated $C_1$-$C_{10}$ alkyl (or linear or branched perfluorinated $C_1$-$C_8$ alkyl, or linear or branched perfluorinated $C_1$-$C_4$ alkyl).

With reference to $R^{18}$ of Formula (VIII), the term "linear or branched fluorinated alkyl" means an alkyl group in which at least one, and less than all, available hydrogens have been replaced with a fluoro group (F). With further reference to $R^{18}$ of Formula (VIII), the term "linear or branched perfluorinated alkyl" means an alkyl group in which all available hydrogens have each been replaced with a fluoro group (F).

Non-limiting examples of linear or branched divalent alkane groups from $R^{16}$ of Formula (VII), and $R^{17}$ of Formula (VIII) can each be independently selected include, divalent ethane, divalent linear or branched divalent propane, divalent linear or branched butane, divalent linear or branched pentane, and divalent linear or branched hexane.

In accordance with some embodiments of the present invention, and with reference to Formula (V) and Formula (VI), $R^{11}$, $R^{12}$, $R^{13}$, and $R^{15}$ are in each case independently selected from the anion group represented by Formula (VII) or the anion group represented by Formula (VIII).

For purposes of non-limiting illustration, the cathodic component having cationic charge according to the present invention, such as represented by Formula (V) where $R^{11}$ and $R^{12}$ are each selected from a group represented by Formula (VII), can be prepared by N-alkylation of one mole of 4,4'-bipyridine with two moles of a cyclic sulfonate ester, such as, but not limited to, 1,3-propane sultone and/or 1,4-butane sultone. A more detailed description of a related synthetic procedure is provided in the examples further herein.

For purposes of non-limiting illustration, the cathodic component having cationic charge according to the present invention, such as represented by Formula (V) where only $R^{11}$ is selected from a group represented by Formula (VII), and $R^{12}$ is selected from linear or branched alkyl, optionally substituted cycloalkyl, or optionally substituted aryl, can be prepared by N-alkylation of one mole of an N-substituted 4,4'-bipyridinium mono-salt with one mole of a cyclic sulfonate ester, such as, but not limited to, 1,3-propane sultone and/or 1,4-butane sultone. The N-substituent of the N-substituted 4,4'-bipyridinium mono-salt is selected from linear or branched alkyl, optionally substituted cycloalkyl, or optionally substituted aryl.

For purposes of further non-limiting illustration, the cathodic component having cationic charge according to the present invention, such as represented by Formula (V) where $R^{11}$ and $R^{12}$ are each selected from a group represented by Formula (VIII), can be prepared by reacting one mole of 4,4'-bipyridine with two moles of a ((chloroalkyl) sulfonyl)((fluoroalkyl or perfluoroalkyl)sulfonyl)amide salt.

Formula (XI)

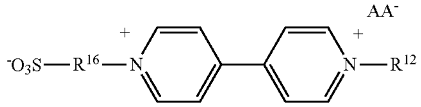

With reference to Formula (XI), $AA^-$ is an anodic component anion represented by Formula (III) or Formula (IV), as described previously herein. With further reference to Formula (XI), $R^{16}$ is as described previously herein with reference to Formula (VII), and $R^{12}$ is selected from linear or branched alkyl, optionally substituted cycloalkyl, and optionally substituted aryl.

For purposes of non-limiting illustration, and in accordance with some embodiments: the cathodic component having cationic charge, such as represented by Formula (VI), where $R^{13}$ and $R^{15}$ are each independently selected from a group represented by Formula (VII); and the anodic component anion together have a net neutral charge, can be represented by the following Formula (XII), Formula (XII)

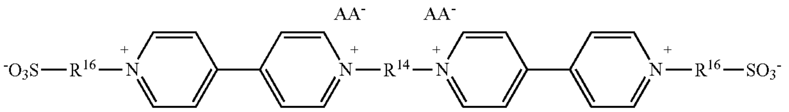

For purposes of additional non-limiting illustration, the cathodic component having cationic charge according to the present invention, such as represented by Formula (V) where only $R^{11}$ is selected from a group represented by Formula (VIII), and $R^{12}$ is selected from linear or branched alkyl, optionally substituted cycloalkyl, or optionally substituted aryl, can be prepared by reacting one mole of an N-substituted 4,4'-bipyridinium mono-salt with one mole of a ((chloroalkyl)sulfonyl)((fluoroalkyl or perfluoroalkyl) sulfonyl)amide salt. The N-substituent of the N-substituted 4,4'-bipyridinium mono-salt is selected from linear or branched alkyl, optionally substituted cycloalkyl, or optionally substituted aryl.

The anodic component of the cathodic zwitterionic embodiment of the present invention, is as described previously herein, such as with reference to Formula (III) and Formula (IV).

In accordance with some embodiments of the cathodic zwitterionic embodiment of the present invention, the cathodic component having cationic charge, such as represented by Formula (V) and/or (VI), and the anodic component anion, selected from at least one anodic component anion represented by Formula (III) or Formula (IV), together have a net neutral charge.

For purposes of non-limiting illustration, and in accordance with some embodiments: the cathodic component having cationic charge, such as represented by Formula (V), where only $R^{11}$ is selected from a group represented by Formula (III), and $R^{12}$ is selected from linear or branched alkyl, optionally substituted cycloalkyl, or optionally substituted aryl; and the anodic component anion together have a net neutral charge, can be represented by the following Formula (XI), With reference to Formula (XII), each $AA^-$ is independently an anodic component anion represented by Formula (III) or Formula (IV), as described previously herein. With further reference to Formula (XII): each $R^{16}$ is independently as described previously herein with reference to Formula (VII); and $R^{14}$ is a divalent linking group as described previously here with reference to Formula (VI).

In accordance with some further embodiments, the anodic component, which includes the anodic component anion, further includes a counter-cation. Classes and examples of cations from which each counter-cation can be independently selected from include those as described previously herein.

The electrolyte of the cathodic zwitterionic embodiment of the present invention, is as described previously herein.

The polymer matrix of the cathodic zwitterionic embodiment of the present invention, is as described previously herein, such as with reference to Formula (I), Formulas (A) through (G), and Formula (II). With some embodiments of the present invention, in addition to the polymer including residues of ((meth)acrylate-amine cation bis(substituted-sulfonyl)imide anion)) as described previously herein, the polymer matrix includes a further polymer, where the further polymer includes at least one of poly((meth)acrylonitrile), poly(vinylidene fluoride), poly(vinylidene fluoride-co-perfluoro(linear or branched $C_1$-$C_6$ alkylene)), or poly((linear or branched $C_1$-$C_8$ alkyl)(meth)acrylate).

For purposes of non-limiting illustration, an electrochromic device (3) according to the present invention is depicted in FIG. 1. Electrochromic device (3) includes a first substrate (11) having a first surface (14) and a second surface (17). First surface (14) of first substrate (11) includes a first transparent electrode layer (20), which is electrically conductive. First transparent electrode layer (20) resides over at least a portion of first surface (14) of first substrate (11). With some embodiments, first transparent electrode layer (20) is in the form of one or more patterns (such as, one or more designs and/or indicia) over first surface (14) of first substrate (11). With some further embodiments, first transparent electrode layer (20) forms a substantially continuous layer over first surface (14) of first substrate (11). First transparent electrode layer (20) is, with some embodiments, in electrical contact with at least one first electrical conductor (21), which can be a first electrically conductive wire.

Electrochromic device (3) includes a second substrate (23) having a first surface (26) and a second surface (29). First surface (26) of second substrate (23) includes a second transparent electrode layer (32), which is electrically conductive. Second transparent electrode layer (32) resides over at least a portion of first surface (26) of second substrate (23). With some embodiments, second transparent electrode layer (32) is in the form of one or more patterns (such as, one or more designs and/or indicia) over first surface (26) of second substrate (23). With some further embodiments, second transparent electrode layer (32) forms a substantially continuous layer over first surface (26) of second substrate (23). Second transparent electrode layer (32) is, with some embodiments, in electrical contact with at least one second electrical conductor (33), which can be a second electrically conductive second wire.

With further reference to electrochromic device (3) of FIG. 1, first transparent electrode layer (20) and second transparent electrode layer (32) are in opposing spaced facing opposition relative to each other.

Electrochromic device (3) further includes an electrochromic layer (35) that is interposed between first transparent electrode layer (20) and second transparent electrode layer (32). With some embodiments, electrochromic layer (35) is interposed between and in abutting relationship with first transparent electrode layer (20) and second transparent electrode layer (32).

The first substrate and the second substrate of the electrochromic devices are, with some embodiments of the present invention, each independently selected from transparent substrates. Transparent substrates, from which the first and second substrates can each be independently selected, are with some embodiments, fabricated from materials including, but not limited to, silica glass, organic polymers (such as, but not limited to, polycarbonate polymers), and combinations thereof. With some embodiments, the transparent substrates, from which the first and second substrates can each be independently selected, are fabricated from materials including silica glass. The first and second substrates can each independently have any suitable thickness. With some embodiments, the first and second substrates each independently have a thickness of from 1 mm to 25 mm, or from 2 mm to 10 mm.

The first and second transparent electrode layers of the electrochromic devices of the present invention, with some embodiments, include electrically conductive inorganic oxides, electrically conductive organic materials, electrically conductive metals, and/or electrically conductive carbon, such as carbon nanotubes and/or graphene. Examples of electrically conductive inorganic oxides, include, but are not limited to: tin oxide, which can be doped with a doping material, such as indium; and zinc oxide, which can further include, for example, aluminum. Examples of electrically conductive organic materials include, but are not limited to, poly(3,4-ethylenedioxythiophene), poly(4,4-dioctyl cyclopentadithiophene), and poly(3,4-ethylenedioxythiophene): poly(styrene sulfonate). The first and second transparent electrode layers, with some embodiments, can each independently be in the form of a grid of metal wires, a grid of carbon nanotubes, and/or a layer of graphene. With some embodiments, the first and second transparent electrode layers are each independently selected from semi-transparent metal layers. With some further embodiments, one of the first and second transparent electrode layers includes (or has associated therewith) a reflective metal layer (including, for example, aluminum, gold, and/or silver) and the electrochromic device is a reflective electrochromic device, such as a controllably reflective mirror.

In accordance with some embodiments, the first and second electrode layers of the electrochromic devices of the present invention, each independently include an electrically conductive material selected from indium-tin-oxide, poly(3,4-ethylenedioxythiophene):poly(styrene sulfonate), or combinations thereof.

The first and second electrode layers of the electrochromic devices, in accordance with some embodiments of the present invention, can each independently have any suitable thickness, provided they are both transparent and electrically conductive. With some embodiments, the first and second electrode layers of the electrochromic devices of the present invention, each independently have a thickness of from 0.01 micrometers to 10 micrometers.

Examples of articles, such as articles of manufacture, that may include or be defined by the electrochromic devices of the present invention include, but are not limited to: energy efficient and/or privacy transparencies (or windows), such as architectural and transportation transparencies or windows; mirrors, such as rearview mirrors; optical filters; and ophthalmic articles, such as corrective lenses, non-corrective lenses, magnifying lenses, protective lenses, and visors; and any other article or application where variable and controllable light transmission and/or color is desired.

The present invention also relates to an electrochromic composition that includes: (i) a cathodic component; (ii) an anodic component; (iii) an optional electrolyte; (iv) at least one of, (a) a polymeric thickener, or (b) a polymerizable monomer composition; and (v) a solvent. The polymeric thickener includes a polymer, where the polymer includes residues of a monomer represented by Formula (I) as described previously herein, and where the polymerizable monomer composition independently includes the monomer represented by Formula (I) as described previously herein.

The polymer of the polymer thickener with some embodiments includes residues of one or more comonomers that do not include an amine cation covalently bonded thereto. With some embodiments, the comonomer is selected from those classes and examples as discussed previously herein, such as linear or branched alkyl (meth)acrylate, cycloalkyl (meth)acrylate, and/or polyfunctional monomer including at least two (meth)acrylate groups.

The polymerizable monomer composition of the electrochromic composition, with some embodiments, includes one or more comonomers that do not include an amine cation covalently bonded thereto. With some embodiments, the comonomer, of the polymerizable monomer composition, is selected from those classes and examples as discussed previously herein, such as linear or branched alkyl (meth)acrylate, cycloalkyl (meth)acrylate, and/or polyfunctional monomer including at least two (meth)acrylate groups. The polymerizable monomer composition of the of the electrochromic composition, with some embodiments, includes one or more additives as described previously herein, including one or more initiators, such as, but not limited to, a thermally activated free radical polymerization initiators, as described previously herein.

The cathodic component, anodic component, anodic component anion, and optional electrolyte, of the electrochromic composition are each as describe previously herein with regard to the electrochromic devices of the present invention.

The electrochromic composition of the present invention includes a solvent. With some embodiments, the solvent of the electrochromic composition includes at least one of ethylene carbonate, propylene carbonate, gamma-butyrolactone, gamma-valerolactone, N-methylpyrrolidone, polyethylene glycol, carboxylic acid esters of polyethylene glycol, sulfolane, alpha, omega-($C_2$-$C_8$)dinitriles, or di(linear or branched $C_1$-$C_8$)acetamides.

In accordance with some embodiments, the anodic component, which includes the anodic component anion, further includes a counter-cation. Classes and examples of cations from which each counter-cation can be independently selected from those classes and examples a recited previously herein with regard to the electrochromic devices. With some embodiments of the electrochromic composition of the present invention, each counter-cation is independently selected from tetra(linear or branched alkyl) ammonium cation. In accordance with some further embodiments, each counter-cation is independently selected from tetra(linear or branched $C_1$-$C_{10}$ alkyl) ammonium cation.

With some embodiments, the cathodic component of the electrochromic composition further includes counter-anions, wherein each counter-anion of the cathodic component is selected from the group consisting of $BF_4^-$, $PF_6^-$, $ClO_4^-$, $CF_3SO_3^-$, $(CF_3SO_2)_2N^-$, $(CF_3SO_2)_3C^-$, and B(phenyl)$_4^-$. With some embodiments, the counter-anions of the cathodic component of the electrochromic composition do not include and are not selected from anodic component anions, such as represented by Formulas (III) and (IV).

The cathodic component having cationic charge, with some embodiments, is present in the electrochromic composition in an amount of from 0.25 percent by weight to 6.25 percent by weight, or from 0.5 percent by weight to 5 percent by weight, or from 1 percent by weight to 3 percent by weight, the percent weights in each case being based on the total weight of the electrochromic composition.

The anodic component, such as but not limited to the anodic component having an anion covalently bonded thereto, is present in the electrochromic composition, with some embodiments, in an amount of from 0.25 percent by weight to 6.25 percent by weight, or from 0.5 percent by weight to 5 percent by weight, or from 1 percent by weight to 3 percent by we, the percent weights in each case being based on the total weight of the electrochromic composition.

The electrolyte is present in the electrochromic composition, with some embodiments, in an amount of from 1 percent by weight to 75 percent by weight, or from 5 percent by weight to 50 percent by weight, or from 10 percent by weight to 30 percent by weight, the percent weights in each case being based on the total weight of the electrochromic composition.

The polymeric thickener and/or the polymerizable monomer composition is (or are together) present in the electrochromic composition, with some embodiments, in an amount of 5 percent by weight to 80 percent by weight, or from 10 percent by weight to 60 percent by weight, or from 15 percent by weight to 50 percent by weight, the percent weights in each case being based on the total weight of the electrochromic composition.

The solvent is present in the electrochromic composition, with some embodiments, in and amount of from 10 to 75 percent by weight, or from 20 to 60 percent by weight, or from 25 percent by weight to 50 percent by weight, the percent weights in each case being based on the total weight of the electrochromic composition.

The electrochromic composition of the present invention can, with some embodiments, include one or more art-recognized optional additives, such as, but not limited to, thermal stabilizers, UV stabilizers, rheology modifiers, static coloring agents (such as static tints and/or static dyes), kinetic additives (that accelerate electrode reaction) and combinations thereof. The optional additives are in each case as described previously herein with regard to the electrochromic device of the present invention. Each optional additive can be present in the electrochromic composition in any suitable active amount, such as from 0.05 percent by weight to 5 percent by weight, based on the total weight of the electrochromic composition (including the weight of the optional additive(s)).

The present invention also relates to an electrochromic composition that includes: (i) an electrochromic material including a cathodic component having cationic charge, where the cathodic component further includes counter-anions, where each counter-anion of the cathodic component is an anodic component having an anion covalently bonded thereto; (ii) an optional electrolyte; (iii) at least one of, (a) a polymeric thickener, or (b) a polymerizable monomer composition; and (v) a solvent. The polymeric thickener includes a polymer, where the polymer includes residues of a monomer represented by Formula (I) as described previously herein, and where the polymerizable monomer composition independently includes the monomer represented by Formula (I) as described previously herein.

The electrolyte, polymer of the polymeric thickener, polymerizable monomer composition, and solvent of the electrochromic compositions of the present invention are each as described previously herein.

The cathodic component having cationic charge, where the cathodic component further includes counter-anions, where each counter-anion of the cathodic component is an anodic component having an anion covalently bonded thereto, is as described previously herein, such as with reference to Formulas (IX) and (X).

The cathodic component having cationic charge, of the electrochromic composition, is as described previously herein, such as with reference to Formulas (V) and (VI). The anodic component having an anion covalently bonded thereto, of the electrochromic composition is as described previously herein, such as with reference to Formulas (III) and (IV).

With some embodiments of the electrochromic composition, the cathodic component having cationic charge and the anodic component having an anion covalently bonded thereto, together have a net neutral charge. The term “net neutral charge” with regard to the cathodic component having cationic charge and the anodic component having an anion covalently bonded thereto, is as described previously herein. In accordance with some embodiments of the electrochromic composition, the cathodic component having cationic charge is free of any other or further counter-anions, other than the anodic component having an anion covalently bonded thereto. Correspondingly, and with some embodiments of the electrochromic composition, the anodic component having an anion covalently bonded thereto is free of any other or further counter-cations, other than the cathodic component having cationic charge.

The percent weight amounts and ranges of the cathodic component having cationic charge, anodic component (such as but not limited to the anodic component having an anion covalently bonded thereto), electrolyte, polymeric thickener, polymerizable composition, and solvent, are in each case as described previously herein with regard to the electrochromic compositions of the present invention.

The electrochromic composition of the present invention, in which the electrochromic material includes a cathodic component having cationic charge, where the cathodic component further includes counter-anions, where each counter-anion of the cathodic component is an anodic component having an anion covalently bonded thereto, can with some embodiments further include one or more additives as described previously herein.

The present invention also relates to an electrochromic composition that includes: (i) a cathodic component; (ii) an anodic component; (iii) an optional electrolyte; (iv) at least one of, (a) a polymeric thickener, or (b) a polymerizable monomer composition; and (v) a solvent. The polymeric thickener includes a polymer, where the polymer includes residues of a monomer represented by Formula (I) as described previously herein, and where the polymerizable monomer composition independently includes the monomer represented by Formula (I) as described previously herein. The cathodic component (i), of the electrochromic layer, includes a cathodic component having cationic charge selected from at least one of a 1,1'-disubstituted-4,4'-dipyridinium cation represented by Formula (V) as described previously herein, or a 1,1-(alkane-alpha, omega-diyl)-bis-(1'-substituted-4,4'-dipyridinium) cation represented by Formula (VI) as described previously herein.

With reference to Formula (V) and Formula (VI), and in accordance with this embodiment, $R^{11}$, $R^{12}$, $R^{13}$, and $R^{15}$ are in each case independently selected from linear or branched alkyl, unsubstituted cycloalkyl, substituted cycloalkyl, unsubstituted aryl, substituted aryl, a group represented by Formula (VII) as described previously herein, and a group represented by Formula (VIII) as described previously herein.

In accordance with this embodiment, there is provided for Formula (V), that at least one of $R^{11}$ and $R^{12}$ is independently selected from the group represented by Formula (VII) or the group represented by Formula (VIII). There is also provided for Formula (VI), in accordance with this embodiment, that at least one of $R^{13}$ and $R^{15}$ is independently selected from the group represented by Formula (VII) or the group represented by Formula (VIII). In accordance with this embodiment, the cathodic component represented by Formula (V) and Formula (VI), in conjunction with the covalently bonded anions represented by Formula (VII) and/or (VIII), can in each case be referred to herein as cathodic zwitterionic components, and/or similar terms, such as cathodic zwitterion components.

The electrolyte, polymer of the polymeric thickener, polymerizable monomer composition, and solvent of the electrochromic compositions of the present invention are each as described previously herein.

As described previously herein, and in accordance with some embodiments of the cathodic zwitterionic embodiment of the present invention, the cathodic component having cationic charge, such as represented by Formula (V) and/or (VI), and the anodic component anion, selected from at least one anodic component anion represented by Formula (III) or Formula (IV), together have a net neutral charge. Such neutral charge embodiments can be described for purposes of non-limiting illustration with reference to Formulas (XI) and/or (XII) as provided previously herein.

The percent weight amounts and ranges of the cathodic component having cationic charge, anodic component (such as but not limited to the anodic component having an anion covalently bonded thereto), electrolyte, polymeric thickener, polymerizable composition, and solvent, are in each case as described previously herein with regard to the electrochromic compositions of the present invention.

In accordance with some embodiments of the cathodic zwitterionic embodiment of the electrochromic compositions of the present invention, can with some embodiments further include one or more additives as described previously herein.

With some embodiments, the electrochromic device can be prepared in accordance with the following general description, where the electrochromic layer is separately prepared and then laminated between the first and second transparent electrode layers. With the monomer composition of the polymer matrix including a polyfunctional monomer including at least two (meth)acrylate groups, all components of the electrochromic layer are combined to form a viscous solution. A liquid film is formed, such as using a doctor blade or draw-down bar, on a sacrificial or temporary liner (composed of polyethylene terephthalate, in some embodiments). The liquid film while on the sacrificial/temporary liner is subjected to irradiation with UV-light, such as from 350-395 nm for 3 to 60 minutes, which results in the formation of a solidified film/layer, which is the electrochromic layer. The solidified film/electrochromic layer, is separated from the sacrificial/temporary liner (which is discarded), cut to size (if necessary), and placed over or onto a first transparent electrode layer of a first substrate. The second transparent electrode of a second substrate is positioned over or onto the other (or facing/exposed) side of the electrochromic layer, to form a stack that includes the first substrate, the first transparent electrode, the electrochromic layer, the second transparent electrode, and the second substrate. The stack may further include electrical connectors that are in separate electrical contact with the first and second transparent electrodes. The stack (with an optional gasket surrounding the outer edges of at least the electrochromic layer) is subjected to vacuum lamination, with the concurrent application of elevated temperature, such as from 110° C. to 200° C., for a period of time, such as from 10 to 30 minutes. After cooling, the so formed electrochromic device is removed from vacuum lamination device.

With some embodiments, the electrochromic device can be prepared in accordance with the following general description, where the electrochromic layer is formed in situ between the first and second transparent electrode layers. All components of the electrochromic layer, including the polymerizable monomer composition, are combined and stirred to form a viscous mixture. This mixture is volumetrically dosed onto a first transparent electrode layer of a first substrate. The second transparent electrode of a second substrate is positioned over or onto the other (or facing/exposed) side of the electrochromic layer, to form a stack that includes the first substrate, the first transparent electrode, the viscous electrochromic mixture, the second transparent electrode, and the second substrate. The stack may further include electrical connectors that are in separate electrical contact with the first and second transparent electrodes. The stack (with an optional gasket surrounding the outer edges of at least the electrochromic layer) is subjected to vacuum lamination, with the concurrent application of elevated temperature, such as from 110° C. to 200° C., for a period of time, such as from 10 to 30 minutes. After cooling, the vacuum laminated stack is removed from vacuum lamination device. The vacuum laminated stack is subjected to UV-light, such as from 350-395 nm for 3 to 60 minutes, which results in formation of the electrochromic device including therein a solidified film/layer, which is the electrochromic layer.

The present invention can further be characterized by one or more of the following non-limiting clauses.

Clause 1: An electrochromic device comprising:

(a) a first substrate having a surface comprising a first transparent electrode layer;

(b) a second substrate having a surface comprising a second transparent conductive electrode layer, wherein said first transparent electrode layer and said second transparent electrode layer are in opposing spaced opposition; and (c) an electrochromic layer interposed between said first transparent electrically conductive electrode layer and said second transparent electrically conductive electrode layer, wherein said electrochromic layer comprises, (i) a cathodic component, (ii) an anodic component, (iii) an optional electrolyte, and (iv) a polymer matrix, wherein said polymer matrix comprises a polymer, wherein said polymer comprises residues of a monomer represented by the following Formula (I), (I)

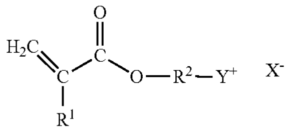

wherein for Formula (I), $R^1$ is in each case independently hydrogen or methyl, $R^2$ is in each case independently a single bond, a divalent linear or branched alkane, or divalent linear or branched cycloalkane, $Y^+$ is in each case independently represented by one of the following Formulas (A), (B), (C), (D), (E), (F), and (G), (A)

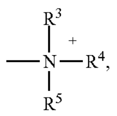

(B)

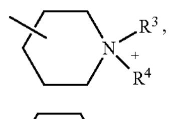

(C)

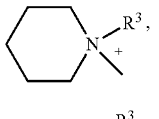

(D)

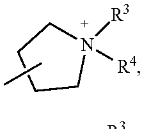

(E)

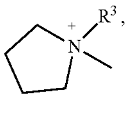

-continued (F)

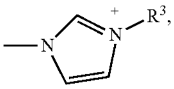

and (G)

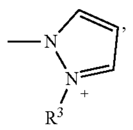

wherein independently for each of Formulas (A), (B), (C), (D), (E), (F), and (G), $R^3$, $R^4$, and $R^5$ are in each case independently selected from linear or branched alkyl or cycloalkyl, and $X^-$ is in each case independently represented by the following Formula (II), (II)

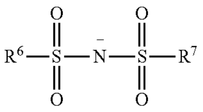

wherein for Formula (II), $R^6$ and $R^7$ are each independently selected from fluorine, linear or branched fluorinated alkyl, or linear or branched perfluorinated alkyl.

Clause 2: The electrochromic device of clause 1, wherein for Formula (I), $R^2$ is independently in each case a single bond, a divalent linear or branched $C_1$-$C_{10}$ alkane, or divalent linear or branched $C_3$-$C_7$ cycloalkane, independently for each of Formulas (A), (B), (C), (D), (E), (F), and (G), $R^3$, $R^4$, and $R^5$ are in each case independently selected from linear or branched $C_1$-$C_{10}$ alkyl or $C_3$-$C_7$ cycloalkyl, and for Formula (II), $R^6$ and $R^7$ are each independently selected from fluorine, linear or branched $C_1$-$C_{10}$ fluorinated alkyl, or linear or branched $C_1$-$C_{10}$ perfluorinated alkyl.

Clause 3: The electrochromic device of clause 1 or clause 2, wherein for Formula (I), $R^2$ is independently in each case a single bond or a divalent linear or branched $C_1$-$C_6$ alkane, independently for each of Formulas (A), (B), (C), (D), (E), (F), and (G), $R^3$, $R^4$, and $R^5$ are in each case independently selected from linear or branched $C_1$-$C_6$ alkyl, and for Formula (II), $R^6$ and $R^7$ are each independently selected from linear or branched $C_1$-$C_6$ perfluorinated alkyl.

Clause 4: The electrochromic device of any one of clauses 1, 2, or 3, wherein said polymer, of said polymer matrix, further comprises residues of a comonomer comprising at least one of linear or branched alkyl (meth)acrylate, cycloalkyl (meth)acrylate, or polyfunctional monomer comprising at least two (meth)acrylate groups.

Clause 5: The electrochromic device of any one of clauses 1, 2, 3, or 4, wherein said polymer, of said polymer matrix, is formed by polymerizing a monomer composition comprising said monomer represented by Formula (I) between said first transparent electrically conductive electrode layer and said second transparent electrically conductive electrode layer.

Clause 6: The electrochromic device of any one of clauses 1, 2, 3, 4, or 5, wherein said anodic component comprises an anodic component anion selected from at least one anodic component anion represented by the following Formula (III) or Formula (IV), (III)

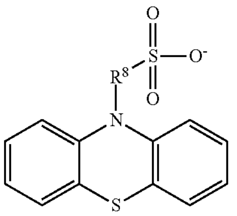

(IV)

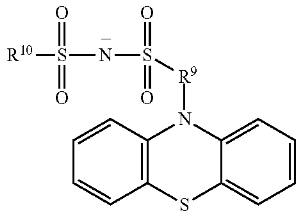

wherein for Formula (III), $R^8$ is selected from divalent linear or branched alkane linking group, and for Formula (IV), $R^9$ is selected from divalent linear or branched alkane linking group, and $R^{10}$ is selected from fluorine, linear or branched fluorinated alkyl, or linear or branched perfluorinated alkyl.

Clause 7: The electrochromic device of clause 6, wherein for Formula (III), $R^8$ is selected from divalent linear or branched $C_1$-$C_{10}$ alkane linking group, and for Formula (IV), $R^9$ is selected from divalent linear or branched $C_1$-$C_{10}$ alkane linking group, and $R^{10}$ is selected from fluorine, linear or branched $C_1$-$C_{10}$ fluorinated alkyl, or linear or branched $C_1$-$C_{10}$ perfluorinated alkyl.

Clause 8: The electrochromic device of clause 6 or clause 7, wherein said anodic component further comprises a counter-cation.

Clause 9: The electrochromic device of clause 8, wherein each counter-cation is independently selected from optionally substituted nitrogen-containing aliphatic heterocycle ammonium cations, optionally substituted nitrogen-containing aromatic heterocycle ammonium cations, tetrasubstituted ammonium cations, or combinations thereof.

Clause 10: The electrochromic device of clause 8 or clause 9, wherein each counter-cation is selected from tetrasubstituted ammonium cations represented by the following Formula (H), Formula (H)

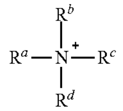

wherein $R^a$, $R^b$, $R^c$, and $R^d$ are each independently selected from linear or branched alkyl, unsubstituted cycloalkyl, substituted cycloalkyl, unsubstituted aryl, and substituted aryl.

Clause 11: The electrochromic device of clause 10, wherein $R^a$, $R^b$, $R^c$, and $R^d$ are each independently selected from linear or branched $C_1$-$C_{10}$ alkyl, unsubstituted $C_3$-$C_7$ cycloalkyl, substituted $C_3$-$C_7$ cycloalkyl, unsubstituted phenyl, or substituted phenyl.

Clause 12: The electrochromic device of clause 10 or clause 11, wherein $R^a$, $R^b$, $R^c$, and $R^d$ are each independently selected from linear or branched $C_1$-$C_{10}$ alkyl.

Clause 13: The electrochromic device of any one of clauses 8, 9, 10, 11, or 12, wherein each counter-cation is independently selected from tetra(linear or branched alkyl) ammonium cation.

Clause 14: The electrochromic device of any one of clauses 8, 9, 10, 11, 12, or 13, wherein each counter-cation is independently selected from tetra(linear or branched $C_1$-$C_{10}$ alkyl) ammonium cation.

Clause 15: The electrochromic device of any one of clauses 8, 9, 10, 11, 12, 13, or 14, wherein said cathodic component comprises at least one of a 1,1'-disubstituted-4,4'-dipyridinium cation represented by the following Formula (V), or a 1,1-(alkane-alpha, omega-diyl)-bis-(1'-substituted-4,4'-dipyridinium) cation represented by the following Formula (VI), Formula (V)

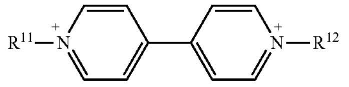

Formula (VI)

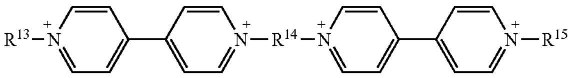

wherein for Formula (V), $R^{11}$ and $R^{12}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and for Formula (VI), $R^{13}$ and $R^{15}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and $R^{14}$ is selected from divalent linear or branched $C_1$-$C_{10}$ alkane linking group.

Clause 16: The electrochromic device of clause 15, wherein for Formula (V) R' and $R^{12}$ are each independently selected from linear or branched $C_1$-$C_4$ alkyl, unsubstituted phenyl, and substituted phenyl, and for Formula (VI) $R^{13}$ and $R^{15}$ are each independently selected from linear or branched $C_1$-$C_4$ alkyl, unsubstituted phenyl, and substituted phenyl, and $R^{14}$ is selected from divalent linear or branched $C_1$-$C_8$ alkane linking group.

Clause 17: The electrochromic device of clause 15 or clause 16, wherein said cathodic component further comprises counter-anions, wherein each counter-anion of the cathodic component is selected from the group consisting of $BF_4^-$, $PF_6^-$, $ClO_4^-$, $CF_3SO_3^-$, $(CF_3SO_2)_2N^-$, $(CF_3SO_2)_3C^-$, and $B(phenyl)_4^-$.

Clause 18: The electrochromic device of any one of clauses 1, 2, 3, 4, 5, 6, 7, 8, 9, 10, 11, 12, 13, 14, 15, 16, or 17, wherein said electrolyte is present and comprises, at least one electrolyte anion, wherein each electrolyte anion is independently selected from bis(perfluoro(linear or branched $C_1$-$C_6$ alkysulfonyl)imide, and at least one electrolyte cation, wherein each electrolyte cation is independently selected from 1-(linear or branched $C_1$-$C_6$ alkyl)-3-(linear or branched $C_1$-$C_6$ alkyl)imidazolium, 1-(linear or branched $C_1$-$C_6$ alkyl)-1-(linear or branched $C_1$-$C_6$ alkyl)pyrrolidinium, 1-(linear or branched $C_1$-$C_6$ alkyl)-1-(linear or branched $C_1$-$C_6$ alkyl)piperidinium, phosphonium cations, such as, but not limited to tetra(linear or branched $C_1$-$C_6$ alkyl)phosphonium, or tri($C_5$-$C_8$ cycloalkyl)-(linear or branched $C_1$-$C_6$ alkyl)phosphonium, or ammonium cations, such as, but not limited to, tetra(linear or branched $C_1$-$C_6$)ammonium, and tri($C_5$-$C_8$ cycloalkyl)-(linear or branched $C_1$-$C_6$ alkyl)ammonium.

Clause 19: The electrochromic device of any one of clauses 1, 2, 3, 4, 5, 6, 7, 8, 9, 10, 11, 12, 13, 14, 15, 16, 17, or 18, wherein said polymer matrix comprises a further polymer, wherein said further polymer comprises at least one of poly((meth)acrylonitrile), poly(vinylidene fluoride), poly(vinylidene fluoride-co-perfluoro(linear or branched $C_1$-$C_6$ alkylene)), or poly((linear or branched $C_1$-$C_8$ alkyl) (meth)acrylate).

Clause 20: An electrochromic device comprising:

(a) a first substrate having a surface comprising a first transparent electrode layer;

(b) a second substrate having a surface comprising a second transparent conductive electrode layer, wherein said first transparent electrode layer and said second transparent electrode layer are in opposing spaced opposition; and (c) an electrochromic layer interposed between said first transparent electrically conductive electrode layer and said second transparent electrically conductive electrode layer, wherein said electrochromic layer comprises, (i) an electrochromic material comprising a cathodic component having cationic charge, wherein said cathodic component further comprises counter-anions, wherein each counter-anion of said cathodic component is an anodic component having an anion covalently bonded thereto, (ii) an optional electrolyte, and (iii) a polymer matrix, wherein said polymer matrix comprises a polymer, wherein said polymer comprises residues of a monomer represented by the following Formula (I), (I)

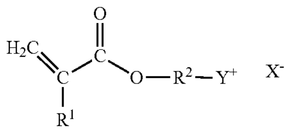

wherein for Formula (I), $R^1$ is in each case independently hydrogen or methyl, $R^2$ is in each case independently a single bond, a divalent linear or branched alkane, or divalent linear or branched cycloalkane, $Y^+$ is in each case independently represented by one of the following Formulas (A), (B), (C), (D), (E), (F), and (G), (A)

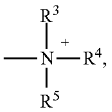

(B)

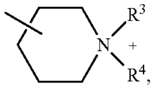

(C)

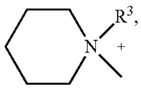

(D)

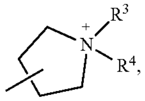

(E)

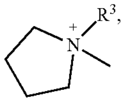

(F)

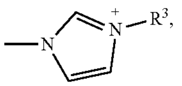

and (G)

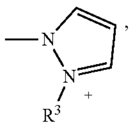

wherein independently for each of Formulas (A), (B), (C), (D), (E), (F), and (G), $R^3$, $R^4$, and $R^5$ are in each case independently selected from linear or branched alkyl or cycloalkyl, and $X^-$ is represented by the following Formula (II), (II)

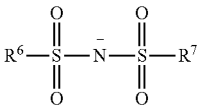

wherein for Formula (II), $R^6$ and $R^7$ are each independently selected from fluorine, linear or branched fluorinated alkyl, or linear or branched perfluorinated alkyl.

Clause 21: The electrochromic device of clause 20, wherein said anodic component having an anion covalently bonded thereto is selected from an anodic component represented by at least one of the following Formula (III) or Formula (IV), (III)

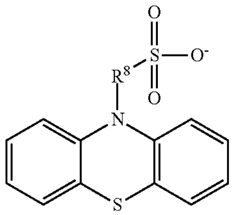

-continued (IV)

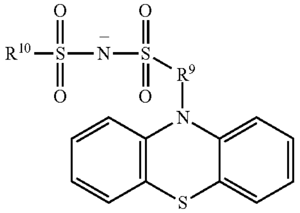

wherein for Formula (III), $R^8$ is selected from divalent linear or branched alkane linking group, and for Formula (IV), $R^9$ is selected from divalent linear or branched alkane linking group, and $R^{10}$ is selected from fluorine, linear or branched fluorinated alkyl, or linear or branched perfluorinated alkyl.

Clause 22: The electrochromic device of clause 21, wherein for Formula (III), $R^8$ is selected from divalent linear or branched $C_1$-$C_{10}$ alkane linking group, and for Formula (IV), $R^9$ is selected from divalent linear or branched $C_1$-$C_{10}$ alkane linking group, and $R^{10}$ is selected from fluorine, linear or branched $C_1$-$C_{10}$ fluorinated alkyl, or linear or branched $C_1$-$C_{10}$ perfluorinated alkyl.

Clause 23: The electrochromic device of clause 21 or clause 2, wherein said cathodic component comprises at least one of a 1,1'-disubstituted-4,4'-dipyridinium cation represented by the following Formula (V), or a 1,1-(alkane-alpha, omega-diyl)-bis-(1'-substituted-4,4'-dipyridinium) cation represented by the following Formula (VI), Formula (V)

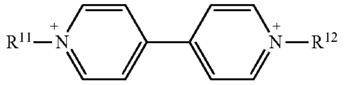

Formula (VI)

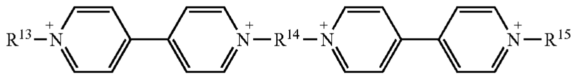

wherein for Formula (V), $R^{11}$ and $R^{12}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and for Formula (VI), $R^{13}$ and $R^{15}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and $R^{14}$ is selected from divalent linear or branched $C_1$-$C_{10}$ alkane linking group.

Clause 24: The electrochromic device of clause 23, wherein for Formula (V) R' and $R^{12}$ are each independently selected from linear or branched $C_1$-$C_4$ alkyl, unsubstituted phenyl, and substituted phenyl, and for Formula (VI) $R^{13}$ and $R^{15}$ are each independently selected from linear or branched $C_1$-$C_4$ alkyl, unsubstituted phenyl, and substituted phenyl, and $R^{14}$ is selected from divalent linear or branched $C_1$-$C_5$ alkane linking group.

Clause 25: The electrochromic device of any one of clauses 20, 21, 22, 23, or 24, wherein for Formula (I), $R^2$ is independently in each case a single bond, a divalent linear or branched $C_1$-$C_{10}$ alkane, or divalent linear or branched $C_3$-$C_7$ cycloalkane, independently for each of Formulas (A), (B), (C), (D), (E), (F), and (G), $R^3$, $R^4$, and $R^5$ are in each case independently selected from linear or branched $C_1$-$C_{10}$ alkyl or $C_3$-$C_7$ cycloalkyl, and for Formula (II), $R^6$ and $R^7$ are each independently selected from fluorine, linear or branched $C_1$-$C_{10}$ fluorinated alkyl, or linear or branched $C_1$-$C_{10}$ perfluorinated alkyl.

Clause 26: The electrochromic device of any one of clauses 20, 21, 22, 23, 24, or 25, wherein for Formula (I), $R^2$ is independently in each case a single bond or a divalent linear or branched $C_1$-$C_6$ alkane, independently for each of Formulas (A), (B), (C), (D), (E), (F), and (G), $R^3$, $R^4$, and $R^5$ are in each case independently selected from linear or branched $C_1$-$C_6$ alkyl, and for Formula (II), $R^6$ and $R^7$ are each independently selected from linear or branched $C_1$-$C_6$ perfluorinated alkyl.

Clause 27: The electrochromic device of any one of clauses 20, 21, 22, 23, 24, 25, or 26, wherein said polymer, of said polymer matrix, is formed by polymerizing a monomer composition comprising said monomer represented by Formula (I) between said first transparent electrically conductive electrode layer and said second transparent electrically conductive electrode layer.

Clause 28: The electrochromic device of any one of clauses 20, 21, 22, 23, 24, 25, 26, or 27 wherein said polymer, of said polymer matrix, further comprises residues of a comonomer comprising at least one of linear or branched alkyl (meth)acrylate, cycloalkyl (meth)acrylate, or polyfunctional monomer comprising at least two (meth) acrylate groups.

Clause 29: The electrochromic device of any one of clauses 20, 21, 22, 23, 24, 25, 26, 27, or 28 wherein said electrolyte is present and comprises, at least one electrolyte anion, wherein each electrolyte anion is independently selected from bis(perfluoro(linear or branched $C_1$-$C_6$ alkysulfonyl)imide, and at least one electrolyte cation, wherein each electrolyte cation is independently selected from 1-(linear or branched $C_1$-$C_6$ alkyl)-3-(linear or branched $C_1$-$C_6$ alkyl)imidazolium, 1-(linear or branched $C_1$-$C_6$ alkyl)-1-(linear or branched $C_1$-$C_6$ alkyl)pyrrolidinium 1-(linear or branched $C_1$-$C_6$ alkyl)-1-(linear or branched $C_1$-$C_6$ alkyl)piperidinium, phosphonium cations, such as, but not limited to tetra(linear or branched $C_1$-$C_6$ alkyl)phosphonium, or tri($C_5$-$C_8$ cycloalkyl)-(linear or branched $C_1$-$C_6$ alkyl)phosphonium, or ammonium cations, such as, but not limited to, tetra(linear or branched $C_1$-$C_6$)ammonium, and tri($C_5$-$C_8$ cycloalkyl)-(linear or branched $C_1$-$C_6$ alkyl)ammonium.

Clause 30: An electrochromic device comprising:

(a) a first substrate having a surface comprising a first transparent electrode layer;

(b) a second substrate having a surface comprising a second transparent conductive electrode layer, wherein said first transparent electrode layer and said second transparent electrode layer are in opposing spaced opposition; and (c) an electrochromic layer interposed between said first transparent electrically conductive electrode layer and said second transparent electrically conductive electrode layer, wherein said electrochromic layer comprises, (i) a cathodic component, (ii) an anodic component, (iii) an optional electrolyte, and (iv) a polymer matrix, wherein said polymer matrix comprises a polymer, wherein said polymer comprises residues of a monomer represented by the following Formula (I), (I)

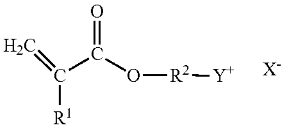

wherein for Formula (I), $R^1$ is in each case independently hydrogen or methyl, $R^2$ is in each case independently a single bond, a divalent linear or branched alkane, or divalent linear or branched cycloalkane, $Y^+$ is in each case independently represented by one of the following Formulas (A), (B), (C), (D), (E), (F), and (G), (A)

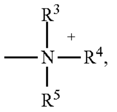

(B)

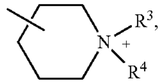

(C)

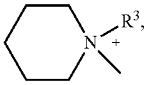

(D)

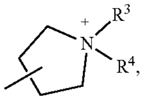

(E)

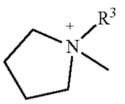

(F)

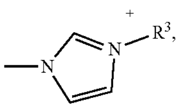

and (G)

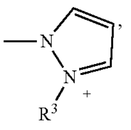

wherein independently for each of Formulas (A), (B), (C), (D), (E), (F), and (G), $R^3$, $R^4$, and $R^5$ are in each case independently selected from linear or branched alkyl or cycloalkyl, and $X^-$ is represented by the following Formula (II), (II)

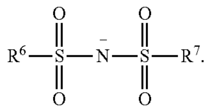

wherein for Formula (II), $R^6$ and $R^7$ are each independently selected from fluorine, linear or branched fluorinated alkyl, or linear or branched perfluorinated alkyl, and wherein said cathodic component comprises a cathodic component having cationic charge selected from at least one of a 1,1'-disubstituted-4,4'-dipyridinium cation represented by the following Formula (V), or a 1,1-(alkane-alpha, omega-diyl)-bis-(1'-substituted-4,4'-dipyridinium) cation represented by the following Formula (VI), Formula (V)

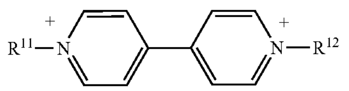

Formula (VI)

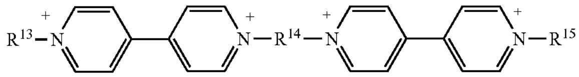

wherein for Formula (V) and Formula (VI), $R^{11}$, $R^{12}$, $R^{13}$, and $R^{15}$ are in each case independently selected from linear or branched alkyl, unsubstituted cycloalkyl, substituted cycloalkyl, unsubstituted aryl, substituted aryl, a group represented by the following Formula (VII), (VII)

$$-R^{16}-SO_3^-,$$ and a group represented by the following Formula (VIII), (VIII)

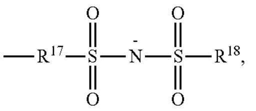

wherein for Formula (VII) and Formula (VIII), $R^{16}$ and $R^{17}$ are in each case independently selected from divalent linear or branched alkane linking group, and for Formula (VIII), $R^{18}$ is selected from fluorine, linear or branched fluorinated alkyl, or linear or branched perfluorinated alkyl, and for Formula (VI), $R^{14}$ is selected from divalent linear or branched alkane linking group, provided that for Formula (V), at least one of $R^{11}$ and $R^{12}$ is independently selected from said group represented by Formula (VII) or said group represented by Formula (VIII), and provided that for Formula (VI), at least one of $R^{13}$ and $R^{15}$ is independently selected from said group represented by Formula (VII) or said group represented by Formula (VIII).

Clause 31: The electrochromic device of clause 30, wherein for Formula (I), $R^2$ is independently in each case a single bond, a divalent linear or branched $C_1$-$C_{10}$ alkane, or divalent linear or branched $C_3$-$C_7$ cycloalkane, independently for each of Formulas (A), (B), (C), (D), (E), (F), and (G), $R^3$, $R^4$, and $R^5$ are in each case independently selected from linear or branched $C_1$-$C_{10}$ alkyl or $C_3$-$C_7$ cycloalkyl, and for Formula (II), $R^6$ and $R^7$ are each independently selected from fluorine, linear or branched $C_1$-$C_{10}$ fluorinated alkyl, or linear or branched $C_1$-$C_{10}$ perfluorinated alkyl.

Clause 32: The electrochromic device of clause 30 or clause 31, wherein for Formula (I), $R^2$ is independently in each case a single bond or a divalent linear or branched $C_1$-$C_6$ alkane, independently for each of Formulas (A), (B), (C), (D), (E), (F), and (G), $R^3$, $R^4$, and $R^5$ are in each case independently selected from linear or branched $C_1$-$C_6$ alkyl, and for Formula (II), $R^6$ and $R^7$ are each independently selected from linear or branched $C_1$-$C_6$ perfluorinated alkyl.

Clause 33: The electrochromic device of any one of clauses 30, 31, or 32, wherein said polymer, of said polymer matrix, further comprises residues of a comonomer comprising at least one of linear or branched alkyl (meth) acrylate, cycloalkyl (meth)acrylate, or polyfunctional monomer comprising at least two (meth)acrylate groups.

Clause 34: The electrochromic device of any one of clauses 30, 31, 32, or 33, wherein said polymer, of said polymer matrix, is formed by polymerizing a monomer composition comprising said monomer represented by Formula (I) between said first transparent electrically conductive electrode layer and said second transparent electrically conductive electrode layer.

Clause 35: The electrochromic device of any one of clauses 30, 31, 32, 33, or 34, wherein for Formula (V), $R^{11}$ and $R^{12}$ are each independently selected from linear or branched $C_1$-$C_4$ alkyl, unsubstituted phenyl, substituted phenyl, said group represented by Formula (VII), and said group represented by Formula (VIII), and for Formula (VI), $R^{13}$ and $R^{15}$ are each independently selected from linear or branched $C_1$-$C_4$ alkyl, unsubstituted phenyl, substituted phenyl, said group represented by Formula (VII), and said group represented by Formula (VIII), and $R^{14}$ is selected from divalent linear or branched $C_1$-$C_8$ alkane linking group.

Clause 36: The electrochromic device of any one of clauses 30, 31, 32, 33, 34, or 35, wherein for Formula (VII) and Formula (VIII), $R^{16}$ and $R^{17}$ are in each case independently selected from divalent linear or branched $C_1$-$C_{10}$ alkane linking group, and for Formula (VIII), $R^{18}$ is selected from fluorine, linear or branched fluorinated $C_1$-$C_{10}$ alkyl, or linear or branched perfluorinated $C_1$-$C_{10}$ alkyl.

Clause 37: The electrochromic device of any one of clauses 30, 31, 32, 33, 34, 35, or 36, wherein said anodic component comprises an anodic component anion selected from at least one anodic component anion represented by the following Formula (III) or Formula (IV), (III)

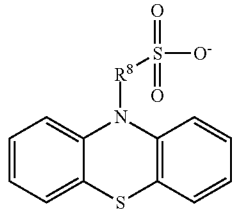

(IV)

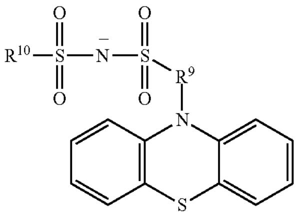

wherein for Formula (III), $R^8$ is selected from divalent linear or branched alkane linking group, and for Formula (IV), $R^9$ is selected from divalent linear or branched alkane linking group, and $R^{10}$ is selected from fluorine, linear or branched fluorinated alkyl, or linear or branched perfluorinated alkyl.

Clause 38: The electrochromic device of clause 37, wherein for Formula (III), $R^8$ is selected from divalent linear or branched $C_1$-$C_{10}$ alkane linking group, and for Formula (IV), $R^9$ is selected from divalent linear or branched $C_1$-$C_{10}$ alkane linking group, and $R^{10}$ is selected from fluorine, linear or branched $C_1$-$C_{10}$ fluorinated alkyl, or linear or branched $C_1$-$C_{10}$ perfluorinated alkyl.

Clause 39: The electrochromic device of clause 37 or clause 38, wherein said cathodic component having cationic charge and said anodic component anion, selected from at least one anodic component anion represented by Formula (III) or Formula (IV), together have a net neutral charge.

Clause 40: The electrochromic device of clause 37 or clause 38, wherein said anodic component further comprises a counter-cation.

Clause 41: The electrochromic device of clause 40, wherein each counter-cation is independently selected from optionally substituted nitrogen-containing aliphatic heterocycle ammonium cations, optionally substituted nitrogen-containing aromatic heterocycle ammonium cations, tetrasubstituted ammonium cations, or combinations thereof.

Clause 42: The electrochromic device of clause 40 or clause 41, wherein each counter-cation is selected from tetrasubstituted ammonium cations represented by the following Formula (H), Formula (H)

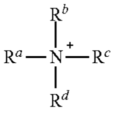

wherein $R^a$, $R^b$, $R^c$, and $R^d$ are each independently selected from linear or branched alkyl, unsubstituted cycloalkyl, substituted cycloalkyl, unsubstituted aryl, and substituted aryl.

Clause 43: The electrochromic device of clause 42, wherein $R^a$, $R^b$, $R^c$, and $R^d$ are each independently selected from linear or branched $C_1$-$C_{10}$ alkyl, unsubstituted $C_3$-$C_7$ cycloalkyl, substituted $C_3$-$C_7$ cycloalkyl, unsubstituted phenyl, or substituted phenyl.

Clause 44: The electrochromic device of clause 42 or clause 43, wherein $R^a$, $R^b$, $R^c$, and $R^d$ are each independently selected from linear or branched $C_1$-$C_{10}$ alkyl.

Clause 45: The electrochromic device of any one of clauses 40, 41, 42, 43, or 44, wherein each counter-cation is independently selected from tetra(linear or branched alkyl) ammonium cation.

Clause 46: The electrochromic device of any one of clauses 40, 41, 42, 43, 44, or 45, wherein each counter-cation is independently selected from tetra(linear or branched $C_1$-$C_{10}$ alkyl) ammonium cation.

Clause 47: The electrochromic device of any one of clauses 40, 41, 42, 43, 44, 45, or 46, wherein said cathodic component further comprises counter-anions, wherein each counter-anion of the cathodic component is selected from the group consisting of $BF_4^-$, $PF_6^-$, $ClO_4^-$, $CF_3SO_3^-$, $(CF_3SO_2)_2N^-$, $(CF_3SO_2)_3C^-$, and $B(phenyl)_4^-$.

Clause 48: The electrochromic device of any one of clauses 30, 31, 32, 33, 34, 35, 36, 37, 38, 39, 40, 41, 42, 43, 44, 45, 46, or 47, wherein said electrolyte is present and comprises, at least one electrolyte anion, wherein each electrolyte anion is independently selected from bis(perfluoro(linear or branched $C_1$-$C_6$ alkysulfonyl)imide, and at least one electrolyte cation, wherein each electrolyte cation is independently selected from 1-(linear or branched $C_1$-$C_6$ alkyl)-3-(linear or branched $C_1$-$C_6$ alkyl)imidazolium, 1-(linear or branched $C_1$-$C_6$ alkyl)-1-(linear or branched $C_1$-$C_6$ alkyl)pyrrolidinium, 1-(linear or branched $C_1$-$C_6$ alkyl)-1-(linear or branched $C_1$-$C_6$ alkyl)piperidinium, phosphonium cations, such as, but not limited to tetra(linear or branched $C_1$-$C_6$ alkyl)phosphonium, or tri($C_5$-$C_8$ cycloalkyl)-(linear or branched $C_1$-$C_6$ alkyl)phosphonium, or ammonium cations, such as, but not limited to, tetra(linear or branched $C_1$-$C_6$)ammonium, and tri($C_5$-$C_8$ cycloalkyl)-(linear or branched $C_1$-$C_6$ alkyl)ammonium.

Clause 49: The electrochromic device of any one of clauses 30, 31, 32, 33, 34, 35, 36, 37, 38, 39, 40, 41, 42, 43, 44, 45, 46, 47, or 48, wherein said polymer matrix comprises a further polymer, wherein said further polymer comprises at least one of poly((meth)acrylonitrile), poly(vinylidene fluoride), poly(vinylidene fluoride-co-perfluoro(linear or branched $C_1$-$C_6$ alkylene)), or poly((linear or branched $C_1$-$C_8$ alkyl)(meth)acrylate).

Clause 50: The electrochromic device of any one of clauses 30, 31, 32, 33, 34, 35, 36, 37, 38, 39, 40, 41, 42, 43, 44, 45, 46, 47, 48, or 49, wherein for Formula (V), $R^{11}$ and $R^{12}$ are each independently selected from said group represented by Formula (VII), and said group represented by Formula (VIII), and for Formula (VI), $R^{13}$ and $R^{15}$ are each independently selected from said group represented by Formula (VII), and said group represented by Formula (VIII).

Clause 51: An electrochromic composition comprising:

(i) a cathodic component, (ii) an anodic component, (iii) an optional electrolyte, (iv) at least one of, (a) a polymeric thickener, or (b) a polymerizable monomer composition, and (v) a solvent, wherein said polymeric thickener comprises a polymer, wherein said polymer comprises residues of a monomer represented by the following Formula (I), and wherein said polymerizable monomer composition independently comprises said monomer represented by the following Formula (I), (I)

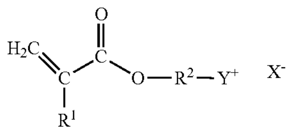

wherein for Formula (I), $R^1$ is in each case independently hydrogen or methyl, $R^2$ is in each case independently a single bond, a divalent linear or branched alkane, or divalent linear or branched cycloalkane, $Y^+$ is in each case independently represented by one of the following Formulas (A), (B), (C), (D), (E), (F), and (G), (A)

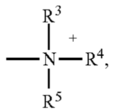

(B)

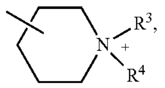

(C)

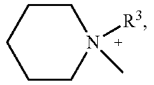

(D)

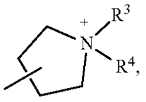

(E)

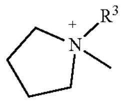

(F)

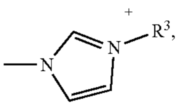

and (G)

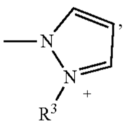

wherein independently for each of Formulas (A), (B), (C), (D), (E), (F), and (G), $R^3$, $R^4$, and $R^5$ are in each case independently selected from linear or branched alkyl or cycloalkyl, and $X^-$ is represented by the following Formula (II), (II)

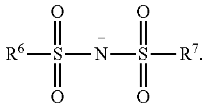

wherein for Formula (II), $R^6$ and $R^7$ are each independently selected from fluorine, linear or branched fluorinated alkyl, or linear or branched perfluorinated alkyl.

Clause 52: The electrochromic composition of clause 51, wherein said solvent comprises at least one of ethylene carbonate, propylene carbonate, gamma-butyrolactone, gamma-valerolactone, N-methylpyrrolidone, polyethylene glycol, carboxylic acid esters of polyethylene glycol, sulfolane, alpha, omega-($C_2$-$C_8$)dinitriles, or di(linear or branched $C_1$-$C_8$)acetamides.

Clause 53: The electrochromic composition of clause 51 or clause 52, wherein for Formula (I), $R^2$ is independently in each case a single bond, a divalent linear or branched $C_1$-$C_{10}$ alkane, or divalent linear or branched $C_3$-$C_7$ cycloalkane, independently for each of Formulas (A), (B), (C), (D), (E), (F), and (G), $R^3$, $R^4$, and $R^5$ are in each case independently selected from linear or branched $C_1$-$C_{10}$ alkyl or $C_3$-$C_7$ cycloalkyl, and for Formula (II), $R^6$ and $R^7$ are each independently selected from fluorine, linear or branched $C_1$-$C_{10}$ fluorinated alkyl, or linear or branched $C_1$-$C_{10}$ perfluorinated alkyl.

Clause 54: The electrochromic composition of any one of clause 51, 52, or 53, wherein for Formula (I), $R^2$ is independently in each case a single bond or a divalent linear or branched $C_1$-$C_6$ alkane, independently for each of Formulas (A), (B), (C), (D), (E), (F), and (G), $R^3$, $R^4$, and $R^5$ are in each case independently selected from linear or branched $C_1$-$C_6$ alkyl, and for Formula (II), $R^6$ and $R^7$ are each independently selected from linear or branched $C_1$-$C_6$ perfluorinated alkyl.

Clause 55: The electrochromic composition of any one of clauses 51, 52, 53, or 54, wherein said polymeric thickener further comprising residues of a comonomer, and said polymerizable composition independently further comprises comonomer, wherein the comonomer in each case independently comprises at least one of linear or branched alkyl (meth)acrylate, cycloalkyl (meth)acrylate, or polyfunctional monomer comprising at least two (meth)acrylate groups.

Clause 56: The electrochromic composition of any one of clauses 51-55, wherein said anodic component comprises an anodic component anion selected from at least one anodic component anion represented by the following Formula (III) or Formula (IV), (III)

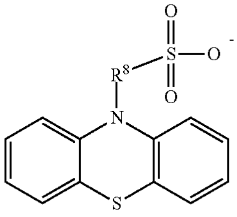

-continued (IV)

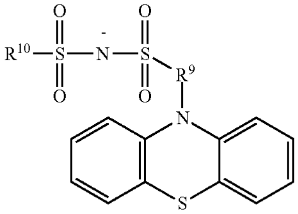

wherein for Formula (III), $R^8$ is selected from divalent linear or branched alkane linking group, and for Formula (IV), $R^9$ is selected from divalent linear or branched alkane linking group, and $R^{10}$ is selected from fluorine, linear or branched fluorinated alkyl, or linear or branched perfluorinated alkyl.

Clause 57: The electrochromic composition of clause 56, wherein for Formula (III), $R^8$ is selected from divalent linear or branched $C_1$-$C_{10}$ alkane linking group, and for Formula (IV), $R^9$ is selected from divalent linear or branched $C_1$-$C_{10}$ alkane linking group, and $R^{10}$ is selected from fluorine, linear or branched $C_1$-$C_{10}$ fluorinated alkyl, or linear or branched $C_1$-$C_{10}$ perfluorinated alkyl.

Clause 58: The electrochromic composition of clause 56 or clause 57, wherein said anodic component further comprises a counter-cation.

Clause 59: The electrochromic composition of clause 58, wherein each counter-cation is independently selected from optionally substituted nitrogen-containing aliphatic heterocycle ammonium cations, optionally substituted nitrogen-containing aromatic heterocycle ammonium cations, tetrasubstituted ammonium cations, or combinations thereof.

Clause 60: The electrochromic composition of clause 58 or clause 59, wherein each counter-cation is selected from tetrasubstituted ammonium cations represented by the following Formula (H), Formula (H)

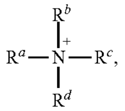

wherein $R^a$, $R^b$, $R^c$, and $R^d$ are each independently selected from linear or branched alkyl, unsubstituted cycloalkyl, substituted cycloalkyl, unsubstituted aryl, and substituted aryl.

Clause 61: The electrochromic composition of clause 60, wherein $R^a$, $R^b$, $R^C$, and $R^d$ are each independently selected from linear or branched $C_1$-$C_{10}$ alkyl, unsubstituted $C_3$-$C_7$ cycloalkyl, substituted $C_3$-$C_7$ cycloalkyl, unsubstituted phenyl, or substituted phenyl.

Clause 62: The electrochromic composition of clause 60 or clause 61, wherein $R^a$, $R^b$, $R^c$, and $R^d$ are each independently selected from linear or branched $C_1$-$C_{10}$ alkyl.

Clause 63: The electrochromic composition of any one of clauses 58-62, wherein each counter-cation is independently selected from tetra(linear or branched alkyl) ammonium cation.

Clause 64: The electrochromic composition of any one of clauses 58-63, wherein each counter-cation is independently selected from tetra(linear or branched $C_1$-$C_{10}$ alkyl) ammonium cation.

Clause 65: The electrochromic composition of any one of clauses 51-64, wherein said cathodic component comprises at least one of a 1,1'-disubstituted-4,4'-dipyridinium cation represented by the following Formula (V), or a 1,1-(alkane-alpha, omega-diyl)-bis-(1'-substituted-4,4'-dipyridinium) cation represented by the following Formula (VI), Formula (V)

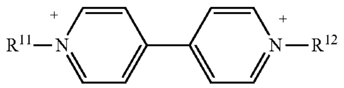

Formula (VI)

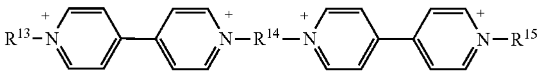

wherein for Formula (V), $R^{11}$ and $R^{12}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and for Formula (VI), $R^{13}$ and $R^{15}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and $R^{14}$ is selected from divalent linear or branched $C_1$-$C_{10}$ alkane linking group.

Clause 66: The electrochromic composition of clause 65, wherein for Formula (V) $R^{11}$ and $R^{12}$ are each independently selected from linear or branched $C_1$-$C_4$ alkyl, unsubstituted phenyl, and substituted phenyl, and for Formula (VI) $R^{13}$ and $R^{15}$ are each independently selected from linear or branched $C_1$-$C_4$ alkyl, unsubstituted phenyl, and substituted phenyl, and $R^{14}$ is selected from divalent linear or branched $C_1$-$C_5$ alkane linking group.

Clause 67: The electrochromic composition of clause 65 or clause 66, wherein said cathodic component further comprises counter-anions, wherein each counter-anion of the cathodic component is selected from the group consisting of $BF_4^-$, $PF_6^-$, $ClO_4^-$, $CF_3SO_3^-$, $(CF_3SO_2)_2N^-$, $(CF_3SO_2)_3C^-$, and $B(phenyl)_4^-$.

Clause 68: The electrochromic composition of any one of clauses 51-67, wherein said electrolyte is present and comprises, at least one electrolyte anion, wherein each electrolyte anion is independently selected from bis(perfluoro(linear or branched $C_1$-$C_6$ alkysulfonyl)imide, and at least one electrolyte cation, wherein each electrolyte cation is independently selected from 1-(linear or branched $C_1$-$C_6$ alkyl)-3-(linear or branched $C_1$-$C_6$ alkyl)imidazolium, 1-(linear or branched $C_1$-$C_6$ alkyl)-1-(linear or branched $C_1$-$C_6$ alkyl)pyrrolidinium, 1-(linear or branched $C_1$-$C_6$ alkyl)-1-(linear or branched $C_1$-$C_6$ alkyl)piperidinium, phosphonium cations, such as, but not limited to tetra(linear or branched $C_1$-$C_6$ alkyl)phosphonium, or tri($C_5$-$C_8$ cycloalkyl)-(linear or branched $C_1$-$C_6$ alkyl)phosphonium, or ammonium cations, such as, but not limited to, tetra(linear or branched $C_1$-$C_6$)ammonium, and tri($C_5$-$C_8$ cycloalkyl)-(linear or branched $C_1$-$C_6$ alkyl)ammonium.

Clause 69: The electrochromic composition of any one of clauses 51-68, wherein said polymer thickener and/or said polymerizable monomer composition, each independently comprise a further polymer, wherein said further polymer comprises at least one of poly((meth)acrylonitrile), poly(vinylidene fluoride), poly(vinylidene fluoride-co-perfluoro (linear or branched $C_1$-$C_6$ alkylene)), or poly((linear or branched $C_1$-$C_8$ alkyl)(meth)acrylate).

Clause 70: An electrochromic composition comprising:

(i) an electrochromic material comprising a cathodic component having cationic charge, wherein said cathodic component further comprises counter-anions, wherein each counter-anion of said cathodic component is an anodic component having an anion covalently bonded thereto, (ii) an optional electrolyte, (iii) at least one of, (a) a polymeric thickener, or (b) a polymerizable monomer composition, and (iv) a solvent, wherein said polymeric thickener comprises a polymer, wherein said polymer comprises residues of a monomer represented by the following Formula (I), and wherein said polymerizable monomer composition independently comprises said monomer represented by the following Formula (I), (I)

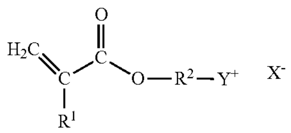

wherein for Formula (I), $R^1$ is in each case independently hydrogen or methyl, $R^2$ is in each case independently a single bond, a divalent linear or branched alkane, or divalent linear or branched cycloalkane, $Y^+$ is in each case independently represented by one of the following Formulas (A), (B), (C), (D), (E), (F), and (G), (A)

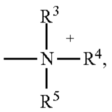

(B)

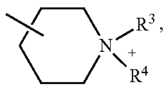

(C)

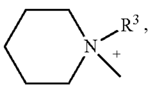

(D)

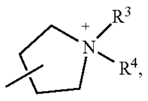

(E)

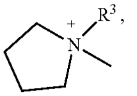

(F)

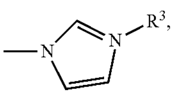

and

-continued (G)

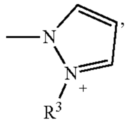

wherein independently for each of Formulas (A), (B), (C), (D), (E), (F), and (G), $R^3$, $R^4$, and $R^5$ are in each case independently selected from linear or branched alkyl or cycloalkyl, and $X^-$ is represented by the following Formula (II), (II)

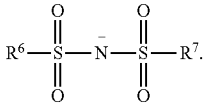

wherein for Formula (II), $R^6$ and $R^7$ are each independently selected from fluorine, linear or branched fluorinated alkyl, or linear or branched perfluorinated alkyl.

Clause 71: The electrochromic composition of clause 70, wherein said solvent comprises at least one of ethylene carbonate, propylene carbonate, gamma-butyrolactone, gamma-valerolactone, N-methylpyrrolidone, polyethylene glycol, carboxylic acid esters of polyethylene glycol, sulfolane, alpha, omega-($C_2$-$C_8$)dinitriles, or di(linear or branched $C_1$-$C_5$)acetamides.

Clause 72: The electrochromic compositions of clause 70 or clause 71, wherein said anodic component having an anion covalently bonded thereto is selected from an anodic component represented by at least one of the following Formula (III) or Formula (IV), (III)

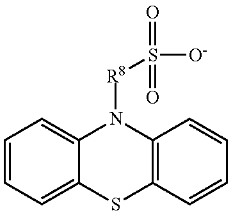

(IV)

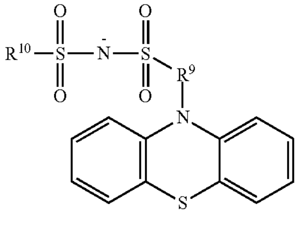

wherein for Formula (III), $R^8$ is selected from divalent linear or branched alkane linking group, and for Formula (IV), $R^9$ is selected from divalent linear or branched alkane linking group, and $R^{10}$ is selected from fluorine, linear or branched fluorinated alkyl, or linear or branched perfluorinated alkyl.

Clause 73: The electrochromic composition of clause 72, wherein for Formula (III), $R^8$ is selected from divalent linear or branched $C_1$-$C_{10}$ alkane linking group, and for Formula (IV), $R^9$ is selected from divalent linear or branched $C_1$-$C_{10}$ alkane linking group, and $R^{10}$ is selected from fluorine, linear or branched $C_1$-$C_{10}$ fluorinated alkyl, or linear or branched $C_1$-$C_{10}$ perfluorinated alkyl.

Clause 74: The electrochromic composition of any one of clauses 70-73, wherein said cathodic component comprises at least one of a 1,1'-disubstituted-4,4'-dipyridinium cation represented by the following Formula (V), or a 1,1-(alkane-alpha, omega-diyl)-bis-(1'-substituted-4,4'-dipyridinium) cation represented by the following Formula (VI), Formula (V)

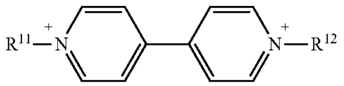

Formula (VI)

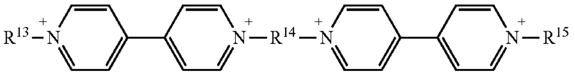

wherein for Formula (V), $R^{11}$ and $R^{12}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and for Formula (VI), $R^{13}$ and $R^{15}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and $R^{14}$ is selected from divalent linear or branched $C_1$-$C_{10}$ alkane linking group.

Clause 75: The electrochromic composition of clause 74, wherein for Formula (V), $R^{11}$ and $R^{12}$ are each independently selected from linear or branched $C_1$-$C_4$ alkyl, unsubstituted phenyl, and substituted phenyl, and for Formula (VI), $R^{13}$ and $R^{15}$ are each independently selected from linear or branched $C_1$-$C_4$ alkyl, unsubstituted phenyl, and substituted phenyl, and $R^{14}$ is selected from divalent linear or branched $C_1$-$C_5$ alkane linking group.

Clause 76: The electrochromic composition of any one of clauses 70-75, wherein for Formula (I), $R^2$ is independently in each case a single bond, a divalent linear or branched $C_1$-$C_{10}$ alkane, or divalent linear or branched $C_3$-$C_7$ cycloalkane, independently for each of Formulas (A), (B), (C), (D), (E), (F), and (G), $R^3$, $R^4$, and $R^5$ are in each case independently selected from linear or branched $C_1$-$C_{10}$ alkyl or $C_3$-$C_7$ cycloalkyl, and for Formula (II), $R^6$ and $R^7$ are each independently selected from fluorine, linear or branched $C_1$-$C_{10}$ fluorinated alkyl, or linear or branched $C_1$-$C_{10}$ perfluorinated alkyl.

Clause 77: The electrochromic composition of any one of clauses 70-76, wherein for Formula (I), $R^2$ is independently in each case a single bond or a divalent linear or branched $C_1$-$C_6$ alkane, independently for each of Formulas (A), (B), (C), (D), (E), (F), and (G), $R^3$, $R^4$, and $R^5$ are in each case independently selected from linear or branched $C_1$-$C_6$ alkyl, and for Formula (II), $R^6$ and $R^7$ are each independently selected from linear or branched $C_1$-$C_6$ perfluorinated alkyl.

Clause 78: The electrochromic composition of any one of clauses 70-77, wherein said polymer, of said polymer matrix, is formed by polymerizing a monomer composition comprising said monomer represented by Formula (I) between said first transparent electrically conductive electrode layer and said second transparent electrically conductive electrode layer.

Clause 79: The electrochromic composition of any one of clauses 70-78, wherein said polymeric thickener further comprises residues of a comonomer, and said polymerizable composition independently further comprises comonomer, wherein the comonomer in each case independently comprises at least one of linear or branched alkyl (meth)acrylate, cycloalkyl (meth)acrylate, or polyfunctional monomer comprising at least two (meth)acrylate groups.

Clause 80: The electrochromic composition of any one of clauses 70-79, wherein said electrolyte is present and comprises, at least one electrolyte anion, wherein each electrolyte anion is independently selected from bis(perfluoro(linear or branched $C_1$-$C_6$ alkysulfonyl)imide, and at least one electrolyte cation, wherein each electrolyte cation is independently selected from 1-(linear or branched $C_1$-$C_6$ alkyl)-3-(linear or branched $C_1$-$C_6$ alkyl)imidazolium, 1-(linear or branched $C_1$-$C_6$ alkyl)-1-(linear or branched $C_1$-$C_6$ alkyl)pyrrolidinium 1-(linear or branched $C_1$-$C_6$ alkyl)-1-(linear or branched $C_1$-$C_6$ alkyl)piperidinium, phosphonium cations, such as, but not limited to tetra(linear or branched $C_1$-$C_6$ alkyl)phosphonium, or tri($C_5$-$C_8$ cycloalkyl)-(linear or branched $C_1$-$C_6$ alkyl)phosphonium, or ammonium cations, such as, but not limited to, tetra(linear or branched $C_1$-$C_6$)ammonium, and tri($C_5$-$C_8$ cycloalkyl)-(linear or branched $C_1$-$C_6$ alkyl)ammonium.

Clause 81: The electrochromic composition of any one of clauses 70-80, wherein said polymer thickener and/or said polymerizable monomer composition, each independently comprise a further polymer, wherein said further polymer comprises at least one of poly((meth)acrylonitrile), poly(vinylidene fluoride), poly(vinylidene fluoride-co-perfluoro(linear or branched $C_1$-$C_6$ alkylene)), or poly((linear or branched $C_1$-$C_8$ alkyl)(meth)acrylate).

Clause 82: An electrochromic composition comprising:

(i) a cathodic component, (ii) an anodic component, (iii) an optional electrolyte, (iv) at least one of, (a) a polymeric thickener, or (b) a polymerizable monomer composition, and (v) a solvent, wherein said polymeric thickener comprises a polymer, wherein said polymer comprises residues of a monomer represented by the following Formula (I), and wherein said polymerizable monomer composition independently comprises said monomer represented by the following Formula (I), (I)

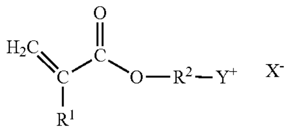

wherein for Formula (I), $R^1$ is in each case independently hydrogen or methyl, $R^2$ is in each case independently a single bond, a divalent linear or branched alkane, or divalent linear or branched cycloalkane, $Y^+$ is in each case independently represented by one of the following Formulas (A), (B), (C), (D), (E), (F), and (G), (A)

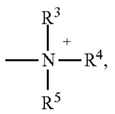

(B)

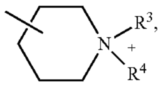

(C)

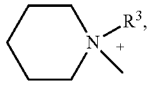

(D)

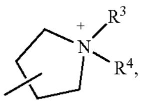

(E)

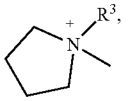

(F)

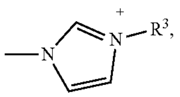

and (G)

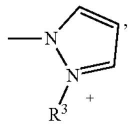

wherein independently for each of Formulas (A), (B), (C), (D), (E), (F), and (G), $R^3$, $R^4$, and $R^5$ are in each case independently selected from linear or branched alkyl or cycloalkyl, and $X^-$ is represented by the following Formula (II), (II)

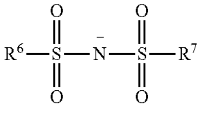

wherein for Formula (II), $R^6$ and $R^7$ are each independently selected from fluorine, linear or branched fluorinated alkyl, or linear or branched perfluorinated alkyl, and wherein said cathodic component comprises a cathodic component having cationic charge selected from at least one of a 1,1'-disubstituted-4,4'-dipyridinium cation represented by the following Formula (V), or a 1,1-(alkane-alpha, omega-diyl)-bis-(1'-substituted-4,4'-dipyridinium) cation represented by the following Formula (VI), Formula (V)

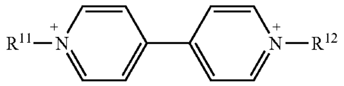

Formula (VI)

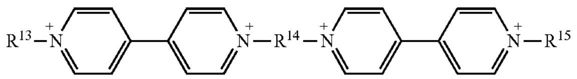

wherein for Formula (V) and Formula (VI), $R^{11}$, $R^{12}$, $R^{13}$, and $R^{15}$ are in each case independently selected from linear or branched alkyl, unsubstituted cycloalkyl, substituted cycloalkyl, unsubstituted aryl, substituted aryl, a group represented by the following Formula (VII), (VII)

$$—R^{16}—SO_3^-, \text{ and}$$

a group represented by the following Formula (VIII), (VIII)

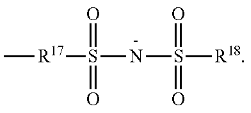

wherein for Formula (VII) and Formula (VIII), $R^{16}$ and $R^{17}$ are in each case independently selected from divalent linear or branched alkane linking group, and for Formula (VIII), $R^{18}$ is selected from fluorine, linear or branched fluorinated alkyl, or linear or branched perfluorinated alkyl, and for Formula (VI), $R^{14}$ is selected from divalent linear or branched alkane linking group, provided that for Formula (V), at least one of $R^{11}$ and $R^{12}$ is independently selected from said group represented by Formula (VII) or said group represented by Formula (VIII), and provided that for Formula (VI), at least one of $R^{13}$ and $R^{15}$ is independently selected from said group represented by Formula (VII) or said group represented by Formula (VIII).

Clause 83: The electrochromic composition of clause 82, wherein said solvent comprises at least one of ethylene carbonate, propylene carbonate, gamma-butyrolactone, gamma-valerolactone, N-methylpyrrolidone, polyethylene glycol, carboxylic acid esters of polyethylene glycol, sulfolane, alpha, omega-($C_2$-$C_8$)dinitriles, or di(linear or branched $C_1$-$C_5$)acetamides.

Clause 84: The electrochromic composition of clause 82 or clause 83, wherein for Formula (I), $R^2$ is independently in each case a single bond, a divalent linear or branched $C_1$-$C_{10}$ alkane, or divalent linear or branched $C_3$-$C_7$ cycloalkane, independently for each of Formulas (A), (B), (C), (D), (E), (F), and (G), $R^3$, $R^4$, and $R^5$ are in each case independently selected from linear or branched $C_1$-$C_{10}$ alkyl or $C_3$-$C_7$ cycloalkyl, and for Formula (II), $R^6$ and $R^7$ are each independently selected from fluorine, linear or branched $C_1$-$C_{10}$ fluorinated alkyl, or linear or branched $C_1$-$C_{10}$ perfluorinated alkyl.

Clause 85: The electrochromic composition of any one of clauses 82-84, wherein for Formula (I), $R^2$ is independently in each case a single bond or a divalent linear or branched $C_1$-$C_6$ alkane, independently for each of Formulas (A), (B), (C), (D), (E), (F), and (G), $R^3$, $R^4$, and $R^5$ are in each case independently selected from linear or branched $C_1$-$C_6$ alkyl, and for Formula (II), $R^6$ and $R^7$ are each independently selected from linear or branched $C_1$-$C_6$ perfluorinated alkyl.

Clause 86: The electrochromic composition of any one of clauses 82-85, wherein said polymeric thickener further comprises residues of a comonomer, and said polymerizable composition independently further comprises comonomer, wherein the comonomer in each case independently comprises at least one of linear or branched alkyl (meth)acrylate, cycloalkyl (meth)acrylate, or polyfunctional monomer comprising at least two (meth)acrylate groups.

Clause 87: The electrochromic composition of any one of clauses 82-86, wherein for Formula (V), $R^{11}$ and $R^{12}$ are each independently selected from linear or branched $C_1$-$C_4$ alkyl, unsubstituted phenyl, substituted phenyl, said group represented by Formula (VII), and said group represented by Formula (VIII), and for Formula (VI), $R^{13}$ and $R^{15}$ are each independently selected from linear or branched $C_1$-$C_4$ alkyl, unsubstituted phenyl, substituted phenyl, said group represented by Formula (VII), and said group represented by Formula (VIII), and $R^{14}$ is selected from divalent linear or branched $C_1$-$C_8$ alkane linking group.

Clause 88: The electrochromic composition of any one of clauses 82-87, wherein for Formula (VII) and Formula (VIII), $R^{16}$ and $R^{17}$ are in each case independently selected from divalent linear or branched $C_1$-$C_{10}$ alkane linking group, and for Formula (VIII), $R^{18}$ is selected from fluorine, linear or branched fluorinated $C_1$-$C_{10}$ alkyl, or linear or branched perfluorinated $C_1$-$C_{10}$ alkyl.

Clause 89: The electrochromic composition of any one of clauses 82-88, wherein said anodic component comprises an anodic component anion selected from at least one anodic component anion represented by the following Formula (III) or Formula (IV), (III)

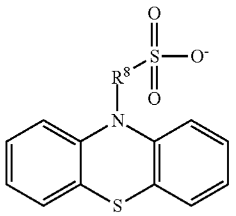

(IV)

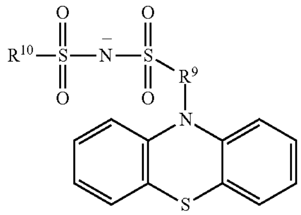

wherein for Formula (III), $R^8$ is selected from divalent linear or branched alkane linking group, and for Formula (IV), $R^9$ is selected from divalent linear or branched alkane linking group, and $R^{10}$ is selected from fluorine, linear or branched fluorinated alkyl, or linear or branched perfluorinated alkyl.

Clause 90: The electrochromic composition of clause 89, wherein for Formula (III), $R^8$ is selected from divalent linear or branched $C_1$-$C_{10}$ alkane linking group, and for Formula (IV), $R^9$ is selected from divalent linear or branched $C_1$-$C_{10}$ alkane linking group, and $R^{10}$ is selected from fluorine, linear or branched $C_1$-$C_{10}$ fluorinated alkyl, or linear or branched $C_1$-$C_{10}$ perfluorinated alkyl.

Clause 91: The electrochromic composition of clause 89 or clause 90, wherein said cathodic component having cationic charge and said anodic component anion, selected from at least one anodic component anion represented by Formula (III) or Formula (IV), together have a net neutral charge.

Clause 92: The electrochromic composition of clause 89 or clause 90, wherein said anodic component further comprises a counter-cation.

Clause 93: The electrochromic composition of clause 92, wherein each counter-cation is independently selected from optionally substituted nitrogen-containing aliphatic heterocycle ammonium cations, optionally substituted nitrogen-containing aromatic heterocycle ammonium cations, tetrasubstituted ammonium cations, or combinations thereof.

Clause 94: The electrochromic composition of clause 92 or clause 93, wherein each counter-cation is selected from tetrasubstituted ammonium cations represented by the following Formula (H), Formula (H)

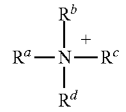

wherein $R^a$, $R^b$, $R^c$, and $R^d$ are each independently selected from linear or branched alkyl, unsubstituted cycloalkyl, substituted cycloalkyl, unsubstituted aryl, and substituted aryl.

Clause 95: The electrochromic composition of clause 94, wherein $R^a$, $R^b$, $R^C$, and $R^d$ are each independently selected from linear or branched $C_1$-$C_{10}$ alkyl, unsubstituted $C_3$-$C_7$ cycloalkyl, substituted $C_3$-$C_7$ cycloalkyl, unsubstituted phenyl, or substituted phenyl.

Clause 96: The electrochromic composition of clause 94 or clause 95, wherein $R^a$, $R^b$, $R^c$, and $R^d$ are each independently selected from linear or branched $C_1$-$C_{10}$ alkyl.

Clause 97: The electrochromic composition of any one of clauses 92-96, wherein each counter-cation is independently selected from tetra(linear or branched alkyl) ammonium cation.

Clause 98: The electrochromic composition of any one of clauses 92-97, wherein each counter-cation is independently selected from tetra(linear or branched $C_1$-$C_{10}$ alkyl) ammonium cation.

Clause 99: The electrochromic composition of any one of clauses 92-98, wherein said cathodic component further comprises counter-anions, wherein each counter-anion of the cathodic component is selected from the group consisting of $BF_4^-$, $PF_6^-$, $ClO_4^-$, $CF_3SO_3^-$, $(CF_3SO_2)_2N^-$, $(CF_3SO_2)_3C^-$, and $B(phenyl)_4^-$.

Clause 100: The electrochromic composition of any one of clauses 82-99, wherein said electrolyte is present and comprises, at least one electrolyte anion, wherein each electrolyte anion is independently selected from bis(perfluoro(linear or branched $C_1$-$C_6$ alkysulfonyl)imide, and at least one electrolyte cation, wherein each electrolyte cation is independently selected from 1-(linear or branched $C_1$-$C_6$ alkyl)-3-(linear or branched $C_1$-$C_6$ alkyl)imidazolium, 1-(linear or branched $C_1$-$C_6$ alkyl)-1-(linear or branched $C_1$-$C_6$ alkyl)pyrrolidinium, 1-(linear or branched $C_1$-$C_6$ alkyl)-1-(linear or branched $C_1$-$C_6$ alkyl)piperidinium, phosphonium cations, such as, but not limited to tetra(linear or branched $C_1$-$C_6$ alkyl)phosphonium, or tri($C_5$-$C_8$ cycloalkyl)-(linear or branched $C_1$-$C_6$ alkyl)phosphonium, or ammonium cations, such as, but not limited to, tetra(linear or branched $C_1$-$C_6$)ammonium, and tri($C_5$-$C_8$ cycloalkyl)-(linear or branched $C_1$-$C_6$ alkyl)ammonium.

Clause 101: The electrochromic composition of any one of clauses 82-100, wherein said polymer thickener and/or said polymerizable monomer composition, each independently comprise a further polymer, wherein said further polymer comprises at least one of poly((meth)acrylonitrile), poly(vinylidene fluoride), poly(vinylidene fluoride-co-perfluoro(linear or branched $C_1$-$C_6$ alkylene)), or poly((linear or branched $C_1$-$C_8$alkyl)(meth)acrylate).

Clause 102: The electrochromic composition of any one of clauses 82-101, wherein for Formula (V), $R^{11}$ and $R^{12}$ are each independently selected from said group represented by Formula (VII), and said group represented by Formula (VIII), and for Formula (VI), $R^{13}$ and $R^{15}$ are each independently selected from said group represented by Formula (VII), and said group represented by Formula (VIII).

The present invention is more particularly described in the following examples, which are intended as illustrative only, since numerous modifications and variations therein will be apparent to those skilled in the art.

EXAMPLES

In Part—1 of the examples there is described the synthesis of anodic components having an anion covalently bonded thereto, according to the present invention. In Part—2, there is described the synthesis of a cathodic component having cationic charge where each counter-anion thereof is an anodic component having an anion covalently bonded thereto, according to the present invention. In Part—3 there is described the synthesis of a zwitterionic cathodic component according to the present invention. In Part—4 there is described the preparation of a (meth)acrylate monomer according to Formula (I) of the present invention. In Part—5 there is described the preparation of a comparative electrochromic device and an electrochromic device according to the present invention. In Part—6 testing of the electrochromic devices of Part—5 is described.

Part—1

Synthesis Example 1

With reference to Scheme-(1) below, there is provided a non-limiting description of the preparation of an anodic component having an anion covalently bonded thereto according to the present invention represented by Formula (I), where $R^1$ is a divalent n-propane linking group.

Into an oven dried 3-neck, 500 ml round bottomed flask with magnetic stirring was added 200 mL of dimethylformamide (DMF) and 10 g of (1) phenothiazine (50.2 mmol). The solution was stirred while being purge with nitrogen for 1 hour. To the reaction mixture was added 2.4 g of 60% NaH (60 mmol). The solution was observed to turn deep red as bubbles were produced therefrom. After continuous mixing under nitrogen for one hour, the production of bubbles was observed to cease. While under a nitrogen sweep is 6.6 g of (2) 1,3-propanesultone (55.2 mmol) dissolved in 10 g of dry DMF, was added drop-wise to the contents of the flask. After completion of the addition of (2) 1,3-propanesultone, the reaction mixture was left to stir at room temperature for 18 hours under nitrogen.

The reaction was quenched by the addition of 100 mL of deionized (DI) water and the solvent was removed by the application of vacuum, after which an oily substance remained in the flask. To the oily substance was added 50 mL of ethyl acetate, which resulted in the formation of a precipitate that was collected by vacuum filtration. The precipitate was washed with cold ethyl acetate and dried overnight under vacuum at 60° C. to yield the desired product (3) sodium 3-(10H-phenothiazin-10-yl)-propane-1-sulfonate, as an off-white solid.

Scheme-(1)

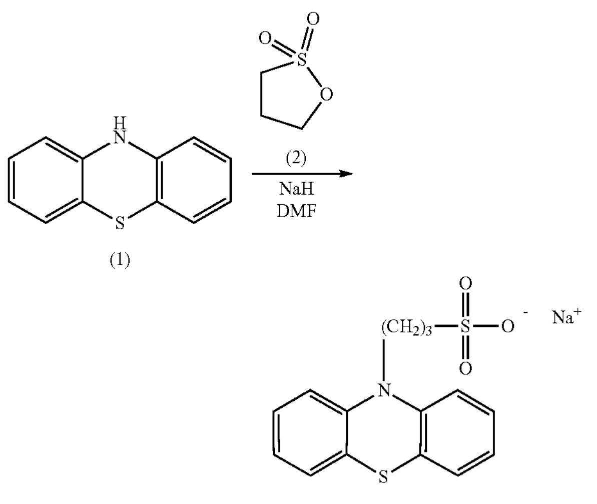

(1)

(3)

Synthesis Example 2

With reference to Scheme-(2) below, there is provided a non-limiting description of the preparation of an anodic component having an anion covalently bonded thereto according to the present invention represented by Formula (II), where $R^2$ is a divalent n-propane linking group, and $R^3$ is trifluoromethyl.

The (3) sodium 3-(10H-phenothiazin-10-yl)-propane-1-sulfonate was prepared in accordance with Synthesis Example 1. One gram (0.0029 mol) of (3) sodium 3-(10H-phenothiazin-10-yl)propane-1-sulfonate was fine ground with mortar and pestle, and then placed in a 100 ml round-bottom flask equipped with a magnetic stir bar and a reflux condenser with a $N_2$ sweep/blanket. Acetone in an amount of 20 ml and 40 mg of 18-crown-6 ether were added to the flask and the mixture was stirred vigorously for 15 minutes. The solution turned cloudy, but solid sodium salt (3) was observed to be present. (4) Cyanuric chloride (540 mg, 0.0029 mol, 1 equiv.) was added under vigorous stirring under $N_2$. The mixture was refluxed for 24 hours on an oil bath (at about 80° C.). The color of the solution turned orange and a fine precipitate formed. Large chunks of initial Na salt (3) were no longer observable. Thin layer chromatography (TLC) showed the presence of a single reaction product that turned pink upon exposure to short-wave (316 nm) UV in air, evidencing formation of (5) 3-(10H-phenothiazin-10-yl)-propane-1-sulfonyl chloride. The product (5) was fairly mobile in 50:50 EtOAc/Hexanes. The reaction mixture was cooled to room temperature and filtered through a thin layer of alumina. The solvent was removed under vacuum to give 1.25 g of orange-yellow glassy solid (5). The product (5) was dissolved in MeCN and the solids were filtered off. The filtrate was used in the next step without additional purification.

(6) Trifluoromethylsulfonamide (4.53 g, 0.0305 mol, 1.05 equiv.) and potassium carbonate (40 g, 0.29 mol, 10 equiv.) were placed in a 500 ml 3-neck flask equipped with a reflux condenser, magnetic stir bar and a fritted Schlenk funnel. Nitrogen feeds were attached to the condenser and the Schlenk funnel and secured with plastic clips. An intense nitrogen flux was used to flush the vessel for 15 seconds, and a septum was installed in the remaining neck. Anhydrous MeCN in an amount of 100 ml was added through the septum using a syringe. The mixture was vigorously stirred for 20 minutes, yielding a white hazy dispersion. To the crude (5) 3-(10H-phenothiazin-10-yl)propane-1-sulfonyl chloride (9.84 g, 0.029 mol) (filtrate of the preceding step) was added 50 ml dry MeCN under nitrogen flux, and the resulting solution was transferred to the fritted Schlenk funnel. The Schlenk funnel was purged with nitrogen and plugged with a stopper secured with a clip. The solution of MeCN and (5) 3-(10H-phenothiazin-10-yl)propane-1-sulfonyl chloride was added dropwise to the 3-neck flask over a period of one hour at room temperature. The contents of the 3-neck flask were refluxed for 24 hours. Formation of bulky precipitate was observed. The precipitate was filtered off and the resulting solution was concentrated under vacuum. The residue was recrystallized from water to yield the product (7) potassium 3-(10H-phenothiazin-10-yl)-N-((trifluoromethyl)sulfonyl)propane-1-sulfonamide, in the form of brown needles.

Scheme-(2)

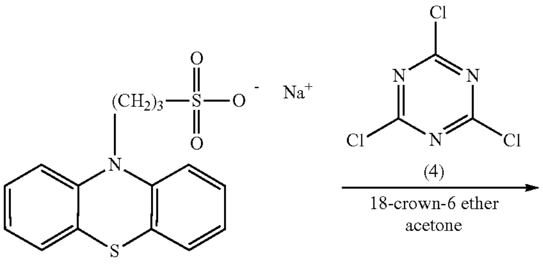

(3)

-continued

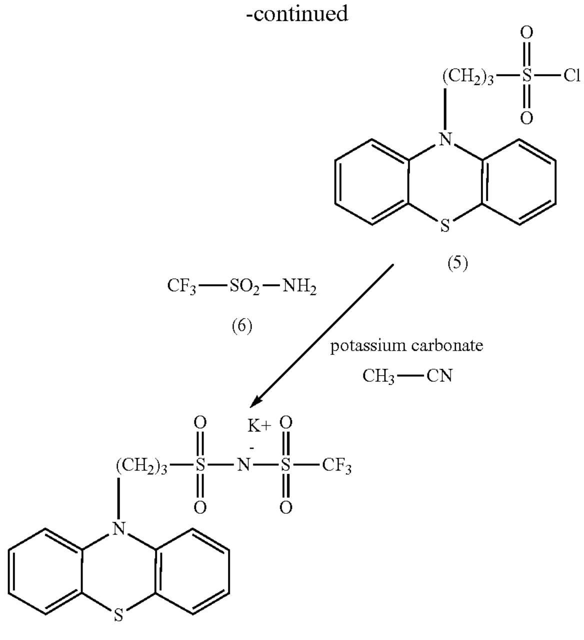

(5)

(6)

(7)

With reference to Scheme-(3) below, there is provided a non-limiting description of the preparation of a cathodic component according to the present invention, (9) 1,1'-diheptyl-[4,4'-bypyridine]-1,1'-diium-bis-[3-(10H-phenothiazin-10-yl)propane-1-sulfonate. With further reference to the following Scheme-(3), for compounds (8) and (9), $R^4$ and $R^5$ are in each case heptyl.

Into a 200 mL Erlenmeyer flask with magnetic stirring was added 2 g of (8) 1,1'-diheptyl-[4,4'-bipyridine]-1,1'-diium dibromide (3.89 mmol) and 50 mL of deionized (DI) water. The mixture was stirred until a solution was formed. While still stirring, a solution of 2.8 g of (3) sodium 3-(10H-phenothiazin-10-yl)-propane-1-sulfonate (8.16 mmol/2.1 eq) in 50 mL of water was added thereto. A dark purple precipitate was promptly formed. The reaction mixture was stirred for 3 hours. The precipitate was collected via vacuum filtration and washed several times with water and dried overnight under vacuum at 60° C. to yield the product (9) 1,1'-diheptyl-[4,4'-bypyridine]-1,1'-diium-bis-[3-(10H-phenothiazin-10-yl)propane-1-sulfonate, in the form of dark purple crystals.

Scheme-(3)

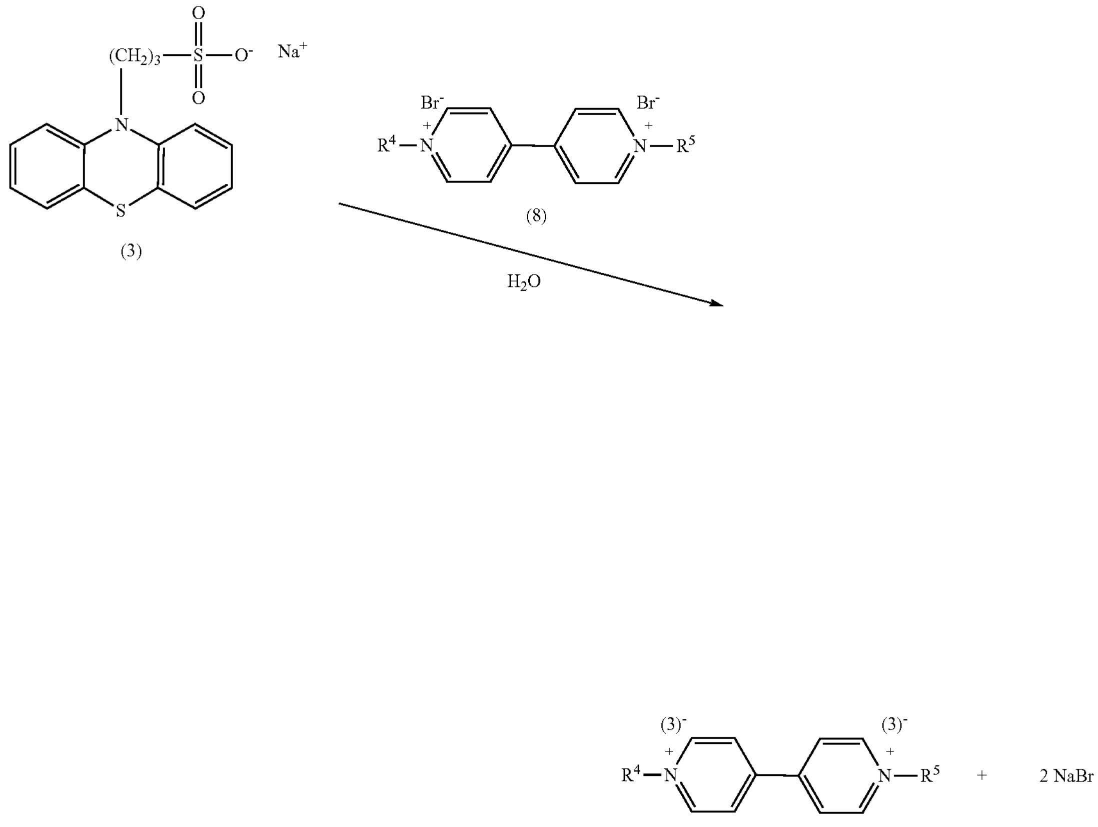

2

(3)

(8)

(9)

+ 2 NaBr

Part—3

With reference to Scheme-(4) below, there is provided a non-limiting description of the preparation of a cathodic component according to the present invention represented by Formula (V), where $R^{11}$ and $R^{12}$ are each represented by Formula (VII), where $R^{16}$ in each case is —$CH_2CH_2CH_2$—.

In a suitably sized round bottom flask, 2 g of 4,4'-bipyridine (13) was dissolved in 50 ml of dry MeCN, followed by the addition of 3.28 g of 1,3-propanesultone (14) solution in MeCN. The contents of the flask were subjected to reflux overnight, followed by cooling to ambient room temperature. The resulting precipitate was collected and washed twice with MeCN to yield 4.96 g of 3,3'-([4,4'-bipyridinium]-1,1'-diyl)bis(propane-1-sulfonate) (15).

Scheme-(4)

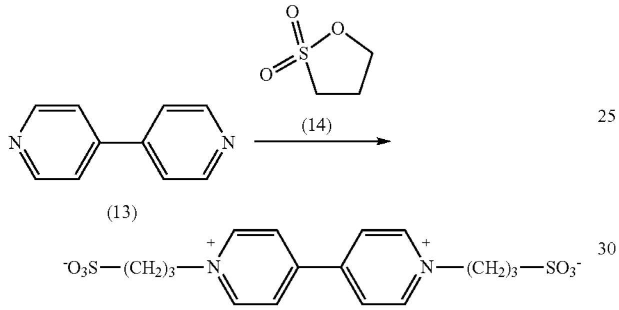

(14)

(13)

(15)

Part—4

With reference to Scheme-(5) below, there is provided a non-limiting description of the preparation of a [2-(methacryloyloxy)ethyl]trimethylammonium bis(trifluoromethane)sulfonimide monomer according to the present invention.

Into a 2-neck, 500 mL round bottom flask was added 50 g of [2-(methacryloyloxy)ethyl]trimethylammonium chloride (10) solution, 75 wt. % (10) in water, (180 mmol) and 100 mL of deionized water. The solution was stirred via magnetic stirrer at 350 rpm. To this solution was added dropwise a solution of 54.4 g of lithium bis(trifluoromethane)sulfonimide (11), (189 mmol) in 100 mL of deionized water. After full addition, the resulting mixture was vigorously stirred for 18 hours. The mixture was then transferred to a separatory funnel, and the lower phase was collected, dried over anhydrous $MgSO_4$ and filtered to obtain the product [2-(methacryloyloxy)ethyl]trimethylammonium bis(trifluoromethane)sulfonimide (12) as a colorless liquid.

Scheme-(5)

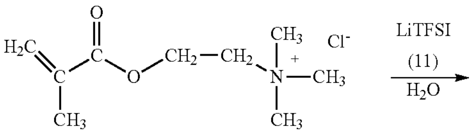

(10)

-continued

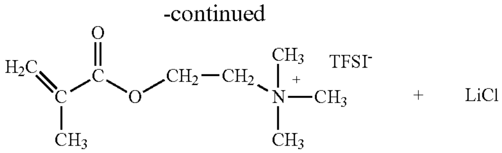

(12)

Part—5

Part—5(a): Comparative Electrochromic Device

A comparative electrochromic device was prepared as follows. An initial solution of: propylene carbonate (7 g); ethylene carbonate (3 g); 1-ethyl-3-methylimidazolium bis(trifluoromethane)sulfonimide (EMIM-TFSI) (1 g); potassium 3-(10H-phenothiazin-10-yl)-N-triflylpropane-1-sulfonamide (PTTK) (100 mg); and 1,1'-diethyl-[4,4'-bypyridine]-1,1'-diium-bis-[bis(trifluoromethane) sulfonimide](diethyl viologen TFSI) (100 mg), was prepared in a suitable container with magnetic stirring. Polyacrylonitrile in an amount of 3.5 g of was added to the initial solution, and the combination was subjected to homogenization, which resulted in the formation of a thick slurry. A liquid film of the thick slurry was formed using doctor blade on a sacrificial polyethylene terephthalate (PET) liner to a thickness of 400 micrometers (um). The liquid film was heated to 70° C. for 10 minutes, which resulted in the formation of a solidified film/layer, which was the electrochromic layer. The solidified film/electrochromic layer, was separated from the sacrificial/temporary liner, cut to size (2" x 3"; 5.08 cm×7.62 cm), and placed onto a fluorine-doped tin oxide (FTO)-glass electrode (3"×4"; 7.62 cm×10.16 cm) that already had copper tape wrapped over the edge that was covered with an insulating polyimide. A prefabricated thermoplastic gasket of 0.5" (1.27 cm) in width and 400 microns in thickness was added, which surrounded the active area. The second fluorine-doped tin oxide (FTO)-glass electrode was positioned over of the electrochromic layer. The stack was subjected to vacuum lamination at 140° C. for 15 minutes to fully melt and seal the gasket. After cooling, the so formed comparative electrochromic device was removed from the vacuum lamination device.

Part—5(b): Electrochromic Device According to the Present Invention

A viscous solution was prepared by combining and mixing: 1-Ethyl-3-methylimidazolium bis(trifluoromethane) sulfonimide (EMIM-TFSI) (5 g); [2-(methacryloyloxy) ethyl]trimethylammonium bis(trifluoromethane) sulfonimide (MAC-TFSI) (5 g); PTTK (100 mg); 1,1'-diethyl-[4,4'-bypyridine]-1,1'-diium-bis-[bis (trifluoromethane)sulfonimide](diethyl viologen TFSI) (100 mg); and 1-hydroxycyclohexyl phenyl ketone (10 mg). This mixture was volumetrically dosed onto a fluorine-doped tin oxide (FTO)-glass electrode (3"×4"; 7.62 cm×10.16 cm) that already had copper tape wrapped over the edge, which was covered with an insulating polyimide. A prefabricated thermoplastic gasket of 0.5" (1.27 cm) in width and 400 microns in thickness was added, which surrounded the active area. A second fluorine-doped tin oxide (FTO)-glass electrode was positioned over of the electrochromic layer. The stack was subjected to vacuum lamination at 140° C. for 15 minutes to fully melt and seal the gasket. After cooling, the so formed electrochromic device was removed from the vacuum lamination device. The vacuum laminated stack was subjected to UV-light using a trans-illuminator (365 nm) for 15 minutes, which resulted in polymerization of the monomer within the electrochromic layer.

Part—6

Figure 2:
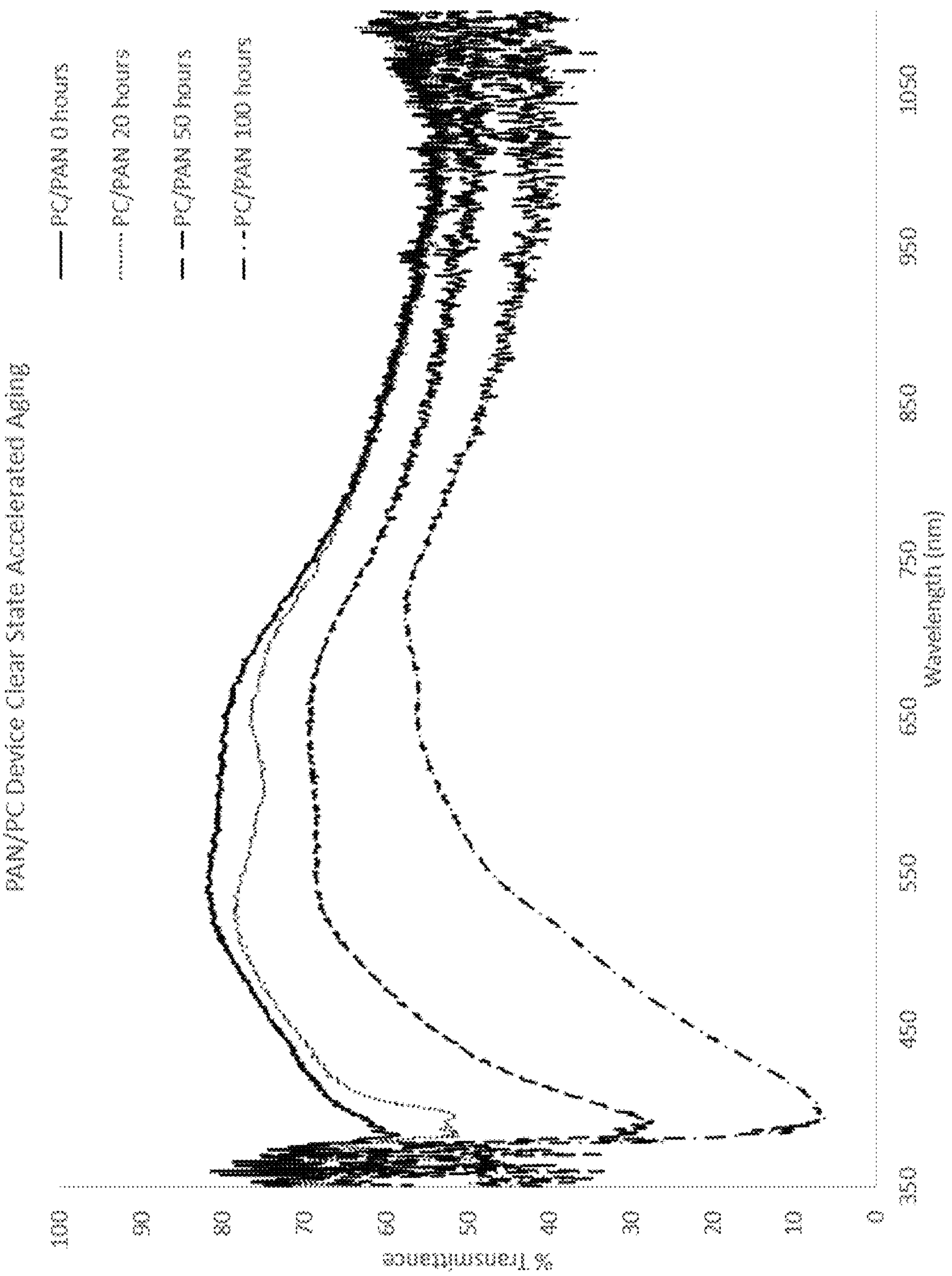
FIG. 2 is a graphical representation of plots of % transmittance vs. wavelength for a comparative electrochromic device, while subjected to accelerated testing, as described in Part—5(a) and Par-6 of the Examples herein.
Figure 3:
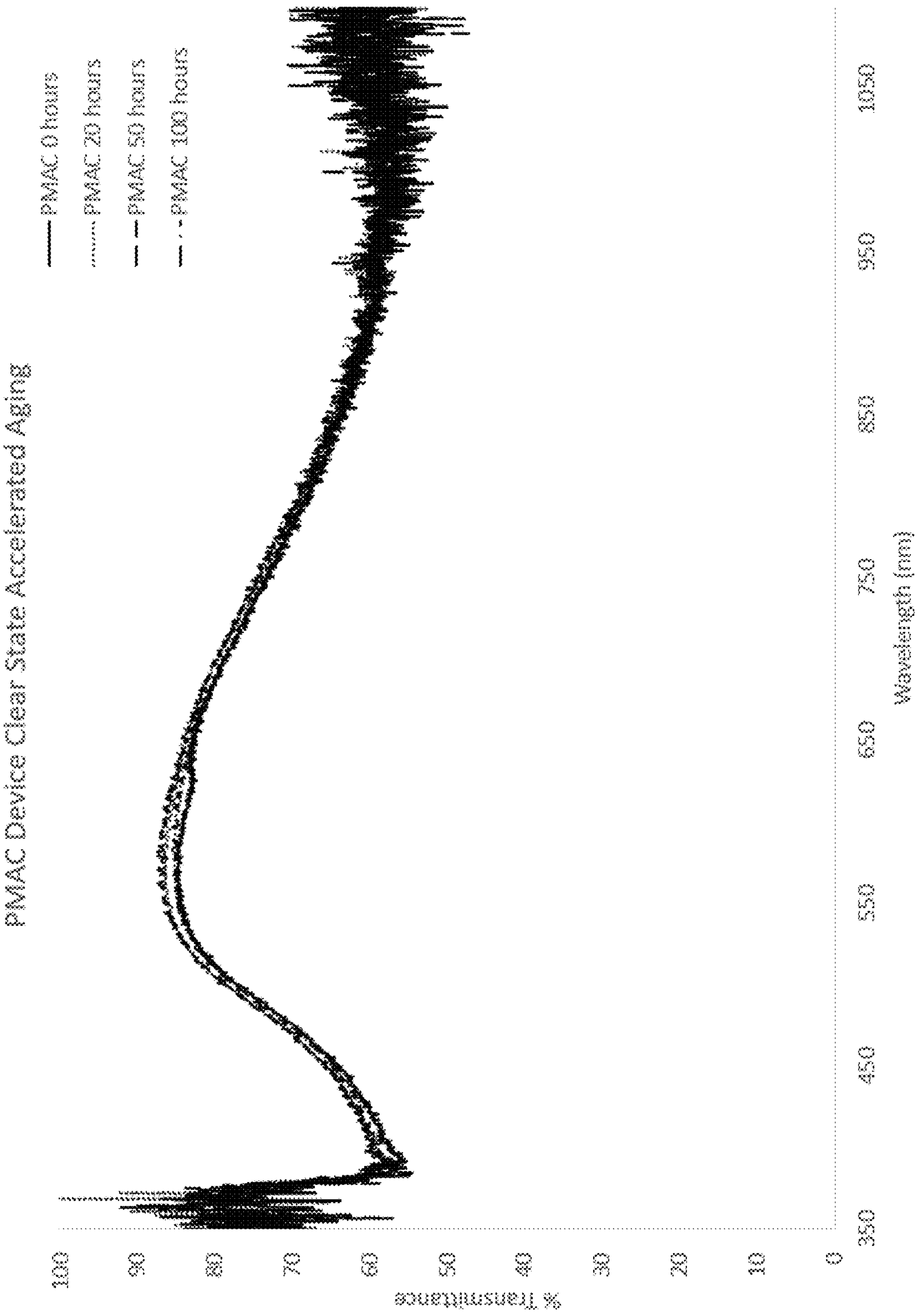
FIG. 3 is a graphical representation of plots of % transmittance vs. wavelength for an electrochromic device according to the present invention, while subjected to accelerated testing, as described in Part—5(b) and Part—6 of the Examples herein.

The comparative electrochromic device of Part—5(a) and the electrochromic device according to the present invention of Part—5(b) were evaluated to determine the clear state visible light transmittance (VLT) thereof as a function of time, under accelerated testing conditions. The electrochromic devices were together kept in a chamber at 85° C., and were each maintained in a dark/activated state. The electrochromic devices were periodically removed from the chamber (at 20 hours, 50 hours, and 100 hours) and the visible light transmittance (% Transmittance) thereof was measured at room temperature in a clear/unactivated state, which resulted in plots of % Transmittance vs. Wavelength (nm), which are shown in FIG. 2 and FIG. 3 of the drawings. With reference to FIG. 2 and FIG. 3, over the course of the accelerated testing, the visible light transmittance of the comparative electrochromic device of Part—5(a) decreased significantly, while that of the electrochromic device according to the present invention of Part—5(b) showed very little decrease. In FIG. 2, the comparative electrochromic device of Part—5(a) is described as a "PAN/PC Device" followed by "Clear State Accelerated Aging." In FIG. 3, the electrochromic device according to the present invention of Part—5(b) is described as a "PMAC Device" followed by "Clear State Accelerated Aging."

The present invention has been described with reference to specific details of particular embodiments thereof. It is not intended that such details be regarded as limitations upon the scope of the invention except insofar as to the extent that they are included in the accompanying claims.

What is claimed is:

1. An electrochromic device comprising:

(a) a first substrate having a surface comprising a first transparent electrode layer;

(b) a second substrate having a surface comprising a second transparent conductive electrode layer, wherein said first transparent electrode layer and said second transparent electrode layer are in opposing spaced opposition; and (c) an electrochromic layer interposed between said first transparent electrically conductive electrode layer and said second transparent electrically conductive electrode layer, wherein said electrochromic layer comprises, (i) a cathodic component, (ii) an anodic component, (iii) an optional electrolyte, and (iv) a polymer matrix, wherein said polymer matrix comprises a polymer, wherein said polymer comprises residues of a monomer represented by the following Formula (I), (I)

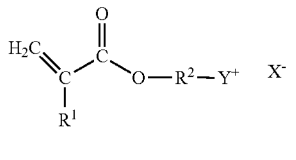

wherein for Formula (I), $R^1$ is in each case independently hydrogen or methyl, $R^2$ is in each case independently a single bond, a divalent linear or branched alkane, or divalent linear or branched cycloalkane, $Y^+$ is in each case independently represented by one of the following Formulas (A), (B), (C), (D), (E), (F), and (G), (A)

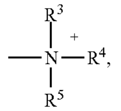

(B)

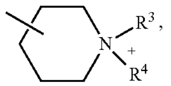

(C)

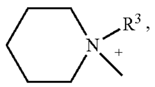

(D)

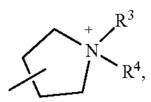

(E)

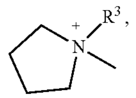

(F)

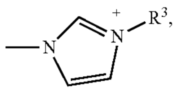

and (G)

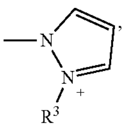

wherein independently for each of Formulas (A), (B), (C), (D), (E), (F), and (G), $R^3$, $R^4$, and $R^5$ are in each case independently selected from linear or branched alkyl or cycloalkyl, and $X^-$ is in each case independently represented by the following Formula (II), (II)

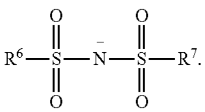

wherein for Formula (II), $R^6$ and $R^7$ are each independently selected from fluorine, linear or branched fluorinated alkyl, or linear or branched perfluorinated alkyl, wherein said anodic component comprises an anodic component anion represented by the following Formula (IV), and optionally an anodic component anion represented by the following Formula (III), (IV)

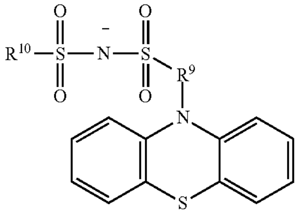

(III)

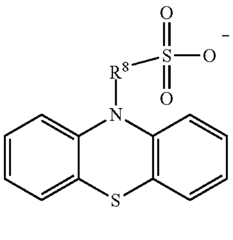

wherein for Formula (IV), $R^9$ is selected from divalent linear or branched alkane linking group, and $R^{10}$ is selected from fluorine, linear or branched fluorinated alkyl, or linear or branched perfluorinated alkyl, and wherein for Formula (III), $R^8$ is selected from divalent linear or branched alkane linking group.

2. The electrochromic device of claim 1, wherein for Formula (I), $R^2$ is independently in each case a single bond, a divalent linear or branched $C_1$-$C_{10}$ alkane, or divalent linear or branched $C_3$-$C_7$ cycloalkane, independently for each of Formulas (A), (B), (C), (D), (E), (F), and (G), $R^3$, $R^4$, and $R^5$ are in each case independently selected from linear or branched $C_1$-$C_{10}$ alkyl or $C_3$-$C_7$ cycloalkyl, and for Formula (II), $R^6$ and $R^7$ are each independently selected from fluorine, linear or branched $C_1$-$C_{10}$ fluorinated alkyl, or linear or branched $C_1$-$C_{10}$ perfluorinated alkyl.

3. The electrochromic device of claim 1, wherein for Formula (I), $R^2$ is independently in each case a single bond or a divalent linear or branched $C_1$-$C_6$ alkane, independently for each of Formulas (A), (B), (C), (D), (E), (F), and (G), $R^3$, $R^4$, and $R^5$ are in each case independently selected from linear or branched $C_1$-$C_6$ alkyl, and for Formula (II), $R^6$ and $R^7$ are each independently selected from linear or branched $C_1$-$C_6$ perfluorinated alkyl.

4. The electrochromic device of claim 1, wherein said polymer, of said polymer matrix, further comprises residues of a comonomer comprising at least one of linear or branched alkyl (meth)acrylate, cycloalkyl (meth)acrylate, or polyfunctional monomer comprising at least two (meth) acrylate groups.

5. The electrochromic device of claim 1, wherein said polymer, of said polymer matrix, is formed by polymerizing a monomer composition comprising said monomer represented by Formula (I) between said first transparent electrically conductive electrode layer and said second transparent electrically conductive electrode layer.

6. The electrochromic device of claim 1, wherein for Formula (III), $R^8$ is selected from divalent linear or branched $C_1$-$C_{10}$ alkane linking group, and for Formula (IV), $R^9$ is selected from divalent linear or branched $C_1$-$C_{10}$ alkane linking group, and $R^{10}$ is selected from fluorine, linear or branched $C_1$-$C_{10}$ fluorinated alkyl, or linear or branched $C_1$-$C_{10}$ perfluorinated alkyl.

7. The electrochromic device of claim 1, wherein said anodic component further comprises a counter-cation.

8. The electrochromic device of claim 7, wherein each counter-cation is independently selected from tetra(linear or branched alkyl) ammonium cation.

9. The electrochromic device of claim 1, wherein said cathodic component comprises at least one of a 1,1'-disubstituted-4,4'-dipyridinium cation represented by the following Formula (V), or a 1,1-(alkane-alpha, omega-diyl)-bis-(1'-substituted-4,4'-dipyridinium) cation represented by the following Formula (VI), Formula (V)

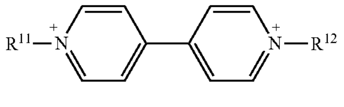

Formula (VI)

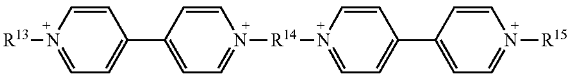

wherein for Formula (V), $R^{11}$ and $R^{12}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and for Formula (VI), $R^{13}$ and $R^{15}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and $R^{14}$ is selected from divalent linear or branched $C_1$-$C_{10}$ alkane linking group.

10. The electrochromic device of claim 9, wherein said cathodic component further comprises counter-anions, wherein each counter-anion of the cathodic component is selected from the group consisting of $BF_4^-$, $PF_6^-$, $ClO_4^-$, $CF_3SO_3$—, $(CF_3SO_2)_2N^-$, $(CF_3SO_2)_3C^-$, and $B(phenyl)_4^-$.

11. The electrochromic device of claim 1, wherein said electrolyte is present and comprises, at least one electrolyte anion, wherein each electrolyte anion is independently selected from bis(perfluoro(linear or branched $C_1$-$C_6$ alkysulfonyl)imide, and at least one electrolyte cation, wherein each electrolyte cation is independently selected from 1-(linear or branched $C_1$-$C_6$ alkyl)-3-(linear or branched $C_1$-$C_6$ alkyl)imidazolium, 1-(linear or branched $C_1$-$C_6$ alkyl)-1-(linear or branched $C_1$-$C_6$ alkyl)pyrrolidinium, or 1-(linear or branched $C_1$-$C_6$ alkyl)-1-(linear or branched $C_1$-$C_6$ alkyl)piperidinium, tetra(linear or branched $C_1$-$C_6$ alkyl)phosphonium, tri($C_5$-$C_8$ cycloalkyl)-(linear or branched $C_1$-$C_6$ alkyl)phosphonium, tetra(linear or branched $C_1$-$C_6$)ammonium, or tri($C_5$-$C_8$ cycloalkyl)-(linear or branched $C_1$-$C_6$ alkyl)ammonium.

12. The electrochromic device of claim 1, wherein said polymer matrix comprises a further polymer, wherein said further polymer comprises at least one of poly((meth)acrylonitrile), poly(vinylidene fluoride), poly(vinylidene fluoride-co-perfluoro(linear or branched $C_1$-$C_6$ alkylene)), or poly((linear or branched $C_1$-$C_8$alkyl)(meth)acrylate).

13. An electrochromic device comprising:

(a) a first substrate having a surface comprising a first transparent electrode layer;

(b) a second substrate having a surface comprising a second transparent conductive electrode layer, wherein said first transparent electrode layer and said second transparent electrode layer are in opposing spaced opposition; and (c) an electrochromic layer interposed between said first transparent electrically conductive electrode layer and said second transparent electrically conductive electrode layer, wherein said electrochromic layer comprises, (i) an electrochromic material comprising a cathodic component having cationic charge, wherein said cathodic component further comprises counter-anions, wherein each counter-anion of said cathodic component is an anodic component having an anion covalently bonded thereto, (ii) an optional electrolyte, and (iii) a polymer matrix, wherein said polymer matrix comprises a polymer, wherein said polymer comprises residues of a monomer represented by the following Formula (I), (I)

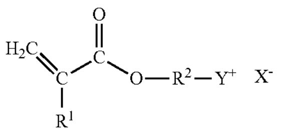

wherein for Formula (I), $R^1$ is in each case independently hydrogen or methyl, $R^2$ is in each case independently a single bond, a divalent linear or branched alkane, or divalent linear or branched cycloalkane, $Y^+$ is in each case independently represented by one of the following Formulas (A), (B), (C), (D), (E), (F), and (G), (A)

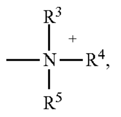

(B)

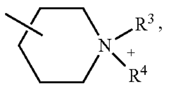

(C)

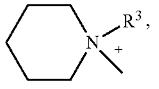

(D)

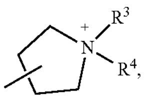

(E)

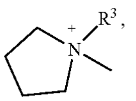

(F)

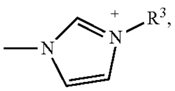 and

-continued (G)

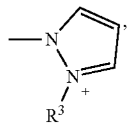

wherein independently for each of Formulas (A), (B), (C), (D), (E), (F), and (G), $R^3$, $R^4$, and $R^5$ are in each case independently selected from linear or branched alkyl or cycloalkyl, and $X^-$ is represented by the following Formula (II), (II)

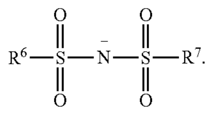

wherein for Formula (II), $R^6$ and $R^7$ are each independently selected from fluorine, linear or branched fluorinated alkyl, or linear or branched perfluorinated alkyl, wherein said anodic component having an anion covalently bonded thereto comprises an anodic component represented by the following Formula (IV), and optionally an anodic component represented by the following Formula (III), (IV)

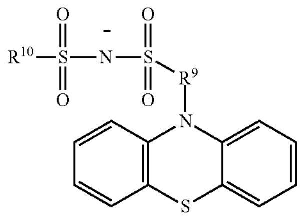

(III)

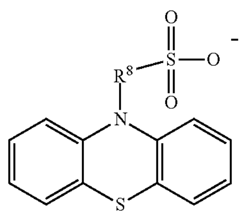

wherein for Formula (IV), $R^9$ is selected from divalent linear or branched alkane linking group, and $R^{10}$ is selected from fluorine, linear or branched fluorinated alkyl, or linear or branched perfluorinated alkyl, and wherein for Formula (III), $R^8$ is selected from divalent linear or branched alkane linking group.

14. The electrochromic device of claim 13, wherein said cathodic component comprises at least one of a 1,1'-disubstituted-4,4'-dipyridinium cation represented by the following Formula (V), or a 1,1-(alkane-alpha, omega-diyl)-bis-(1'-substituted-4,4'-dipyridinium) cation represented by the following Formula (VI), Formula (V)

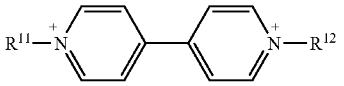

Formula (VI)

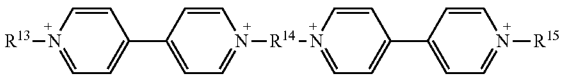

wherein for Formula (V), $R^{11}$ and $R^{12}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and for Formula (VI), $R^{13}$ and $R^{15}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and $R^{14}$ is selected from divalent linear or branched $C_1$-$C_{10}$ alkane linking group.

15. An electrochromic device comprising:

(a) a first substrate having a surface comprising a first transparent electrode layer;

(b) a second substrate having a surface comprising a second transparent conductive electrode layer, wherein said first transparent electrode layer and said second transparent electrode layer are in opposing spaced opposition; and (c) an electrochromic layer interposed between said first transparent electrically conductive electrode layer and said second transparent electrically conductive electrode layer, wherein said electrochromic layer comprises, (i) a cathodic component, (ii) an anodic component, (iii) an optional electrolyte, and (iv) a polymer matrix, wherein said polymer matrix comprises a polymer, wherein said polymer comprises residues of a monomer represented by the following Formula (I), (I)

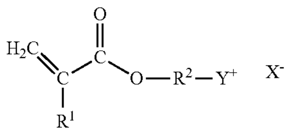

wherein for Formula (I), $R^1$ is in each case independently hydrogen or methyl, $R^2$ is in each case independently a single bond, a divalent linear or branched alkane, or divalent linear or branched cycloalkane, $Y^+$ is in each case independently represented by one of the following Formulas (A), (B), (C), (D), (E), (F), and (G), (A)

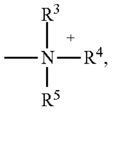

-continued (B)

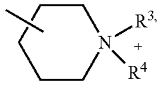

(C)

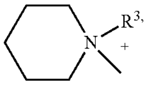

(D)

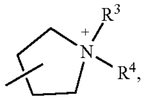

(E)

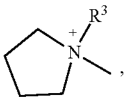

(F)

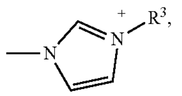

and (G)

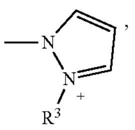

wherein independently for each of Formulas (A), (B), (C), (D), (E), (F), and (G), $R^3$, $R^4$, and $R^5$ are in each case independently selected from linear or branched alkyl or cycloalkyl, and $X^-$ is represented by the following Formula (II), (II)

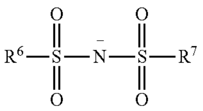

wherein for Formula (II), $R^6$ and $R^7$ are each independently selected from fluorine, linear or branched fluorinated alkyl, or linear or branched perfluorinated alkyl, and wherein said cathodic component comprises a cathodic component having cationic charge selected from at least one of a 1,1'-disubstituted-4,4'-dipyridinium cation represented by the following Formula (V), or a 1,1-(alkane-alpha, omega-diyl)-bis-(1'-substituted-4,4'-dipyridinium) cation represented by the following Formula (VI), Formula (V)

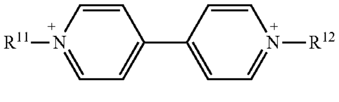

Formula (VI)

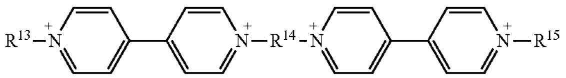

wherein for Formula (V) and Formula (VI), $R^{11}$, $R^{12}$, $R^{13}$, and $R^{15}$ are in each case independently selected from linear or branched alkyl, unsubstituted cycloalkyl, substituted cycloalkyl, unsubstituted aryl, substituted aryl, a group represented by the following Formula (VII), (VII)

$—R^{16}—SO_3^{-}$, and a group represented by the following Formula (VIII), (VIII)

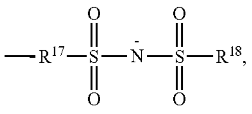

wherein for Formula (VII) and Formula (VIII), $R^{16}$ and $R^{17}$ are in each case independently selected from divalent linear or branched alkane linking group, and for Formula (VIII), $R^{18}$ is selected from fluorine, linear or branched fluorinated alkyl, or linear or branched perfluorinated alkyl, and for Formula (VI), $R^{14}$ is selected from divalent linear or branched alkane linking group, provided that for Formula (V), at least one of $R^1$ and $R^{12}$ is independently selected from said group represented by Formula (VIII), and provided that for Formula (VI), at least one of $R^{13}$ and $R^{15}$ is independently selected from said group represented by Formula (VIII).

16. An electrochromic composition comprising:

(i) a cathodic component, (ii) an anodic component, (iii) an optional electrolyte, (iv) at least one of, (a) a polymeric thickener, or (b) a polymerizable monomer composition, and (v) a solvent, wherein said polymeric thickener comprises a polymer, wherein said polymer comprises residues of a monomer represented by the following Formula (I), and wherein said polymerizable monomer composition independently comprises said monomer represented by the following Formula (I), (I)

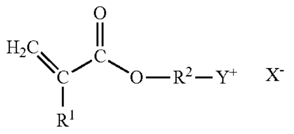

wherein for Formula (I), $R^1$ is in each case independently hydrogen or methyl, $R^2$ is in each case independently a single bond, a divalent linear or branched alkane, or divalent linear or branched cycloalkane, $Y^+$ is in each case independently represented by one of the following Formulas (A), (B), (C), (D), (E), (F), and (G), (A)

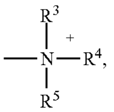

(B)

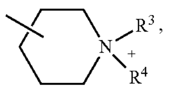

(C)

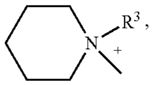

(D)

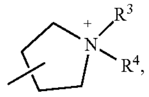

(E)

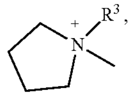

(F)

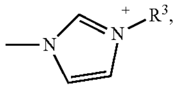 and (G)

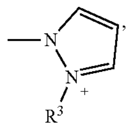

wherein independently for each of Formulas (A), (B), (C), (D), (E), (F), and (G), $R^3$, $R^4$, and $R^5$ are in each case independently selected from linear or branched alkyl or cycloalkyl, and $X^-$ is represented by the following Formula (II), (II)

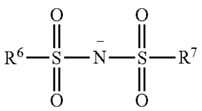

wherein for Formula (II), $R^6$ and $R^7$ are each independently selected from fluorine, linear or branched fluorinated alkyl, or linear or branched perfluorinated alkyl, wherein said anodic component comprises an anodic component represented by the following Formula (IV), and optionally an anodic component represented by the following Formula (III), (IV)

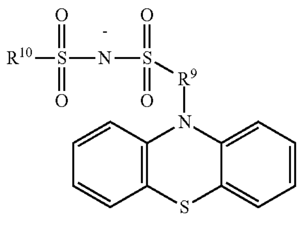

-continued (III)

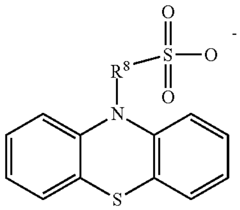

wherein for Formula (IV), $R^9$ is selected from divalent linear or branched alkane linking group, and $R^{10}$ is selected from fluorine, linear or branched fluorinated alkyl, or linear or branched perfluorinated alkyl, and wherein for Formula (III), $R^8$ is selected from divalent linear or branched alkane linking group.

17. The electrochromic composition of claim 16, wherein said solvent comprises at least one of ethylene carbonate, propylene carbonate, gamma-butyrolactone, gamma-valerolactone, N-methylpyrrolidone, polyethylene glycol, carboxylic acid esters of polyethylene glycol, sulfolane, alpha, omega-($C_2$-$C_8$)dinitriles, or di(linear or branched $C_1$-$C_8$) acetamides.

18. The electrochromic composition of claim 16, wherein said anodic component further comprises a counter-cation.

19. The electrochromic composition of claim 18, wherein each counter-cation is independently selected from tetra (linear or branched alkyl) ammonium cation.

20. The electrochromic composition of claim 16, said cathodic component comprises at least one of a 1,1'-disubstituted-4,4'-dipyridinium cation represented by the following Formula (V), or a 1,1-(alkane-alpha, omega-diyl)-bis-(1'-substituted-4,4'-dipyridinium) cation represented by the following Formula (VI), Formula (V)

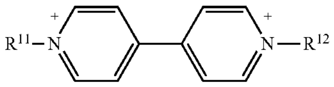

Formula (VI)

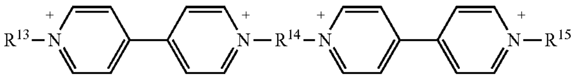

wherein for Formula (V), $R^{11}$ and $R^{12}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and for Formula (VI), $R^{13}$ and $R^{15}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and $R^{14}$ is selected from divalent linear or branched $C_1$-$C_{10}$ alkane linking group.

21. The electrochromic composition of claim 20, wherein said cathodic component further comprises counter-anions, wherein each counter-anion of the cathodic component is selected from the group consisting of $BF_4^-$, $PF_6^-$, $ClO_4^-$, $CF_3SO_3$—, $(CF_3SO_2)_2N^-$, $(CF_3SO_2)_3C^-$, and $B(phenyl)_4^-$.

22. An electrochromic composition comprising:

(i) an electrochromic material comprising a cathodic component having cationic charge, wherein said cathodic component further comprises counter-anions, wherein each counter-anion of said cathodic component is an anodic component having an anion covalently bonded thereto, (ii) an optional electrolyte, (iii) at least one of, (a) a polymeric thickener, or (b) a polymerizable monomer composition, and (iv) a solvent, wherein said polymeric thickener comprises a polymer, wherein said polymer comprises residues of a monomer represented by the following Formula (I), and wherein said polymerizable monomer composition independently comprises said monomer represented by the following Formula (I), (I)

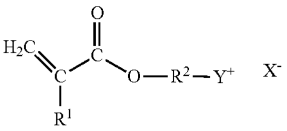

wherein for Formula (I), $R^1$ is in each case independently hydrogen or methyl, $R^2$ is in each case independently a single bond, a divalent linear or branched alkane, or divalent linear or branched cycloalkane, $Y^+$ is in each case independently represented by one of the following Formulas (A), (B), (C), (D), (E), (F), and (G), (A)

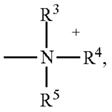

(B)

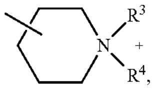

(C)

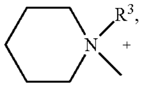

(D)

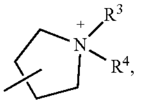

(E)

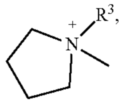

(F)

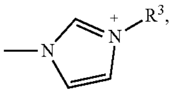

and (G)

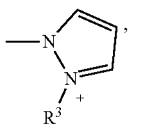

wherein independently for each of Formulas (A), (B), (C), (D), (E), (F), and (G), $R^3$, $R^4$, and $R^5$ are in each case independently selected from linear or branched alkyl or cycloalkyl, and $X^-$ is represented by the following Formula (II), (II)

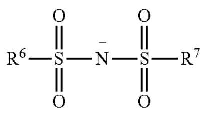

wherein for Formula (II), $R^6$ and $R^7$ are each independently selected from fluorine, linear or branched fluorinated alkyl, or linear or branched perfluorinated alkyl, wherein said anodic component having an anion covalently bonded thereto comprises an anodic component represented by the following Formula (IV), and optionally an anodic component represented by the following Formula (III), (IV)

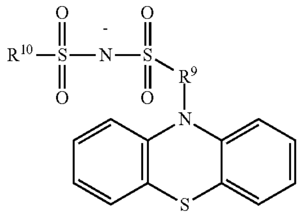

(III)

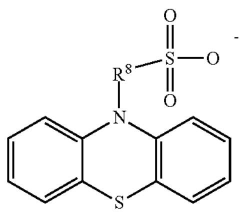

wherein for Formula (IV), $R^9$ is selected from divalent linear or branched alkane linking group, and $R^{10}$ is selected from fluorine, linear or branched fluorinated alkyl, or linear or branched perfluorinated alkyl, and wherein for Formula (III), $R^8$ is selected from divalent linear or branched alkane linking group.

23. The electrochromic composition of claim 22, said cathodic component comprises at least one of a 1,1'-disubstituted-4,4'-dipyridinium cation represented by the following Formula (V), or a 1,1-(alkane-alpha, omega-diyl)-bis-(1'-substituted-4,4'-dipyridinium) cation represented by the following Formula (VI), Formula (V)

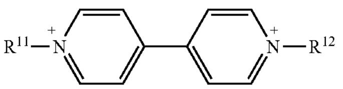

Formula (VI)

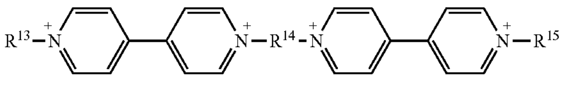

wherein for Formula (V), $R^{11}$ and $R^{12}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and for Formula (VI), $R^{13}$ and $R^{15}$ are each independently selected from linear or branched $C_1$-$C_{10}$ alkyl, unsubstituted $C_3$-$C_7$ cycloalkyl, substituted $C_3$-$C_7$ cyloalkyl, unsubstituted aryl, and substituted aryl, and $R^{14}$ is selected from divalent linear or branched $C_1$-$C_{10}$ alkane linking group.

24. An electrochromic composition comprising:

(i) a cathodic component, (ii) an anodic component, (iii) an optional electrolyte, (iv) at least one of, (a) a polymeric thickener, or (b) a polymerizable monomer composition, and (v) a solvent, wherein said polymeric thickener comprises a polymer, wherein said polymer comprises residues of a monomer represented by the following Formula (I), and wherein said polymerizable monomer composition independently comprises said monomer represented by the following Formula (I), (I)

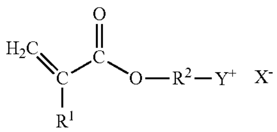

wherein for Formula (I), $R^1$ is in each case independently hydrogen or methyl, $R^2$ is in each case independently a single bond, a divalent linear or branched alkane, or divalent linear or branched cycloalkane, $Y^+$ is in each case independently represented by one of the following Formulas (A), (B), (C), (D), (E), (F), and (G), (A)

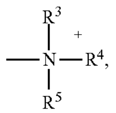

(B)

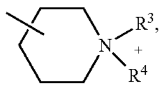

(C)

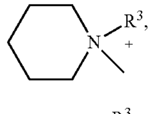

(D)

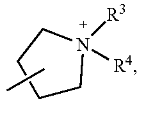

(E)

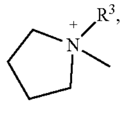

-continued (F)

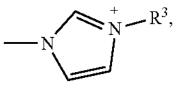

and (G)

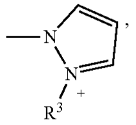

wherein independently for each of Formulas (A), (B), (C), (D), (E), (F), and (G), $R^3$, $R^4$, and $R^5$ are in each case independently selected from linear or branched alkyl or cycloalkyl, and $X^-$ is represented by the following Formula (II), (II)

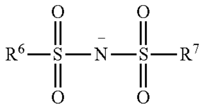

wherein for Formula (II), $R^6$ and $R^7$ are each independently selected from fluorine, linear or branched fluorinated alkyl, or linear or branched perfluorinated alkyl, and wherein said cathodic component comprises a cathodic component having cationic charge selected from at least one of a 1,1'-disubstituted-4,4'-dipyridinium cation represented by the following Formula (V), or a 1,1-(alkane-alpha, omega-diyl)-bis-(1'-substituted-4,4'-dipyridinium) cation represented by the following Formula (VI), Formula (V)

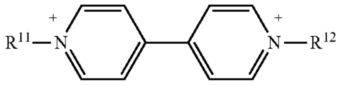

-continued

Formula (VI)

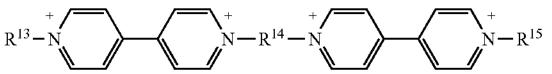

wherein for Formula (V) and Formula (VI), $R^{11}$, $R^{12}$, $R^{13}$, and $R^{15}$ are in each case independently selected from linear or branched alkyl, unsubstituted cycloalkyl, substituted cycloalkyl, unsubstituted aryl, substituted aryl, a group represented by the following Formula (VII), (VII)

$$—R^{16}—SO_3^-,\ \text{and}$$

a group represented by the following Formula (VIII), (VIII)

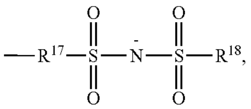

wherein for Formula (VII) and Formula (VIII), $R^{16}$ and $R^{17}$ are in each case independently selected from divalent linear or branched alkane linking group, and for Formula (VIII), $R^{18}$ is selected from fluorine, linear or branched fluorinated alkyl, or linear or branched perfluorinated alkyl, and for Formula (VI), $R^{14}$ is selected from divalent linear or branched alkane linking group, provided that for Formula (V), at least one of $R^1$ and $R^{12}$ is independently selected from said group represented by Formula (VIII), and provided that for Formula (VI), at least one of $R^{13}$ and $R^{15}$ is independently selected from said group represented by Formula (VIII).

* * * * *